United States Patent [19]

Hartley et al.

[11] Patent Number: 5,317,755
[45] Date of Patent: May 31, 1994

[54] SYSTOLIC ARRAY PROCESSORS FOR REDUCING UNDER-UTILIZATION OF ORIGINAL DESIGN PARALLEL-BIT PROCESSORS WITH DIGIT-SERIAL PROCESSORS BY USING MAXIMUM COMMON DIVISOR OF LATENCY AROUND THE LOOP CONNECTION

[75] Inventors: Richard I. Hartley, Schenectady; Peter F. Corbett, White Plains, both of N.Y.

[73] Assignee: General Electric Company, Schenectady, N.Y.

[21] Appl. No.: 683,002

[22] Filed: Apr. 10, 1991

[51] Int. Cl.$^5$ .................. G06F 3/00; G06F 7/00
[52] U.S. Cl. .................. 395/800; 341/101; 364/229; 364/229.3; 364/271.3; 364/931.5; 364/931.01; 364/DIG. 2
[58] Field of Search ........ 395/800; 364/754, 724.16, 364/724.17; 341/101

[56] References Cited

U.S. PATENT DOCUMENTS

| | | | |
|---|---|---|---|
| 4,337,518 | 6/1982 | Ohnishi et al. | 364/724.17 |
| 4,377,806 | 3/1983 | Elliott et al. | 341/101 |
| 4,517,659 | 5/1985 | Chamberlain | 395/800 |
| 4,794,627 | 12/1988 | Grimaldi | 375/114 |
| 4,799,152 | 1/1989 | Chuang et al. | 395/800 |
| 4,799,182 | 1/1989 | Marwood | 364/748 |
| 4,910,700 | 3/1990 | Hartley et al. | 364/754 |
| 4,942,396 | 7/1990 | Hartley et al. | 341/101 |
| 5,025,257 | 6/1991 | Hartley et al. | 341/101 |
| 5,034,908 | 7/1991 | Hartley et al. | 364/724.16 |
| 5,105,424 | 4/1992 | Flaig et al. | 370/94.1 |

OTHER PUBLICATIONS

P. F. Corbett and R. I. Hartley, "Use of Digit-Serial Computational in Systolic Arrays" pp. 1-4, May 90, IEEE International Symposium on CKT & System.
H. T. Kung "Why Systolic Architectures", IEEE, vol. 15, No. 1, Jan. 1982.
Corbett P. and R. I. Hartley, "Designing Systolic Arrays Using Digit-Serial Arithmetic" Jan. '92, IEEE Transaction on CKT & System II vol. 39.
P. Corbett, "Application of Digit-Serial Processing to Systolic Arrays", Apr. 18, 1988 Princeton University.

*Primary Examiner*—Alyssa H. Bowler
*Assistant Examiner*—Meng-Ai T. An
*Attorney, Agent, or Firm*—Marvin Snyder

[57] ABSTRACT

A method of transforming systolic arrays using bit-parallel arithmetic into arrays using digit-serial arithmetic is described. Digit-serial computation is an area-time efficient method of doing high-speed arithmetic calculations, having the advantage through appropriate choice of digit and word size of allowing throughput capacity to be matched to design needs. For a certain class of systolic arrays, however, digit-serial arithmetic allows a further very significant benefit, by transforming arrays in which processors are under-utilized into arrays with 100% processor utilization. As an example, converting a well-known band-matrix multiplication array to use digit-serial processing is calculated to give an improvement of more than three times in area-time efficiency.

17 Claims, 38 Drawing Sheets

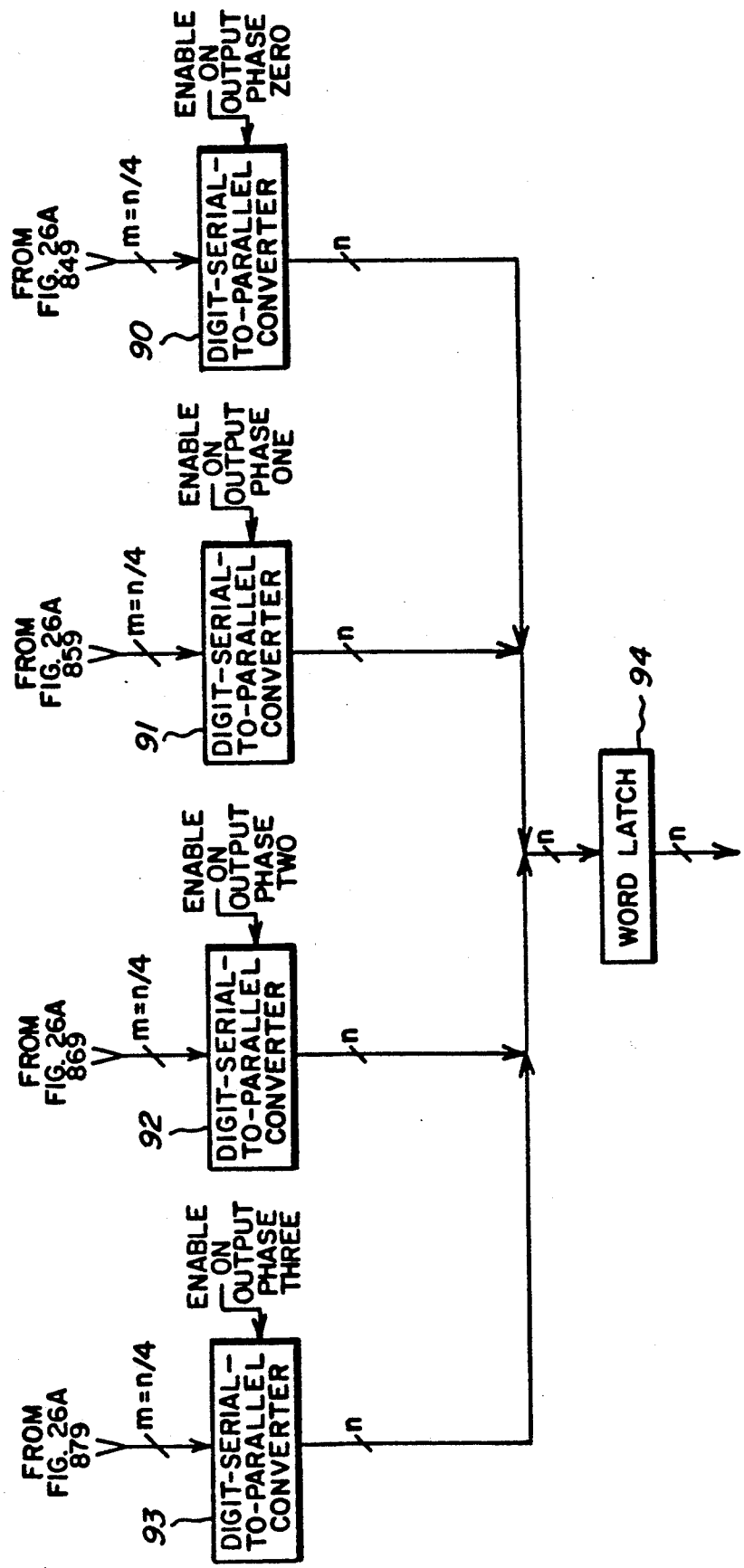

SYSTOLIC ARRAY PROCESSORS FOR REDUCING UNDER-UTILIZATION OF ORIGINAL DESIGN PARALLEL-BIT PROCESSORS WITH DIGIT-SERIAL PROCESSORS BY USING MAXIMUM COMMON DIVISOR OF LATENCY AROUND THE LOOP CONNECTION

FIELD OF THE INVENTION

The invention relates to systolic arrays and, more particularly, to using digit-serial arithmetic in such arrays to provide 100% processor utilization.

REFERENCE TO RELATED APPLICATIONS

The entire specification and drawing of U.S. Pat. No. 4,942,396 issued Jul. 17, 1990, entitled "TO-DIGIT-SERIAL CONVERTERS FOR SYSTEMS PROCESSING DATA IN DIGIT-SERIAL FORMAT" and assigned to General Electric Company is incorporated herein by reference. This patent issued from U.S. patent application Ser. No. 347,860 filed May 4, 1989, now U.S. Pat. No. 4,942,396 issued Jul. 17, 1990, which was a continuation-in-part both of U.S. patent application Ser. No. 204,792 filed Jun. 10, 1988 and of U.S. patent application Ser. No. 231,937 filed Aug. 15, 1988, both latter applications now abandoned.

U.S. patent application Ser. No. 482,121 filed Feb. 20, 1990, now U.S. Pat. No. 5,016,011 issued May 14, 1991 for Richard Ian Hartley, Peter Frank Corbett, Fathy Fouad Yassa and Sharbel Noujaim; entitled "INCREASED PERFORMANCE OF DIGITAL INTEGRATED CIRCUITS BY PROCESSING WITH MULTIPLE-BIT-WIDTH DIGITS" and assigned to General Electric Company is a division of U.S. Pat. No. 4,942,396.

U.S. patent application Ser. No. 482,122 filed Feb. 20, 1990, now U.S. Pat. No. 5,025,257 issued Jun. 18, 1991 for Richard Ian Hartley, Peter Frank Corbett and Fathy Fouad Yassa; entitled "INCREASED PERFORMANCE OF DIGITAL INTEGRATED CIRCUITS BY PROCESSING WITH MULTIPLE-BIT-WIDTH DIGITS" and assigned to General Electric Company is a division of U.S. patent application Ser. No. 347,860 filed May 4, 1989.

U.S. patent application Ser. No. 504,503 filed Apr. 2, 1990, now U.S. Pat. No. 5,034,908 issued Jul. 23, 1991 for Richard Ian Hartley, Peter Frank Corbett and Sharbel Emil Noujaim; entitled "DIGIT-SERIAL TRANSVERSAL FILTERS" and assigned to General Electric Company is a division of U.S. Pat. No. 4,942,396.

U.S. patent application Ser. No. 486,632 filed Feb. 28, 1990, now U.S. Pat. No. 5,034,909 issued Jul. 23, 1991 for Richard Ian Hartley, entitled "DIGIT-SERIAL RECURSIVE FILTERS" and assigned to General Electric Company is a division of U.S. Pat. No. 4,942,396.

U.S. patent application Ser. No. 553,914 filed Jul. 16, 1990, now U.S. Pat. No. 5,164,724 issued Nov. 17, 1992 for Richard Ian Hartley, Peter Frank Corbett, Sharbel Noujaim and Fathy Fouad Yassa; entitled "DIGITAL STANDARDS CONVERTERS FOR USE WITH DIGIT-SERIAL SIGNALS" and assigned to General Electric Company is a division of U.S. Pat. No. 4,942,396.

BACKGROUND OF THE INVENTION

Systolic arrays are now widely used in a number of signal and image processing applications. An important reason for this wide usage is that signal processing algorithms which perform repeated similar operations on large amounts of data can often be partitioned so that many operations are performed in parallel and that these parallel operations are repeated a number of times. Keys to systolic array design are that all communications are local (i.e. the length of communication paths is constant, independent of the array size), and that the system is fully pipelined, or systolized. What this means is that all combinational paths are localized within processors, and all data transfer between processors is done through delay registers.

Digit-serial computation is carried forward in a synchronous architecture in which data is strictly clocked from one operator to the next, and arithmetic units often include internal stages of pipelining. Combinational paths are usually kept short and outputs of individual operators are usually latched. Digit-serial computation is thus compatible with systolic array design. Indeed, digit-serial circuits are sometimes described as being systolic, differing from systolic arrays only in their lack of regular connection topology. It is obvious to try, then, to use digit-serial arithmetic to implement the individual processors in a systolic array. Allowing a choice of digit size provides the flexibility of being able to make trade-offs between hardware cost and throughput.

In translating a systolic array using parallel arithmetic to one implemented using digit-serial arithmetic, one must be careful that the functionality of the array is unchanged. The different timing characteristics of digit-serial operations as compared with bit-parallel operations means that the timing of the array may be changed, affecting functionality. P. F. Corbett and R. I. Hartley outline a simple method for translating an array of bit-parallel processors to a corresponding array of digit-serial processors using a chosen digit-size in their paper "Use of Digit-serial Computation in Systolic Arrays" appearing on pages 1–4 of IEEE International Symposium on Circuits & Systems published in May 1990 and incorporated in its entirety into this application. As long as a simple criterion is satisfied, identical functionality between the original bit-parallel array and the digit-serial version is guaranteed.

Despite their high efficiency of computation, systolic arrays have some potential disadvantages. One of these is low processor utilization. A frequent occurrence in systolic designs is that processors cannot be provided data on every clock cycle. Data arrives on only one of every $\alpha$ cycles where $\alpha$ is some integer greater than one. Therefore, the utilization of the processor is reduced to $1/\alpha$. However, the processor itself must still meet all the performance requirements of a fully utilized processor since, whenever it is required to process data, it must do so in the same time as a fully utilized processor would. In such arrays, it is impossible to maintain a data rate of one sample per systolic cycle in the data pipelines and it is necessary to separate valid data by dummy or zero-valued data in order to meet the systolic requirements.

The low utilization of processors arises because of cycles in the data flow graph of the array. Typically, the projection of the data dependency graph onto a reasonable number of processors leads to an array in which there are loops with duration greater than one systolic cycle. In order to implement the systolic algorithm correctly, it is necessary to separate the data by dummy or zero values.

Several techniques have been proposed to utilize the unused cycles in these arrays. In one technique, the array hardware remains much the same, but is utilized on every cycle. This utilization is achieved by interleaving problem instances on a single array. These may be multiple copies of identical problem instances to achieve some measure of tolerance for transient faults in the network. This is accomplished by comparing two or more outputs which should be identical in the fault free case. The $\alpha=2$ case allows fault detection. Cases where $\alpha>2$ allow fault correction through voting. An alternative technique is to increase the overall throughput of the systolic array by interleaving different problem instances onto the array. Each of these alternative techniques can require additions to the processor hardware to separate data belonging to different problem instances. They also require more complex external interfaces to control the interleaving of problem instances. Another technique is to multiplex data streams through the processors. This requires many registers and multiplexers, as well as control, and therefore adds considerable complexity.

The inventors propose an alternative approach which increases processor utilization to unity. Rather than increasing the utilization of the standard processor hardware, the technique the inventors propose allows throughput to be maintained while reducing the hardware by a factor approaching $\alpha$. The technique is to divide the data words into $\alpha$ sections, or digits, and to process these digits serially whenever it would otherwise be necessary to separate the data by dummy or zero values. Digit-serial data inherently has a data rate that is an integer submultiple of the parallel data rate, and the digit-size may be chosen so as to meet the data rates required by the systolic algorithm. The advantages of this technique are two-fold. First, the number of wires required for the transmission of data is decreased. Second, the fully-utilized digit-serial computational elements that replace the under-utilized bit-parallel computational elements generally have fewer components, even taking into account the data format conversion circuitry needed at their inputs.

SUMMARY OF THE INVENTION

The invention in one of its aspects is embodied in methods for use in a silicon compiler in which systolic arrays are represented in graphical form, with vertices representing processors and edges representing communication links between processors. These methods transform a systolic array using parallel-bit processors operated at a common clock frequency to process parallel-bit words, at least one of which parallel-bit processors is underutilized, to a systolic array of fully utilized processors of digit-serial type.

The invention in another of its aspects is embodied in a systolic array of the type generated by a silicon compiler employing these methods.

BRIEF DESCRIPTION OF THE DRAWING

FIGS. 1,2,3,4,5,6,7,8,9,10,11,12,13,14,15,16,17,18,19,20,21,22,23,24,25,26a,26b,27 and 28 appear in U.S. Pat. No. 4,942,396 incorporated herein by reference.

DETAILED DESCRIPTION

Figure 1:
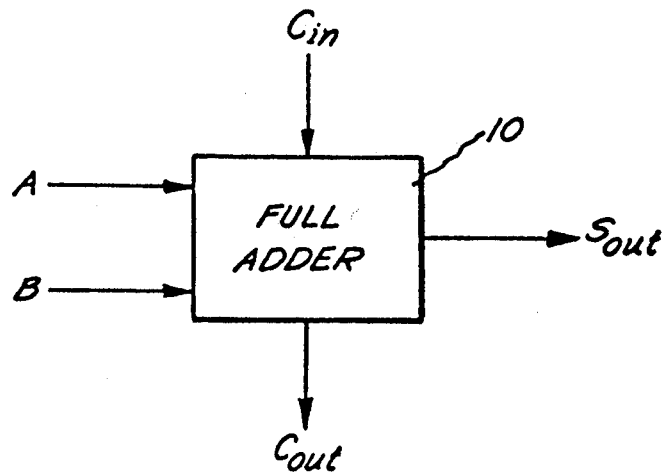
Figure 3:
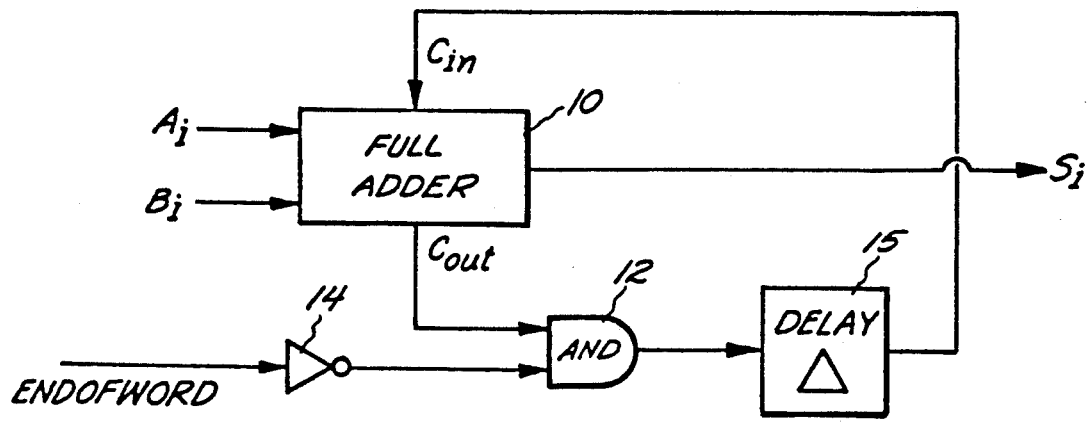
Figure 2:
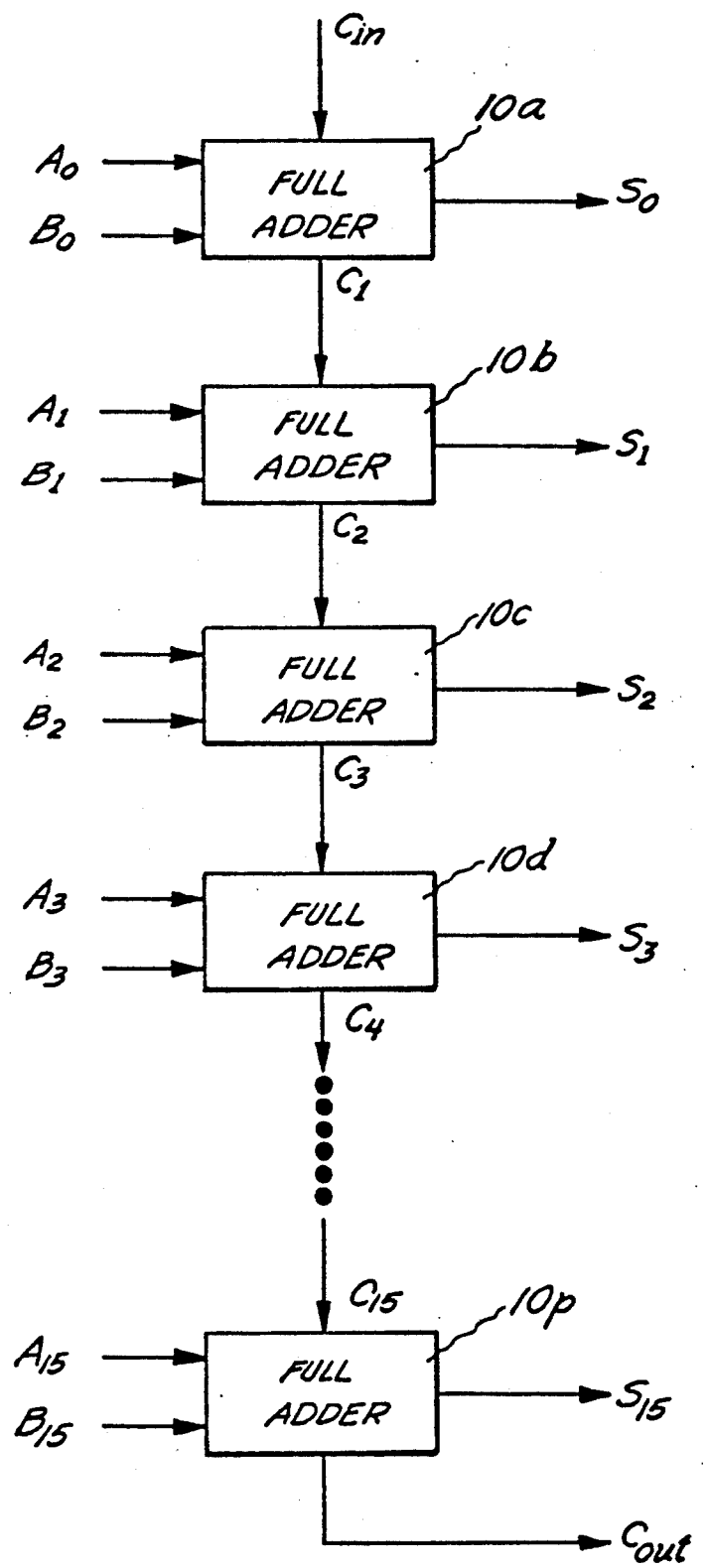
Figure 4:
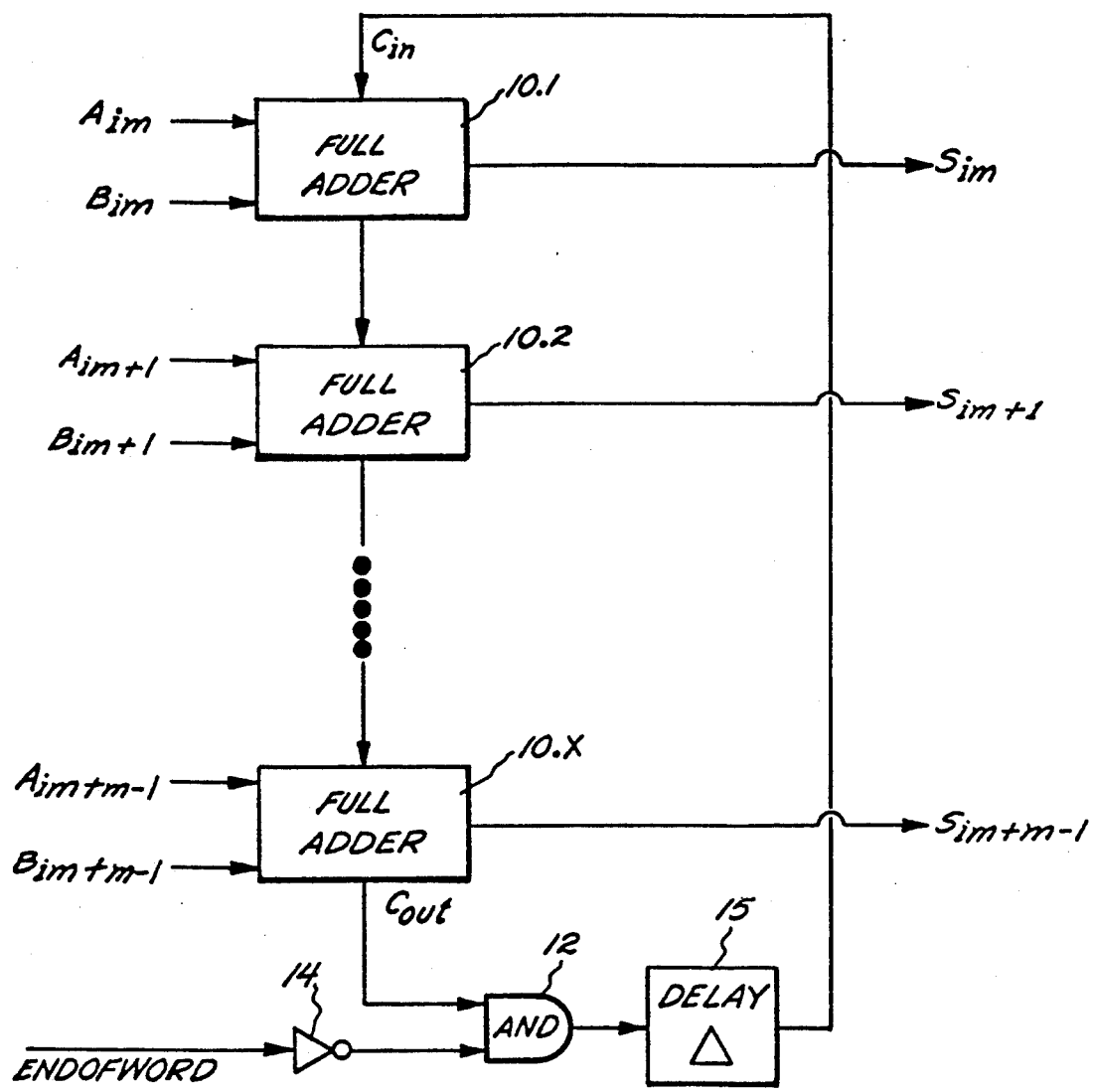
Figure 5:
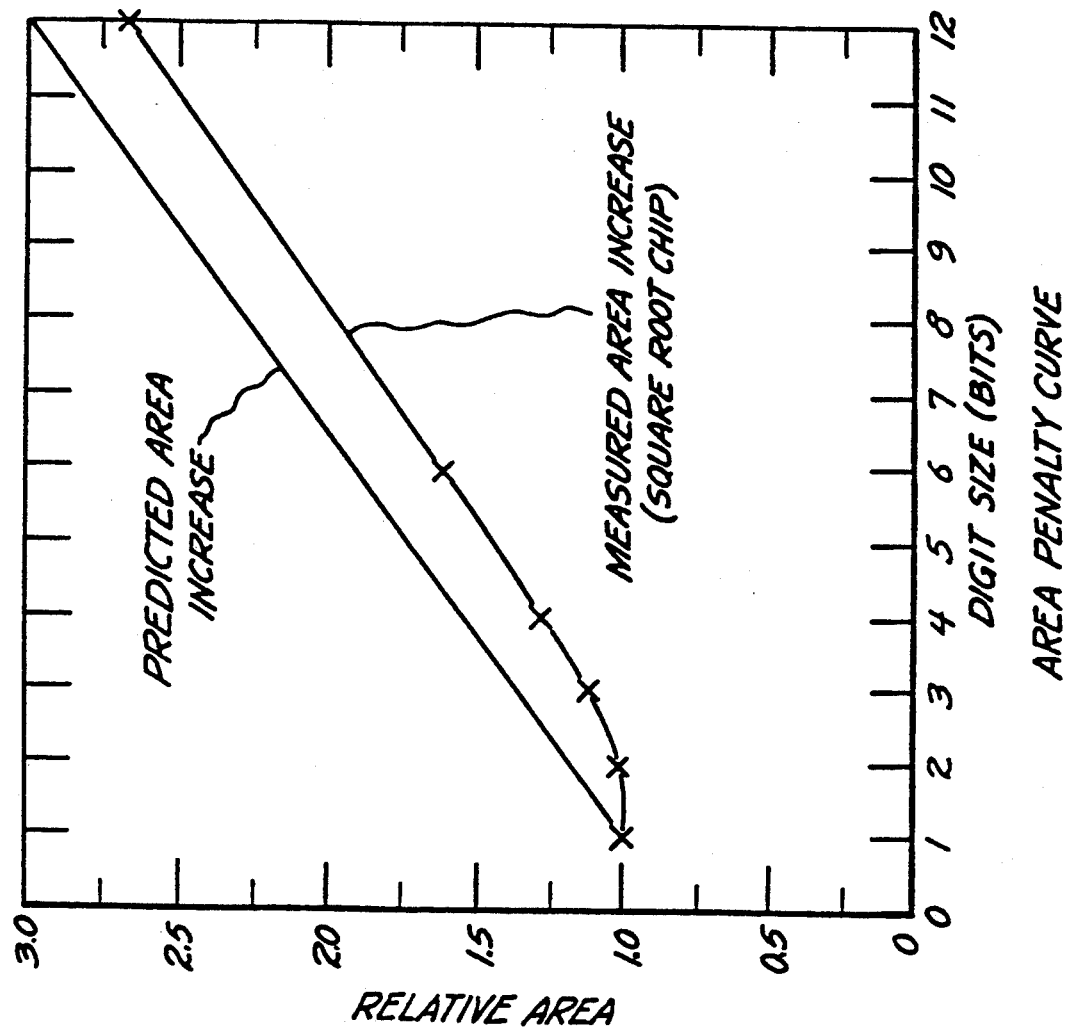

Traditionally, arithmetic processing has been done in a fully parallel fashion. That is, operators receive their entire input words during one clock cycle, process them, and produce their entire output words on the same cycle (or some fixed number of cycles later). In digit-serial computation, words of data are decomposed into digits and transmitted serially, one digit at a time. Most-significant digit (MSD) first digit-serial computational schemes are described in the M. D. Ercegovac paper "On-line Arithmetic: An overview." *SPIE*, Vol 495, pp. 86–93, 1984, and in the M. J. Irwin and R. M. Owens paper, "Digit-Pipelined Arithmetic as Illustrated by the Paste-Up System: A Tutorial." *IEEE Computer*, pp. 61–73, April 1987. A least significant digit (LSD) first digit-serial computational scheme is described in the R. Hartley and P. Corbett paper, "Digit-Serial Processing Techniques", IEEE Proceedings on Circuits and Systems, July 1990, and the methods and theory of this paper apply to both systems. However, the examples herein treated relate most closely to least significant digit first arithmetic. The throughput and efficiency improvements afforded by digit-serial processing are discussed in the R. Hartley and P. Corbett paper, "Digit-Serial Processing Techniques".

In a typical digit-serial scheme, a word of size W may be divided into W/N digits of size N and transmitted along N wires during W/N clock cycles. Words follow each other without a break and arithmetic computations are carried out on the data one digit at a time as the digits arrive. Typically, digit-serial computations are pipelined, and there is a delay of some number of clock cycles between the moment when the first digits of the input operands arrive at a computational unit and the moment when the first digit of the result is produced. Typical numbers are one clock cycle for digit-serial addition, and six clock cycles for digit-serial multiplication (assuming three digits in a word, and LSD first arithmetic). This delay will be termed the latency of the operator. In the drawing digit-serial operators are shown as if they had zero latency, and a delay symbol kD follows the operator indicating the number of cycles, k, of latency. Thus the operator is abstracted as if it consisted of a zero-latency operator followed by a number of cycles of delay, although in reality the latency delay is inseparable from the operator. In terms of input/output behavior, however, the abstraction is indistinguishable from the reality.

The application of digit-serial computation to under-utilized systolic arrays is as follows. Consider systolic networks in which computational units are utilized only one cycle out of $\alpha$, ($\alpha > 1$). Our method is to apply digit-serial computation to this array in such a way that data words are divided into digits, each of size $N = W/\alpha$ where W is the word size. The fully parallel processors are replaced by digit-serial processors and full width communication links between processors are replaced by digit-wide communication links. When and why such an array will have the same function as the original array will be discussed presently. The digit-serial array will be shown to have throughput equal to or even greater than in the fully parallel case. At the same time, the size of the hardware forming the array is reduced greatly.

If the systolic array is fully utilized, the application of digit-serial computation to the array no longer has the advantage of increasing processor utilization. However, it is still (usually) possible to modify the array so that digit-serial computation may be used to implement it. In this case, the high efficiency of digit-serial operators may nevertheless make such a transformation cost-effective. Finally, the possibility of transforming a parallel systolic array to a digit-serial array with an appropriately chosen digit-size allows the designer to make a trade of throughput for circuit area to match the constraints of the design under consideration.

Systolic arrays are naturally represented in graphical form, with vertices representing cells or processors and edges representing communication links. Each cell in the array may be represented schematically by a box with input ports and output ports. Each port is labelled with a number giving the relative timing of the input and output signals. This timing diagram will be described more fully further on. The $\Delta$ operator in the drawing represents a one-cycle delay.

A number of examples of systolic arrays are shown in the H. T. Kung paper, "Why Systolic Architectures", *IEEE Computer*, Vol 15, No. 1, January 1982, and in the S. Y. Kung book, "VLSI Array Processors", Prentice Hall, Englewood Cliffs, N.J., 1988. Consideration will now be narrowed to arrays that make less than full utilization of their hardware.

Figure 6:
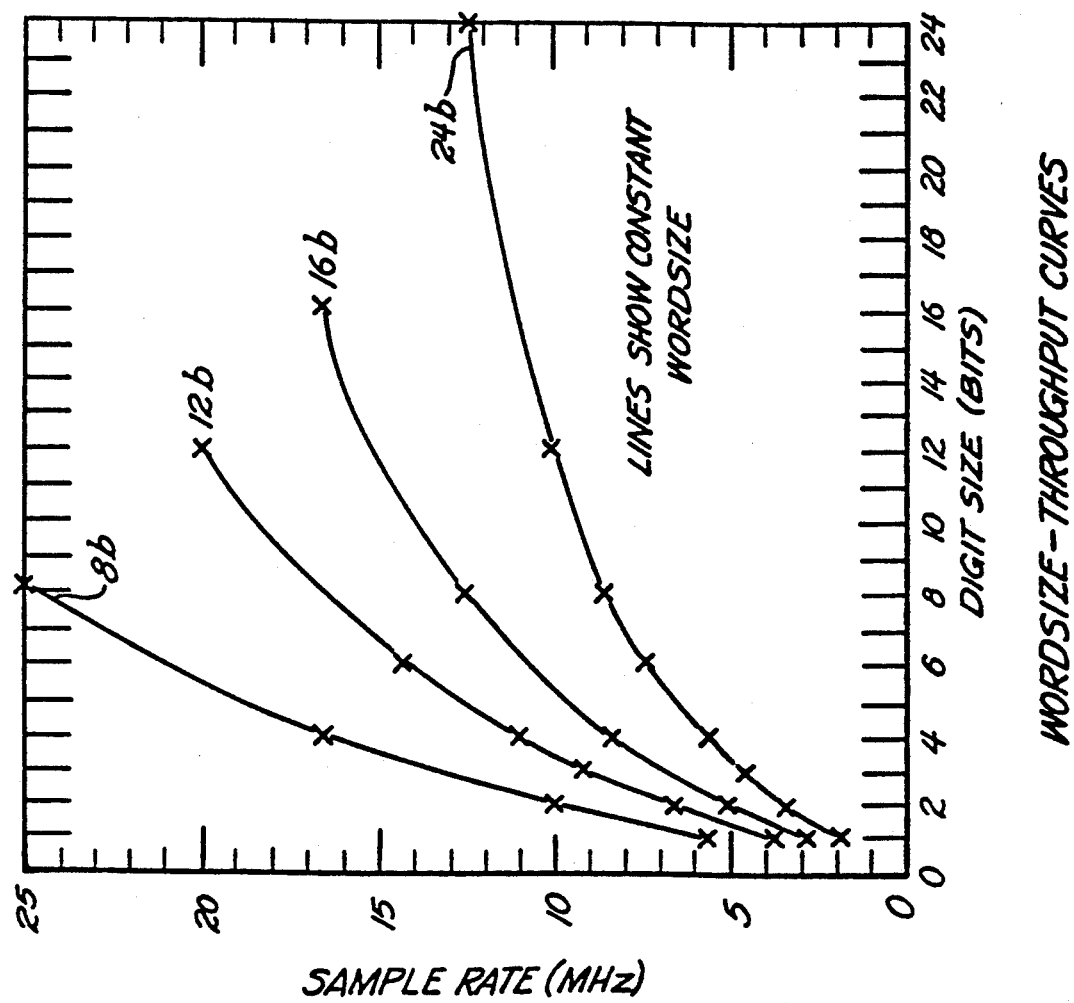
Figure 7:
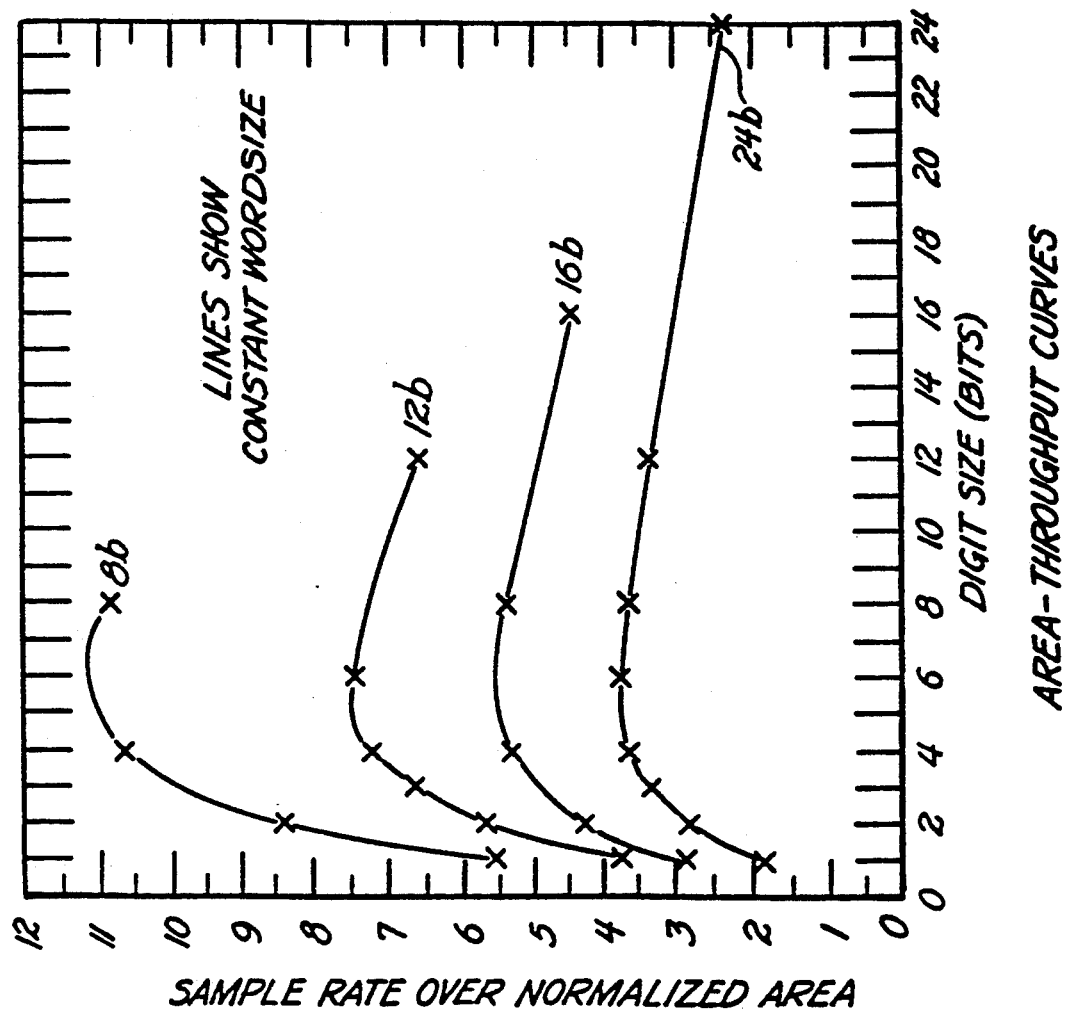
Figure 8:
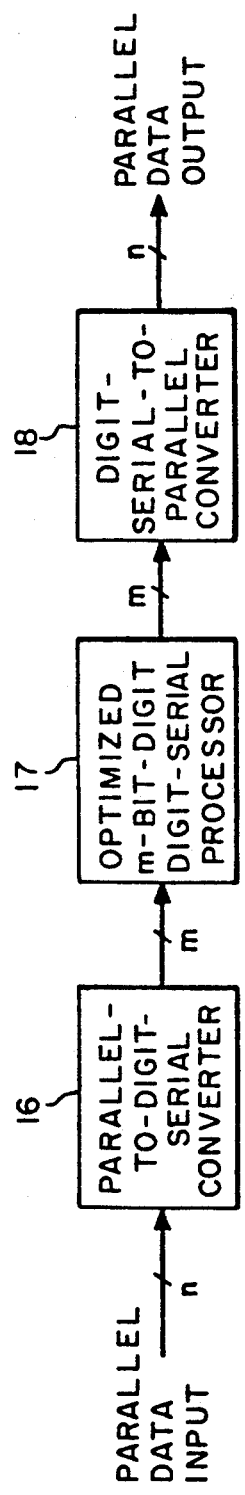
Figure 10:
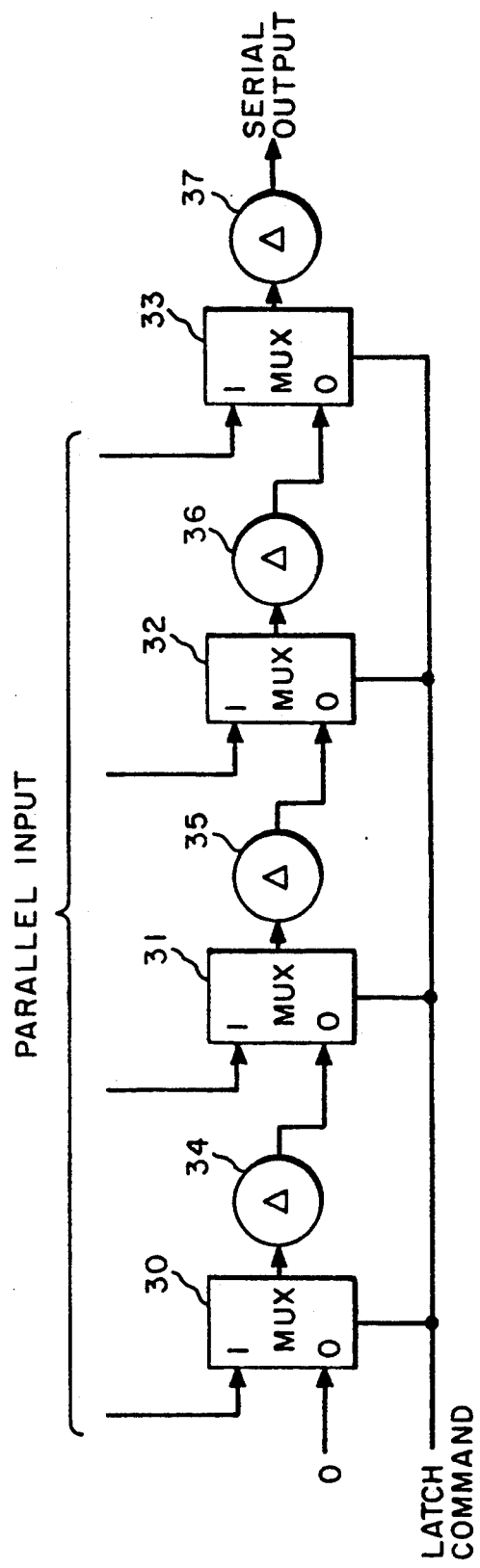
Figure 9:
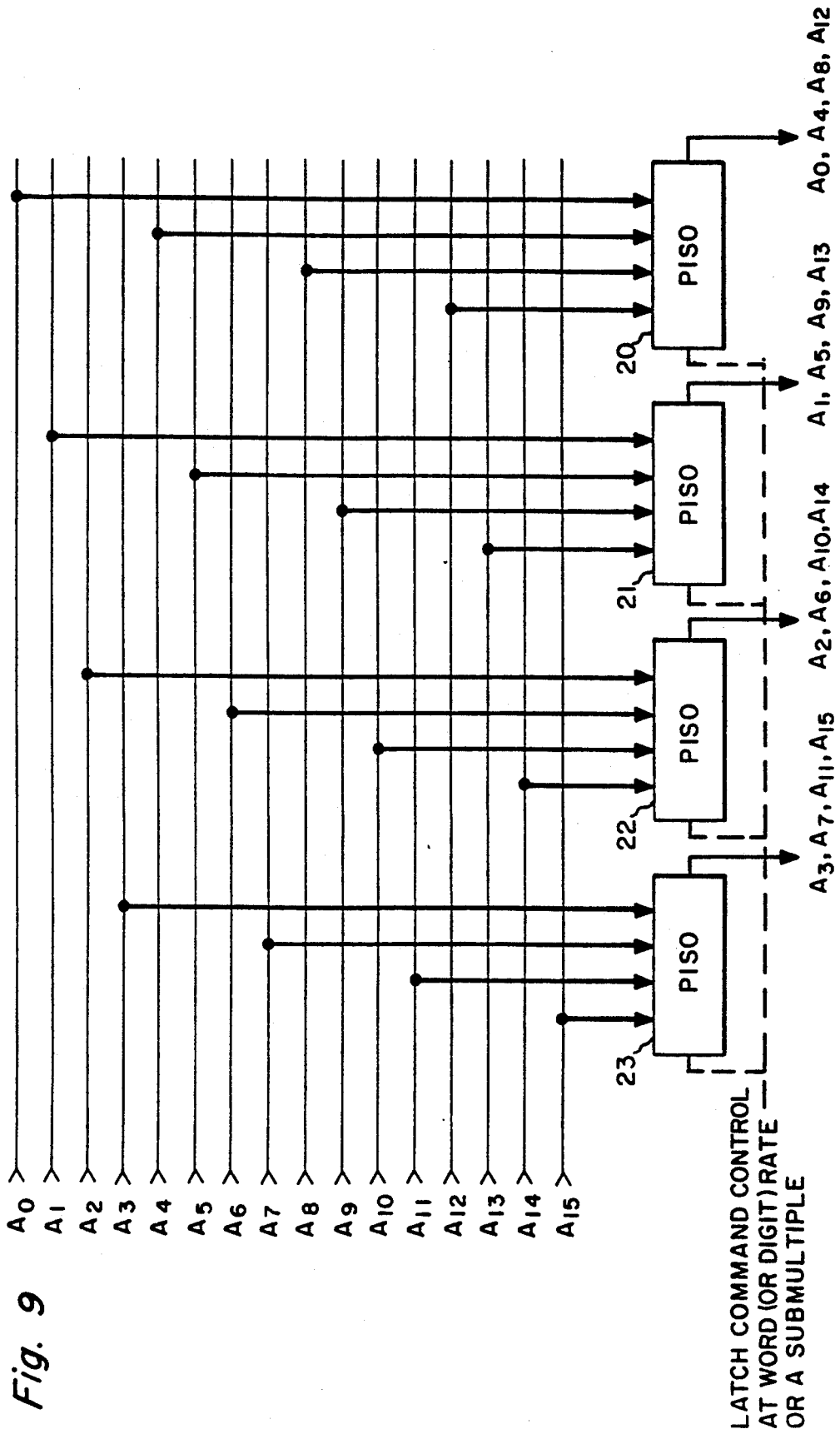
Figure 11:
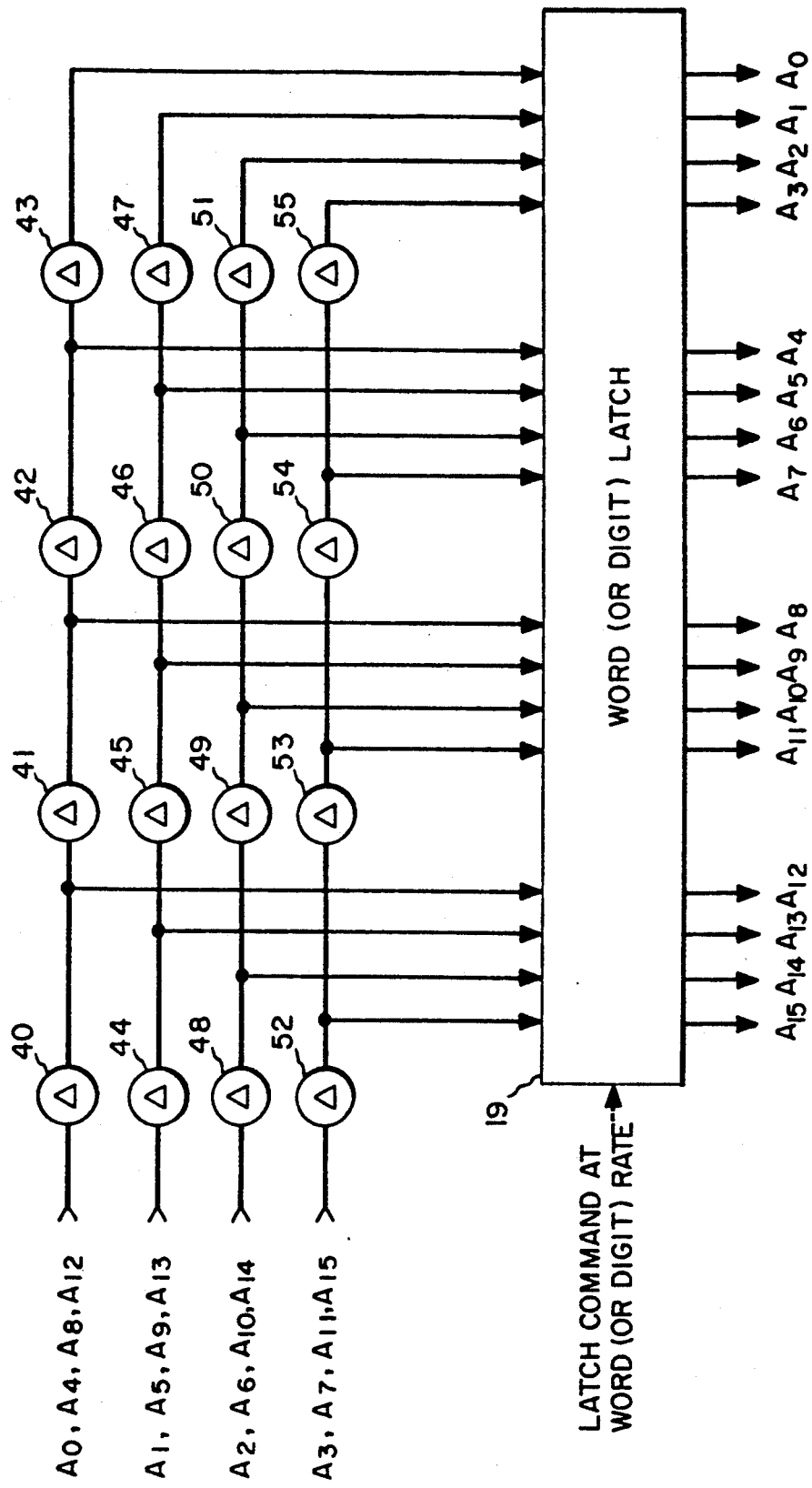
Figure 12:
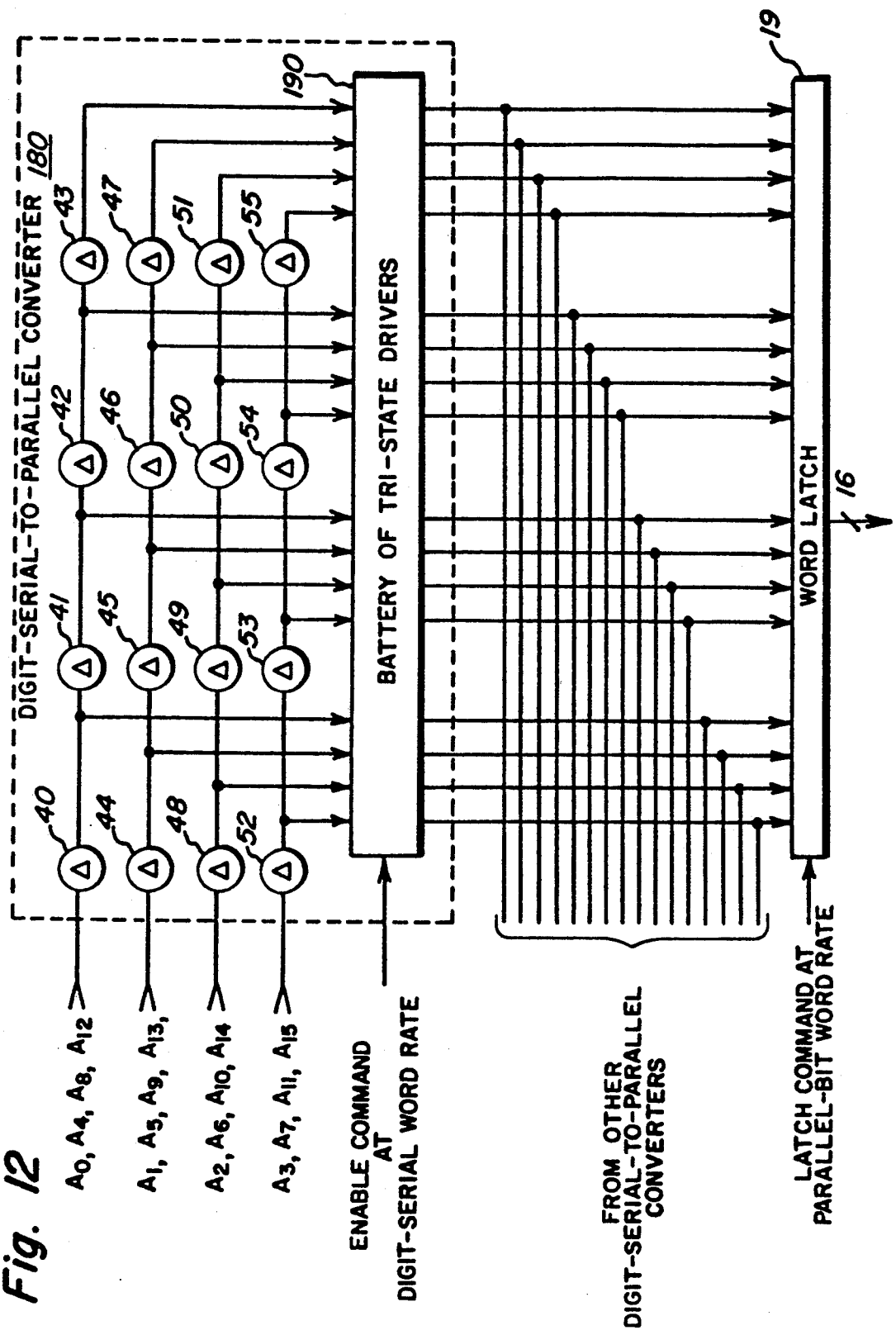
Figure 13:
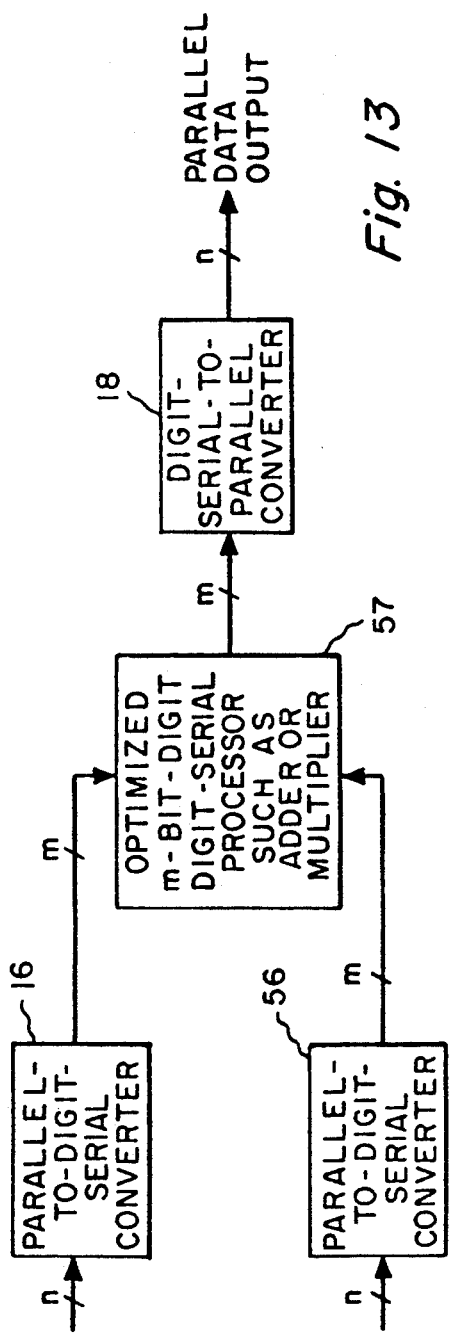
Figure 14:
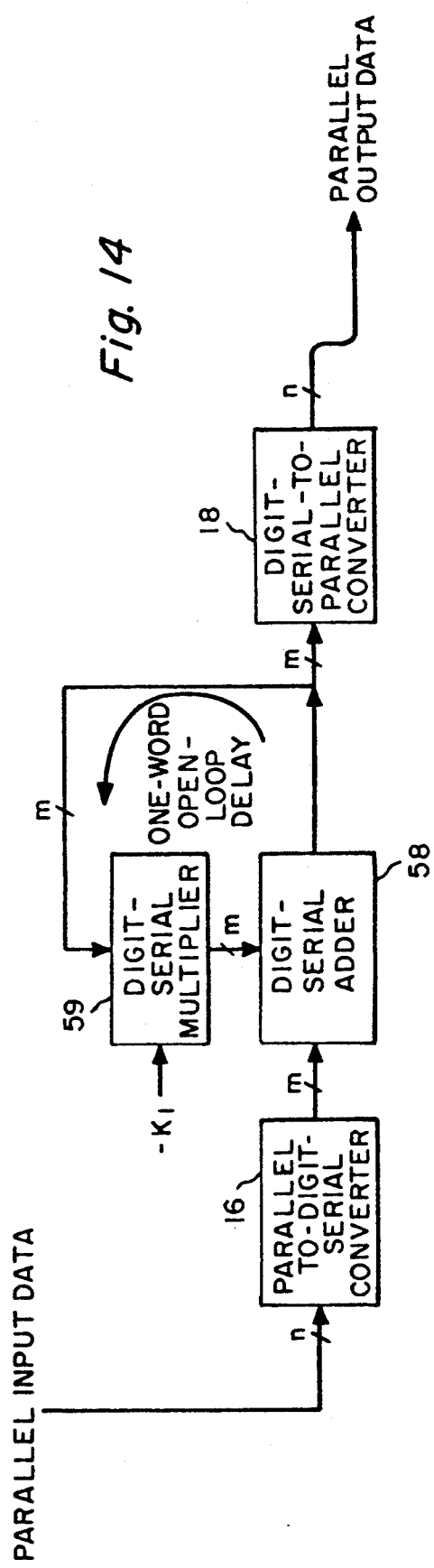
Figure 15:
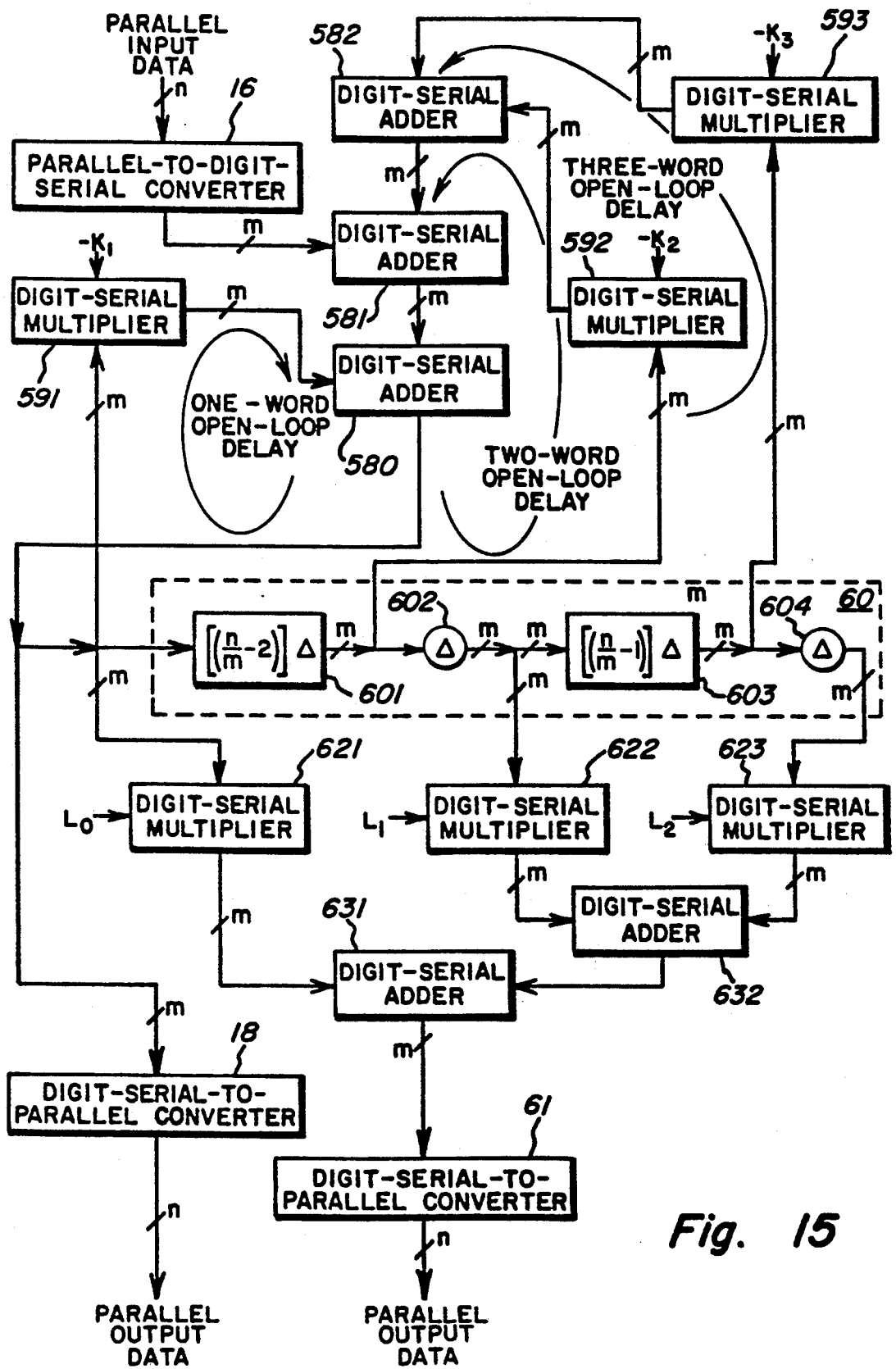
Figure 16:
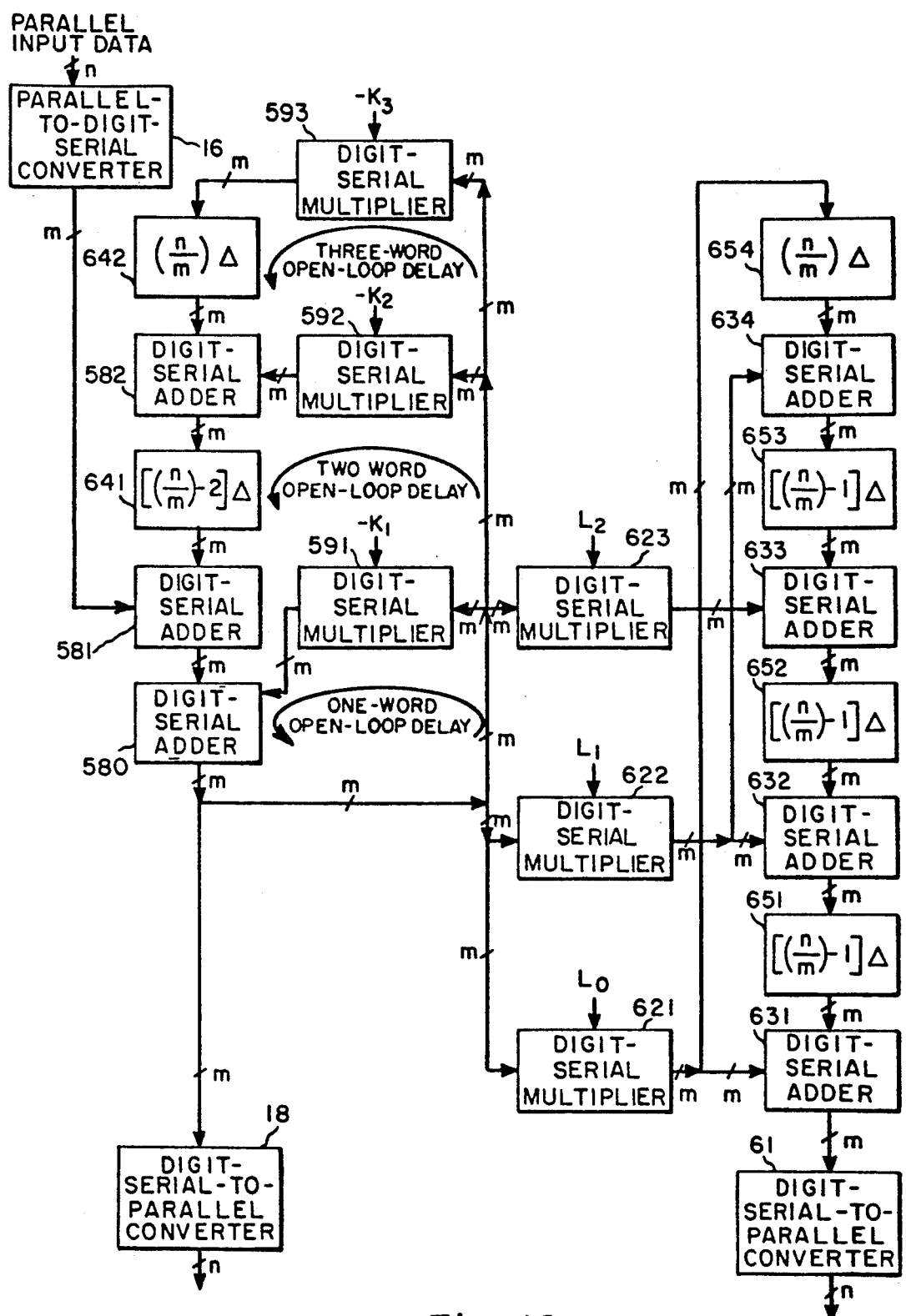
Figure 17:
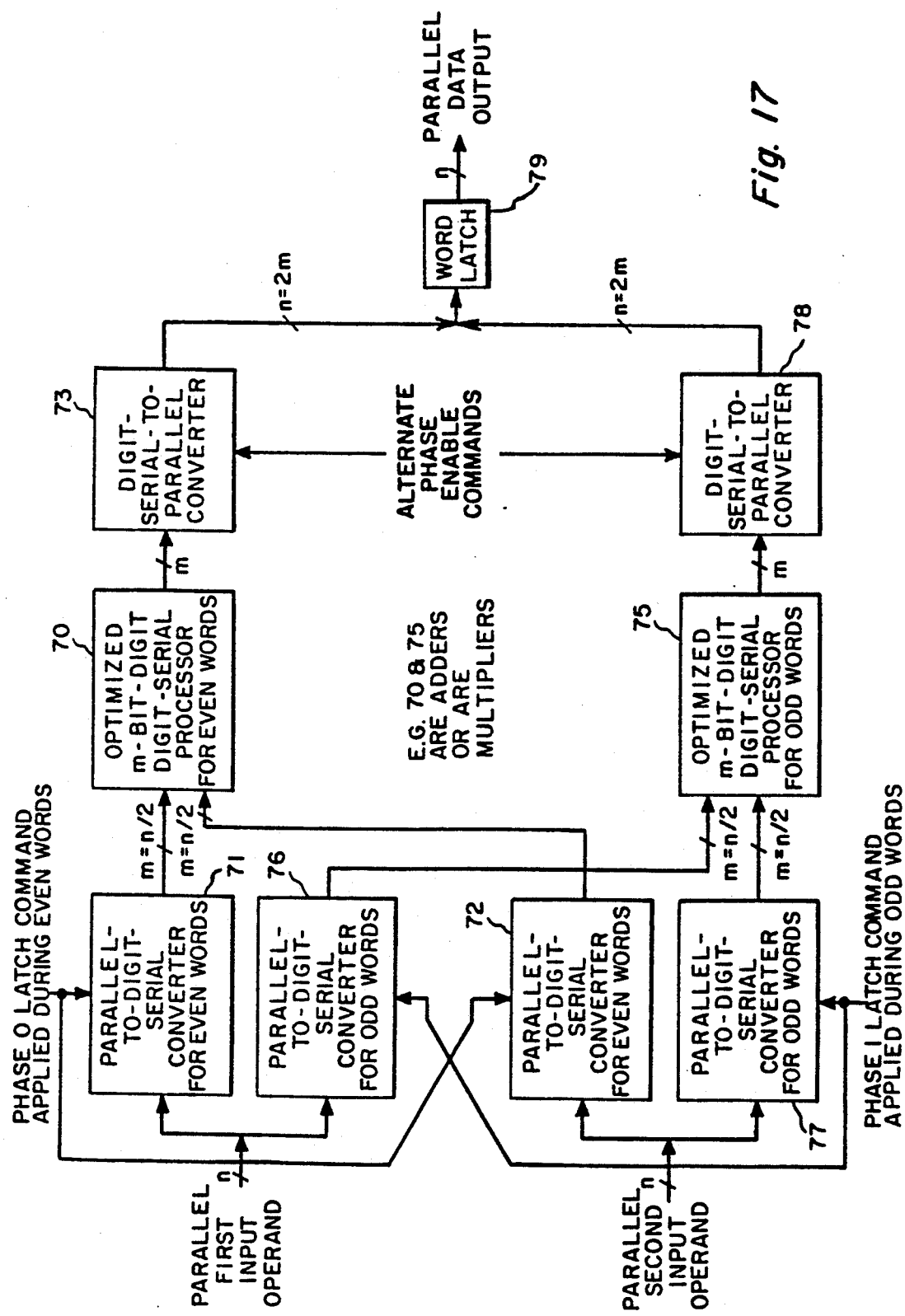
Figure 18:
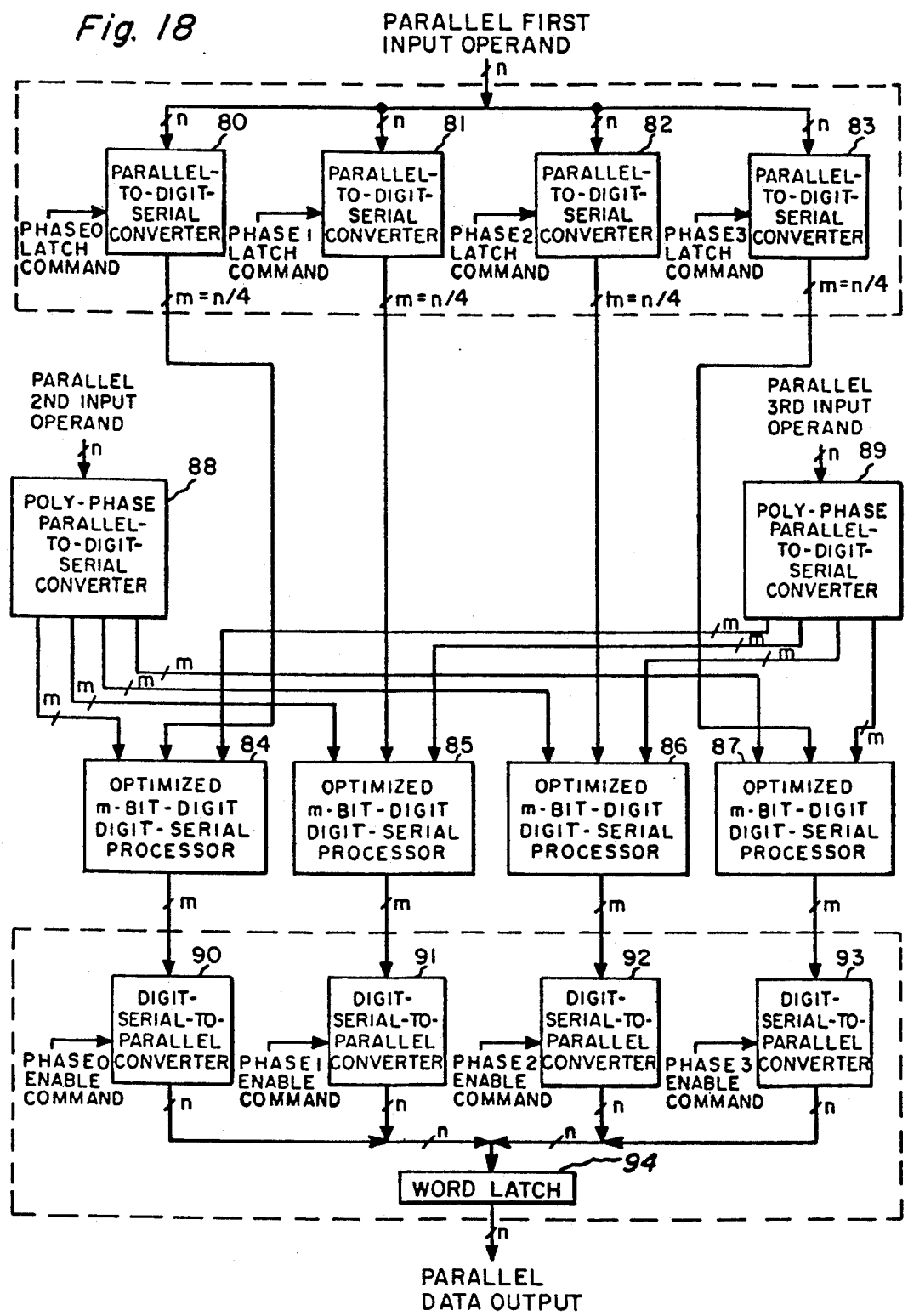
Figure 19:
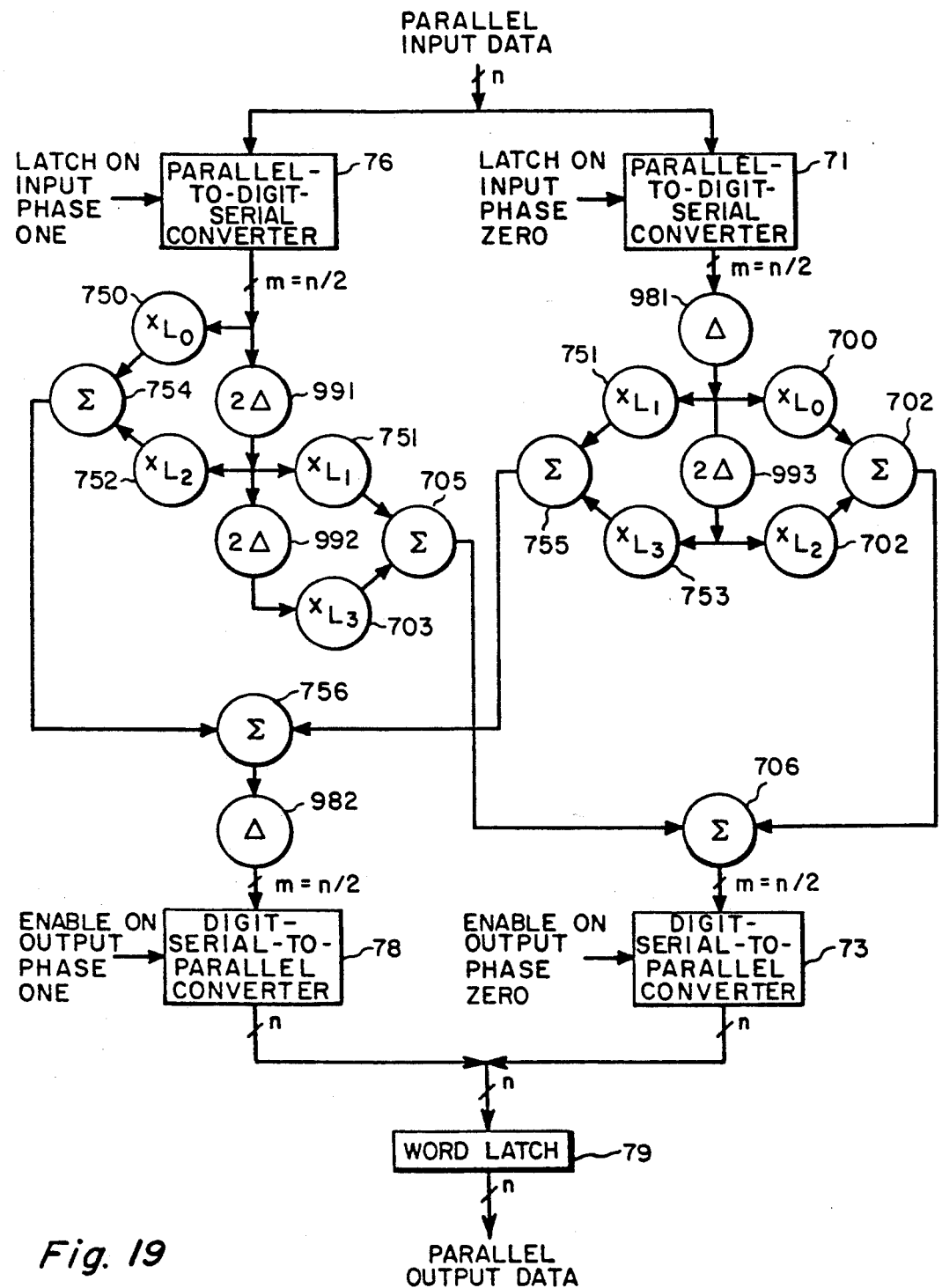
Figure 20:
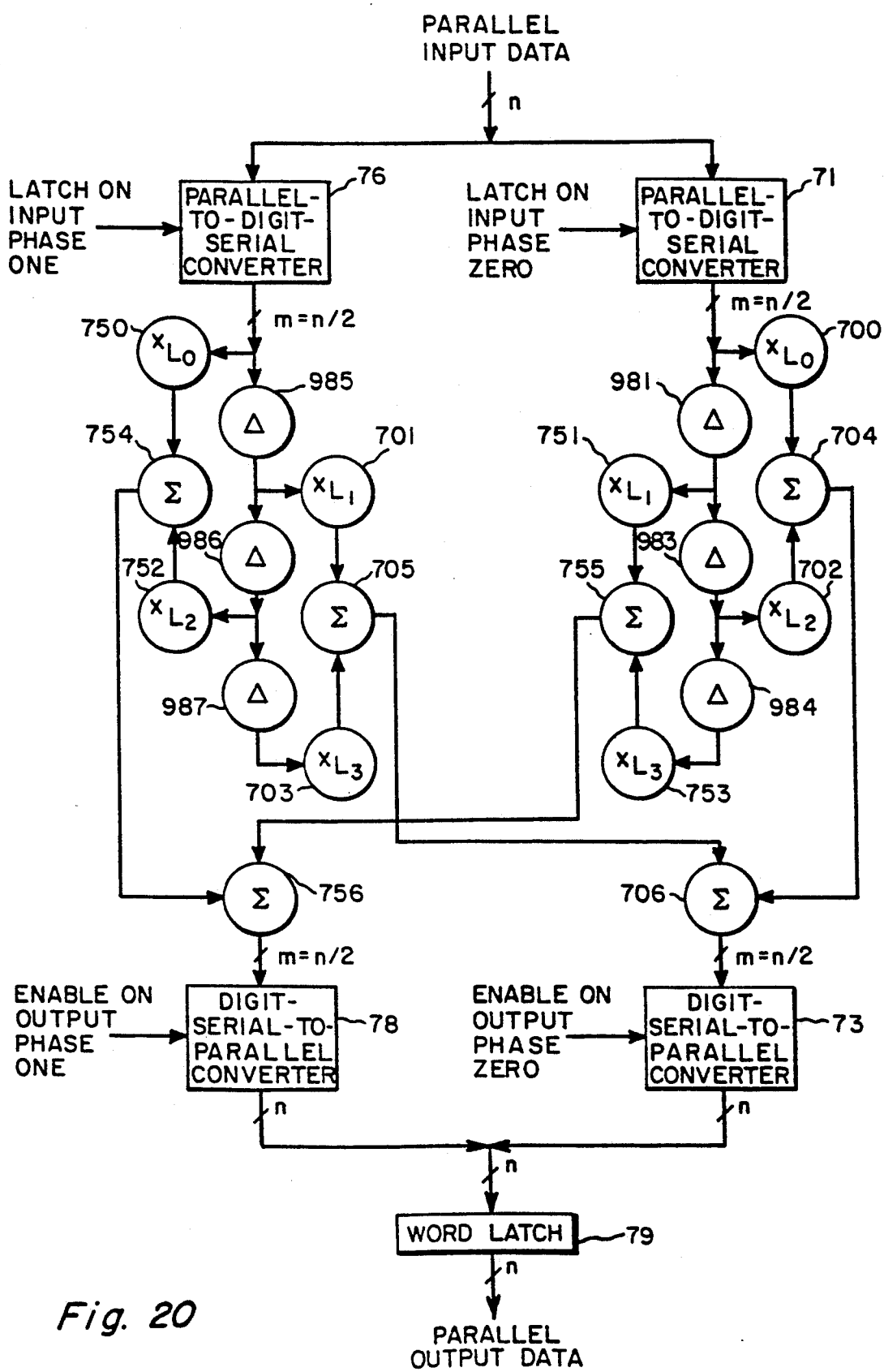
Figure 21:
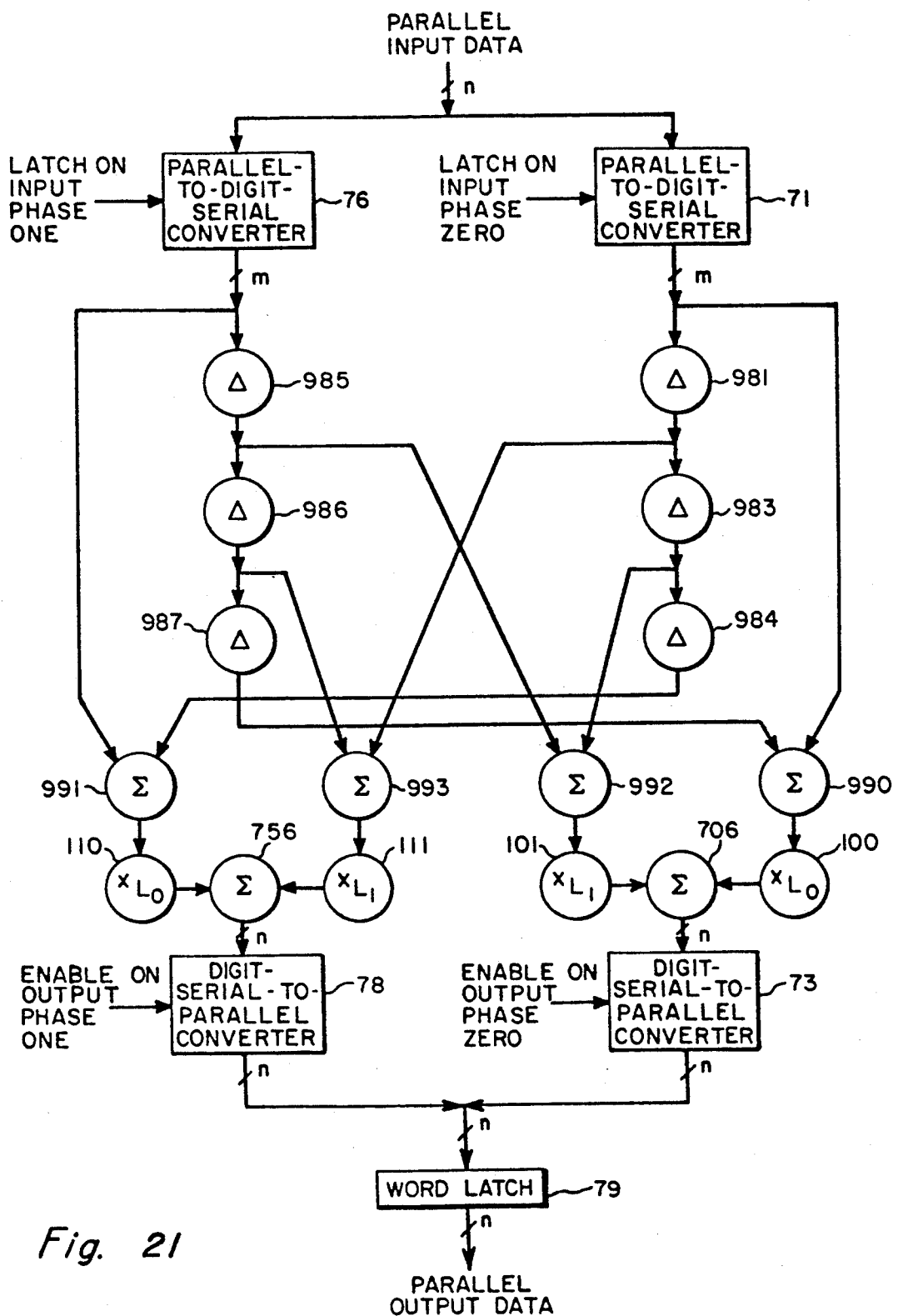
Figure 22:
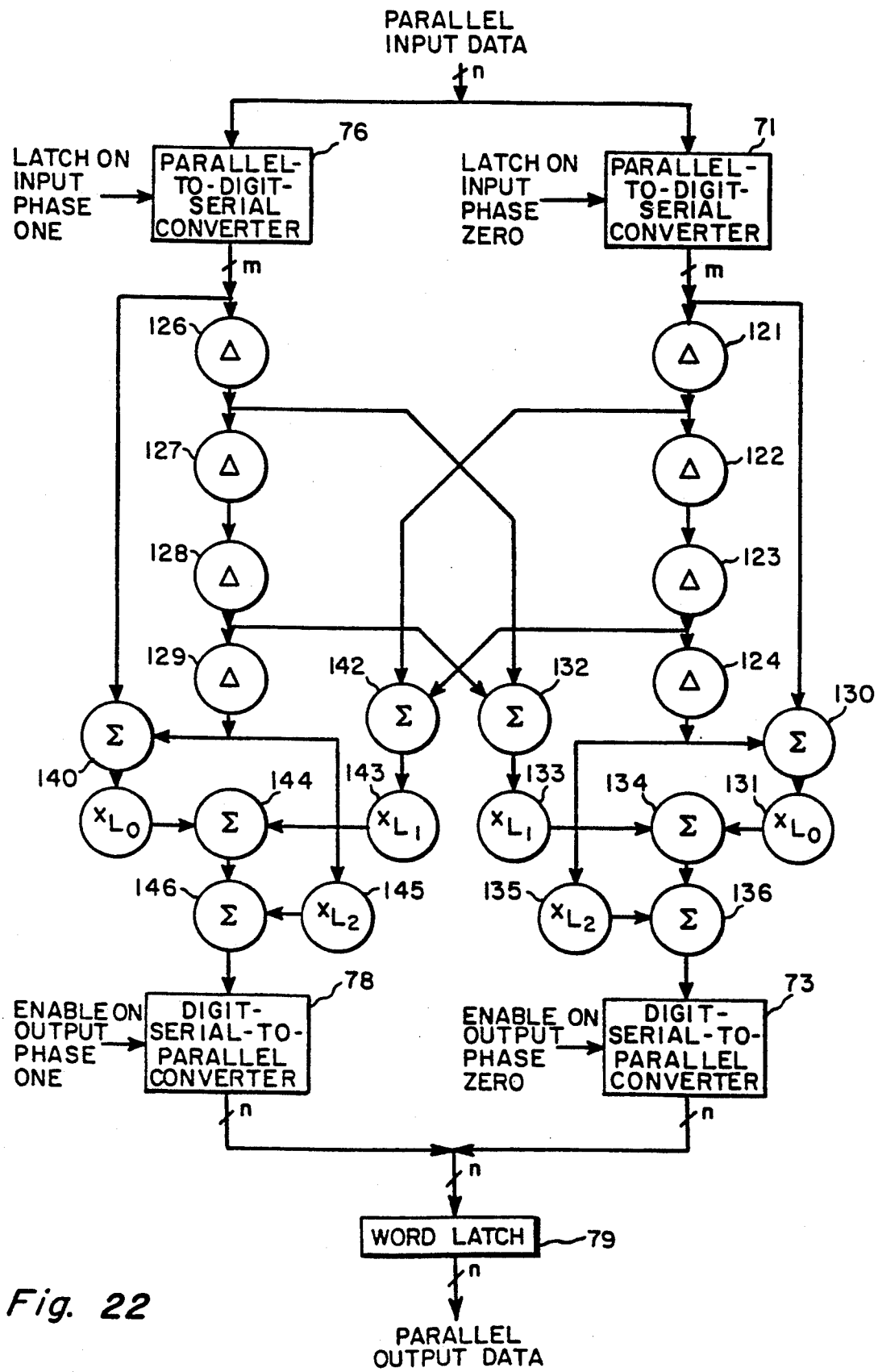
Figure 23:
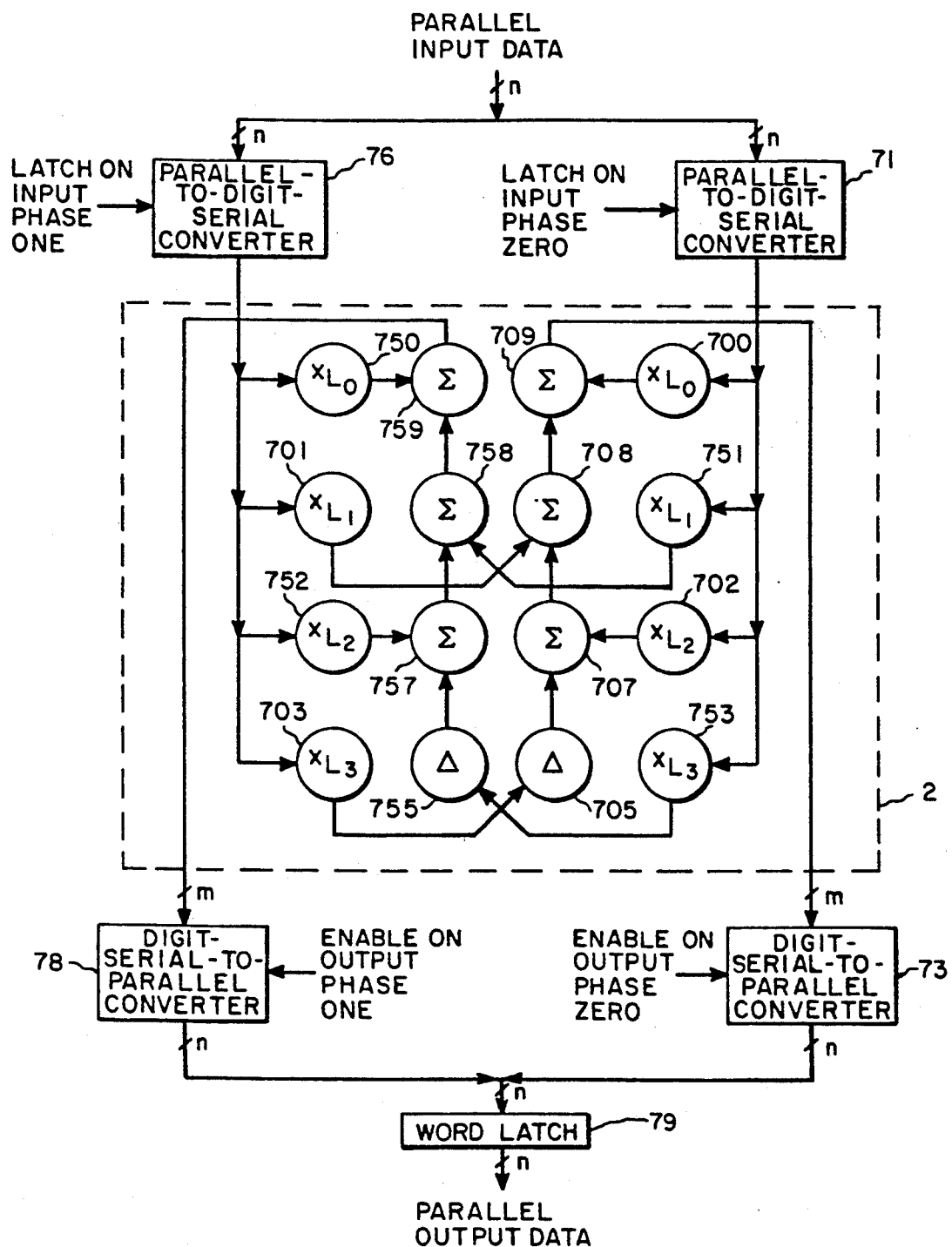
Figure 24:
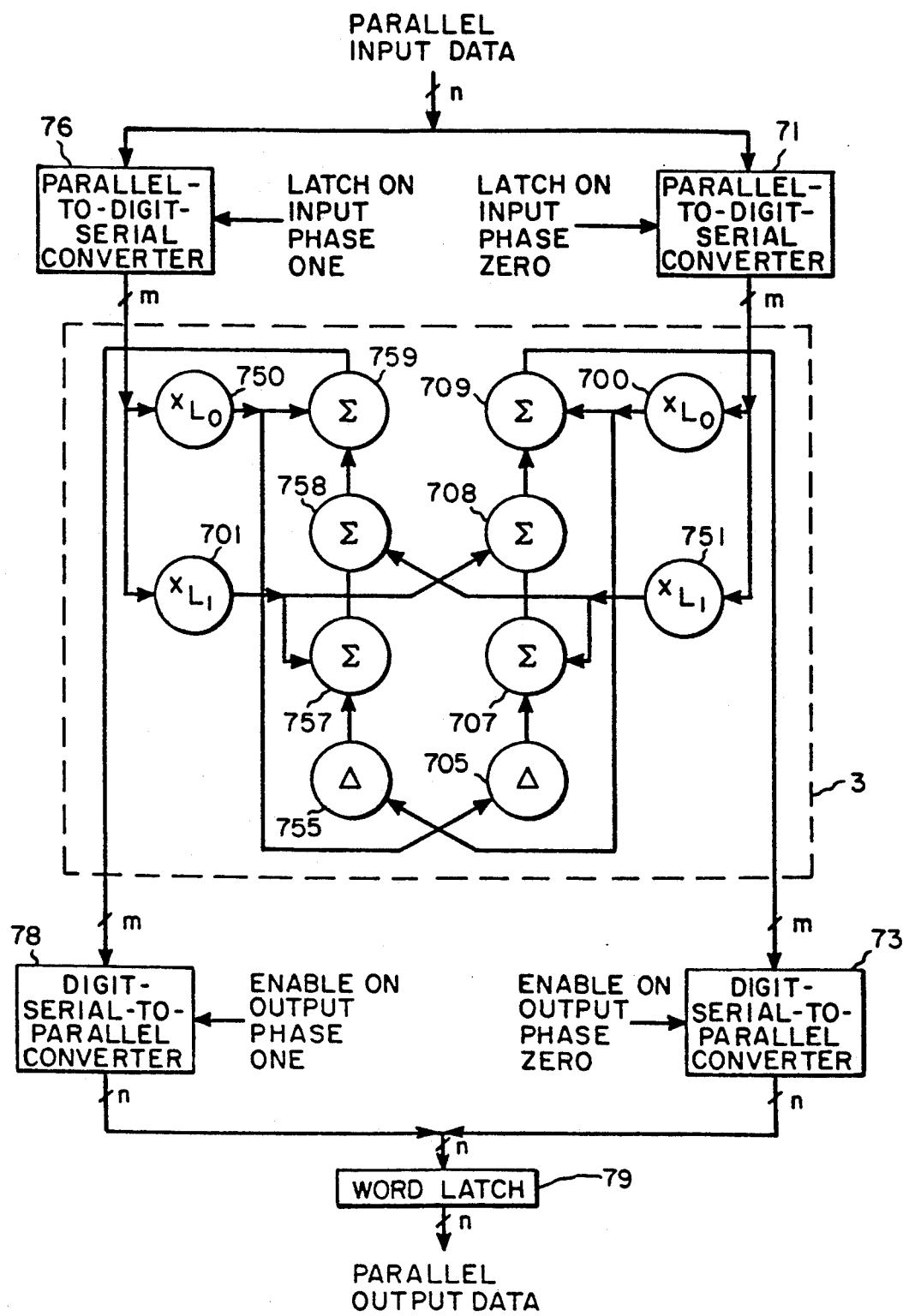
Figure 25:
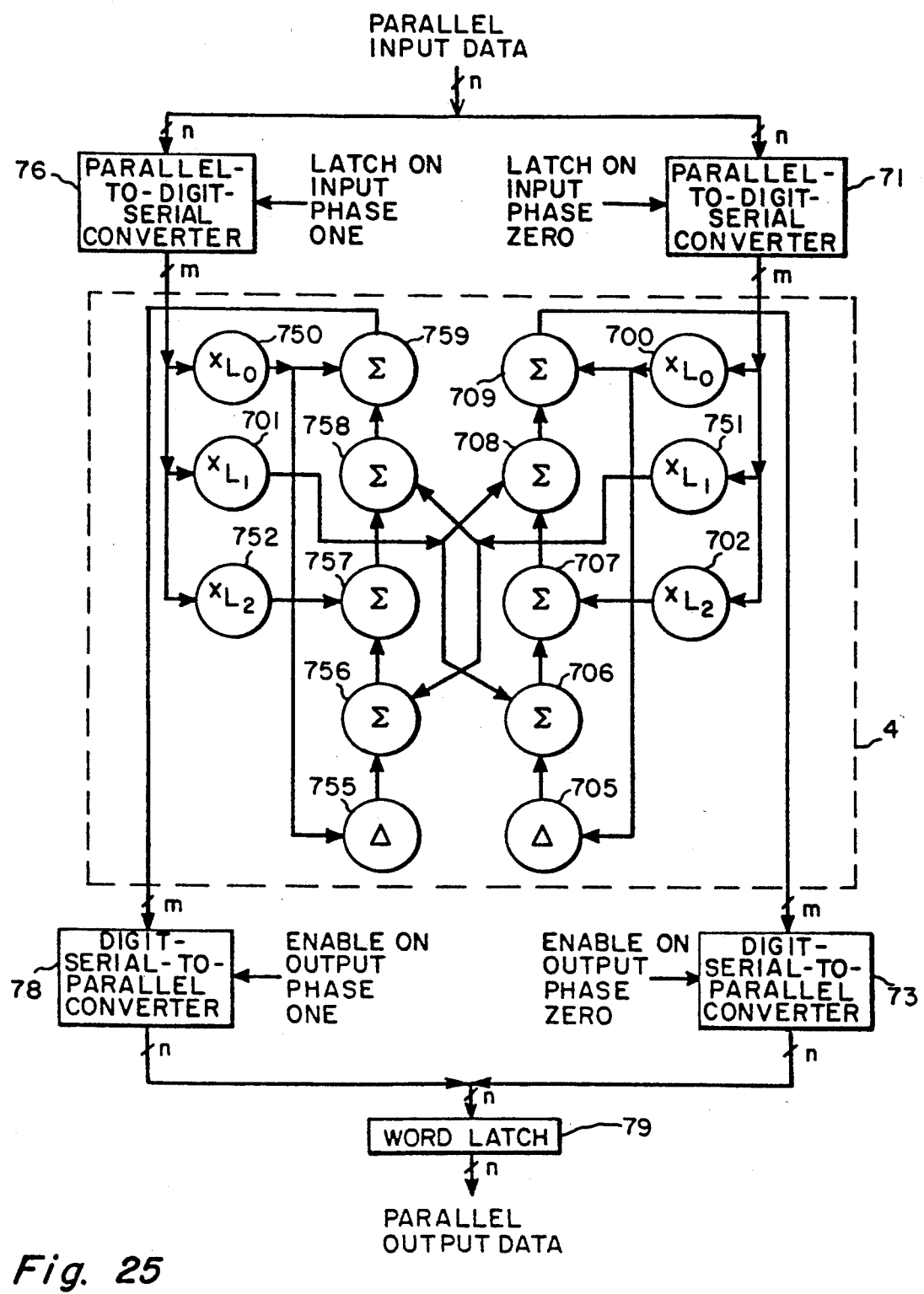
Figure 26A:
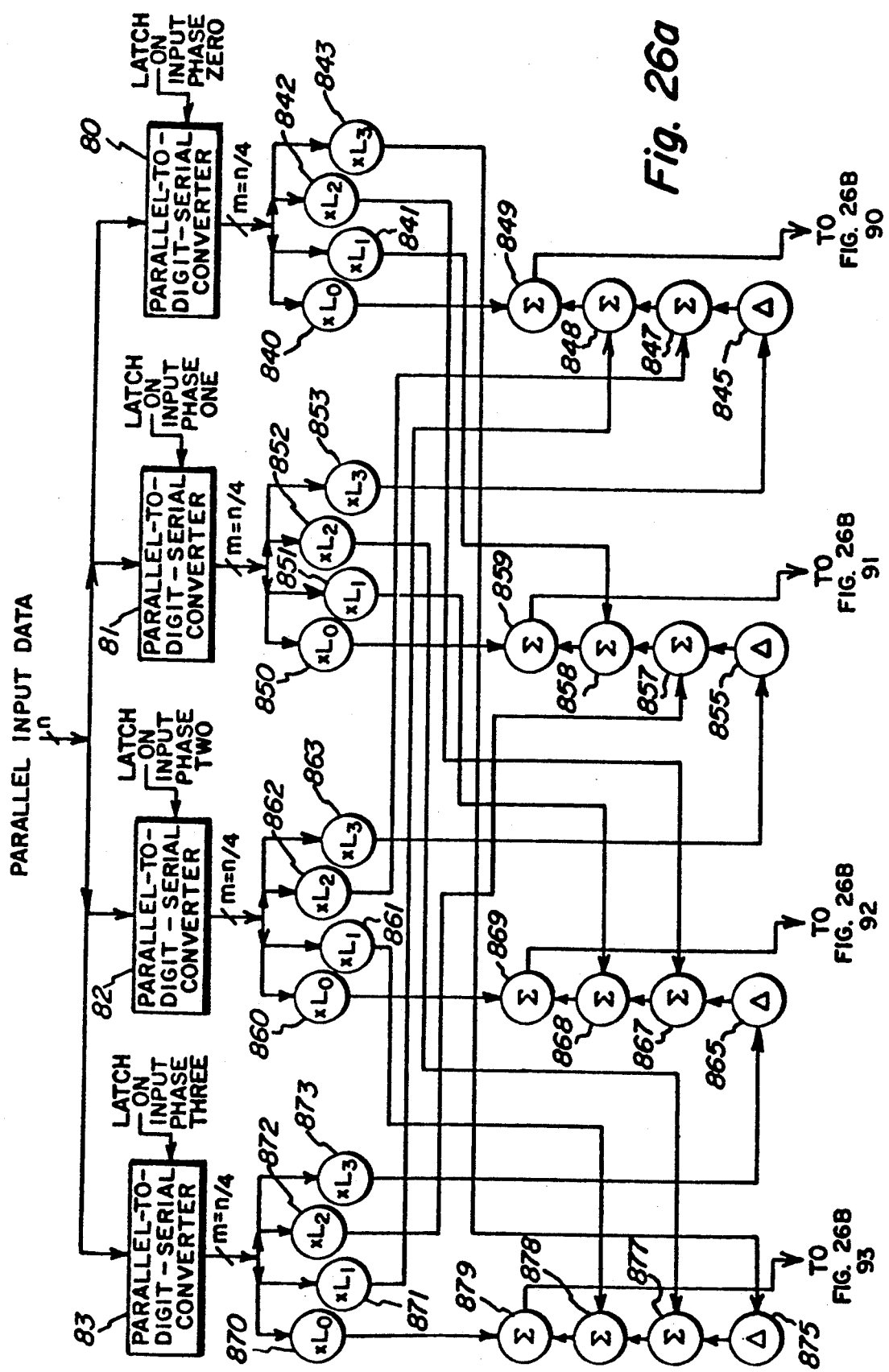
Figure 27:
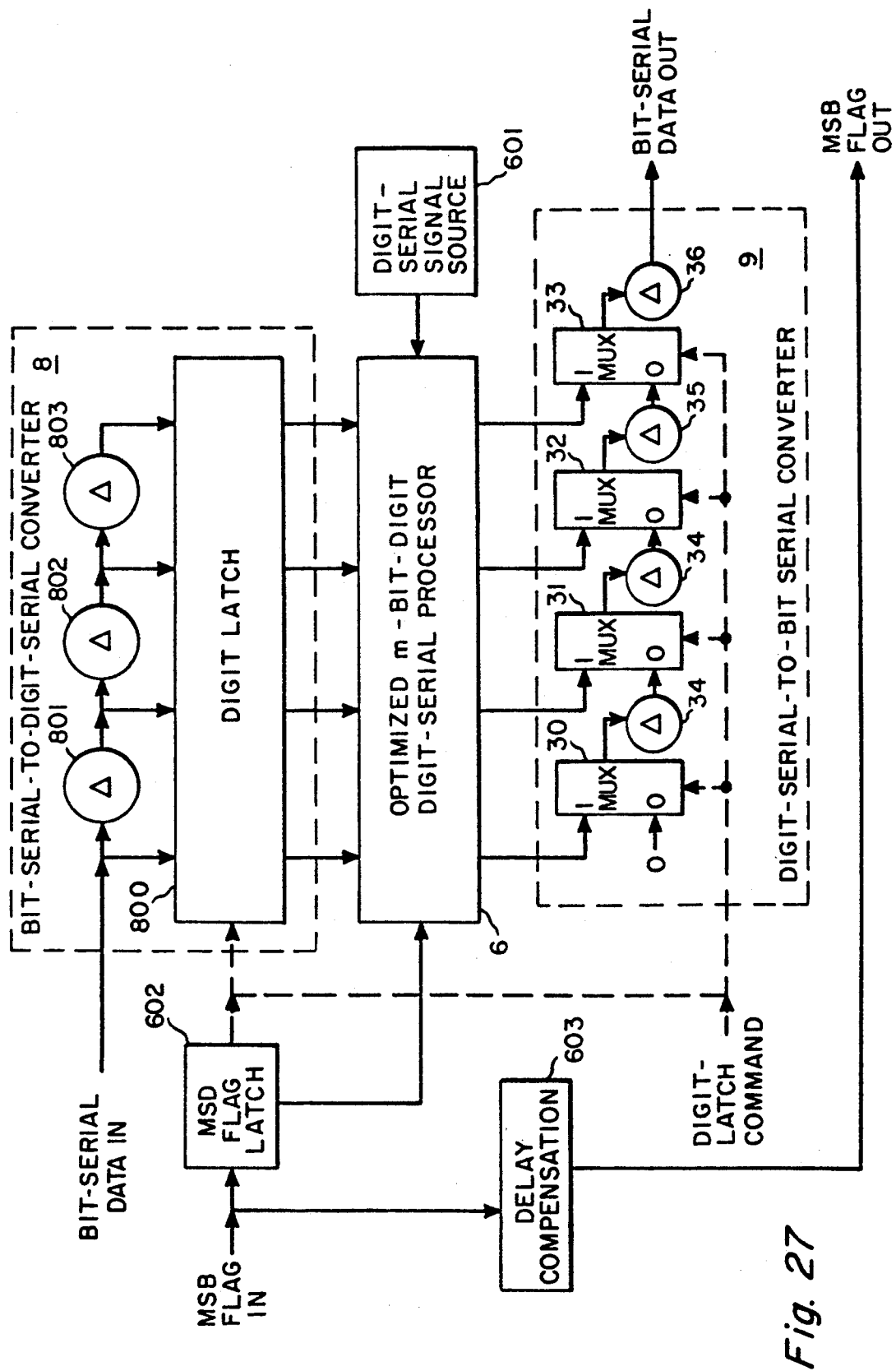
Figure 28:
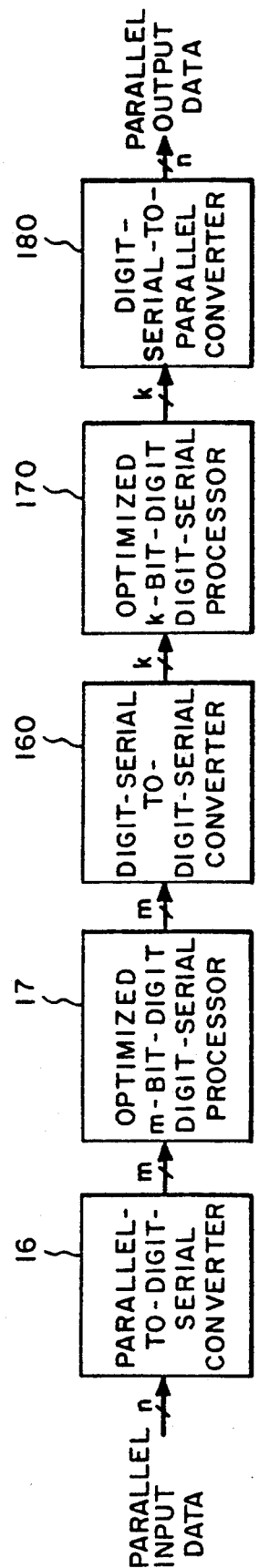
Figure 29A:
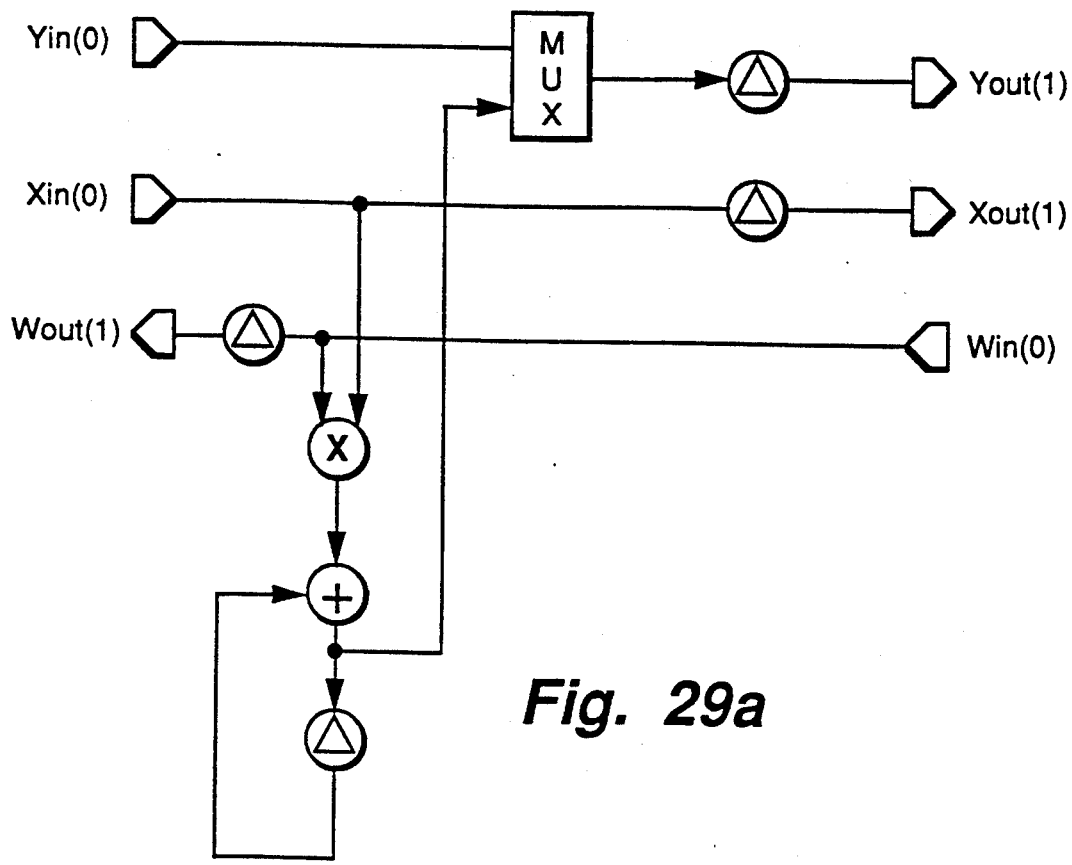
FIG. 29a is a schematic diagram of a prior-art convolution array cell constructed using parallel-bit arithmetic.
Figure 29B:
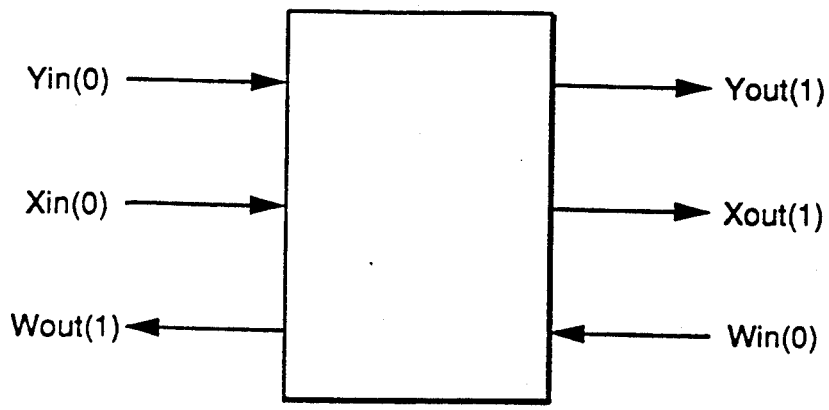
FIG. 29b is a timing diagram for the FIG. 29a convolution array cell.

FIG. 29, comprising FIGS. 29a and 29b considered together as a unit, reproduces FIG. 6 of Kung's paper and shows a convolution cell that is replicated in an array of convolution cells. This array is an example of a design where the inventors' technique for designing systolic arrays will work well. Coefficients (Win) and inputs (Xin) move from right and left, respectively, while the results remain fixed. The coefficients must be continually repeated from the right. There will be as many cells in the array as the number of coefficients. When the complete set of coefficients have passed a given cell, the computation at that point is complete. The output data is then latched into a shift register and shifted out systolically (Yout). The latching is triggered by the last coefficient passing that cell. An extra latch signal, not shown, must be shifted with the coefficients to control the multiplexor. For the sake of simplicity, FIG. 29 and higher numbered figures of the drawing do not show the circuitry necessary for selecting the multiplexer or for resetting the accumulator. Since the coefficients move left and the outputs move right, it may be seen that the output values, similarly to the inputs, will be separated by unused values.

Figure 30:
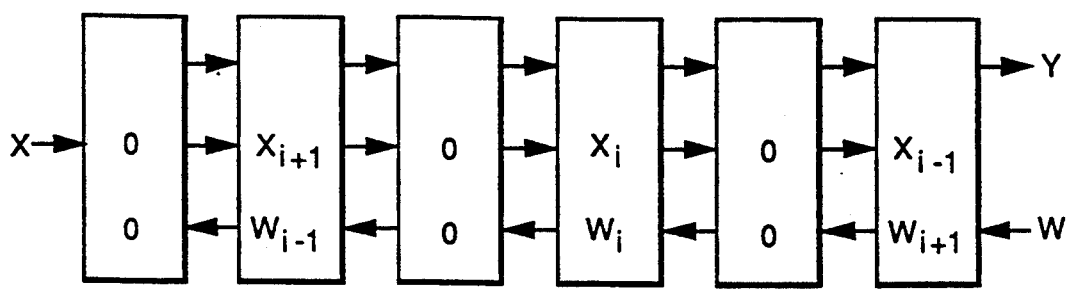
FIG. 30 is a more detailed schematic diagram of the FIG. 29a convolution array cell as constructed using parallel-bit arithmetic, with the positions of parallel-bit data being indicated.
Figure 31A:
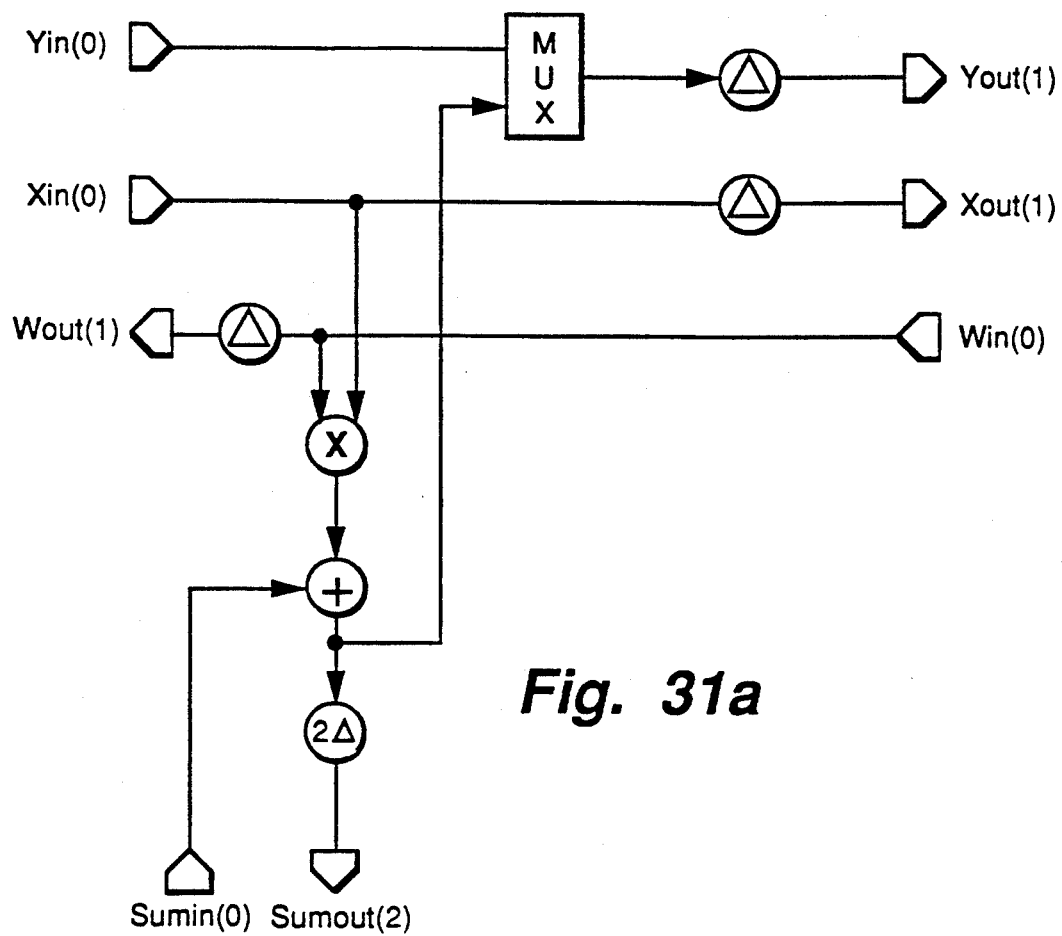
FIG. 31a is a schematic diagram of the FIG. 29a convolution array cell with modifications.
Figure 31B:
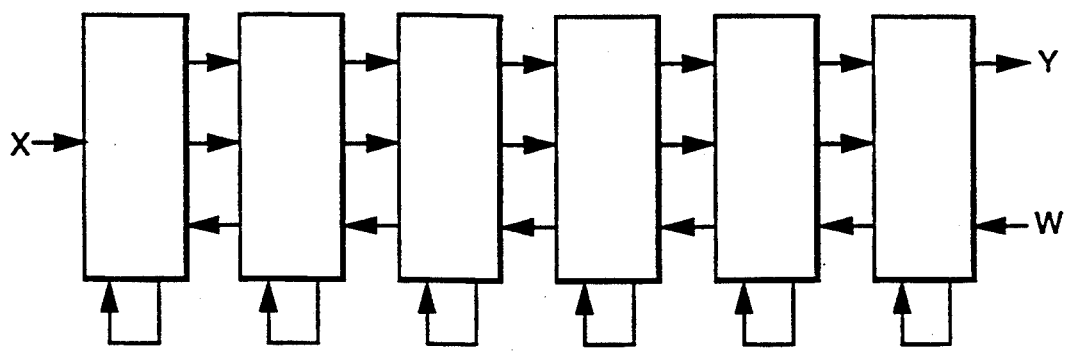
FIG. 31b is a timing diagram for the FIG. 31a convolution array cell.

FIG. 30 shows the convolution array with positions of data indicated. Note how it is necessary for the X and W data to have interleaved values in order that succeeding coefficients and input data meet correctly. Careful consideration of the array in FIG. 30 reveals that the dummy interleaved samples actually must be zeros. The inventors prefer a slight alteration to this array, changing the convolution cell of FIG. 29a to that shown in FIG. 31a by including a further delay element in the feed-back loop. To avoid feed-back loops inside the processor cell, the feed-back loop is broken; and a feedback loop outside the cell is assumed to exist, as shown in FIG. 31b. The reasons for prefering this configuration will become clearer further on. The modified array using the convolution cells of FIGS. 31a and 31b is advantageous over the array using the convolution cells of FIGS. 29a and 29b in that the interleaved dummy values may be arbitrary. In fact, two independent interleaved computations may take place on the array.

This design, requiring a data rate of one sample every two systolic cycles, is an indication that it may be implemented in digit-serial arithmetic using a digit-size equal to one-half the word size, thereby achieving the required data rate of two clock cycles per data value. The difference is that, instead of the data being propagated in parallel with an unused cycle in which dummy data is propagated, the data transmission is spread out over the two available clock cycles, one digit in each cycle.

Figure 32A:
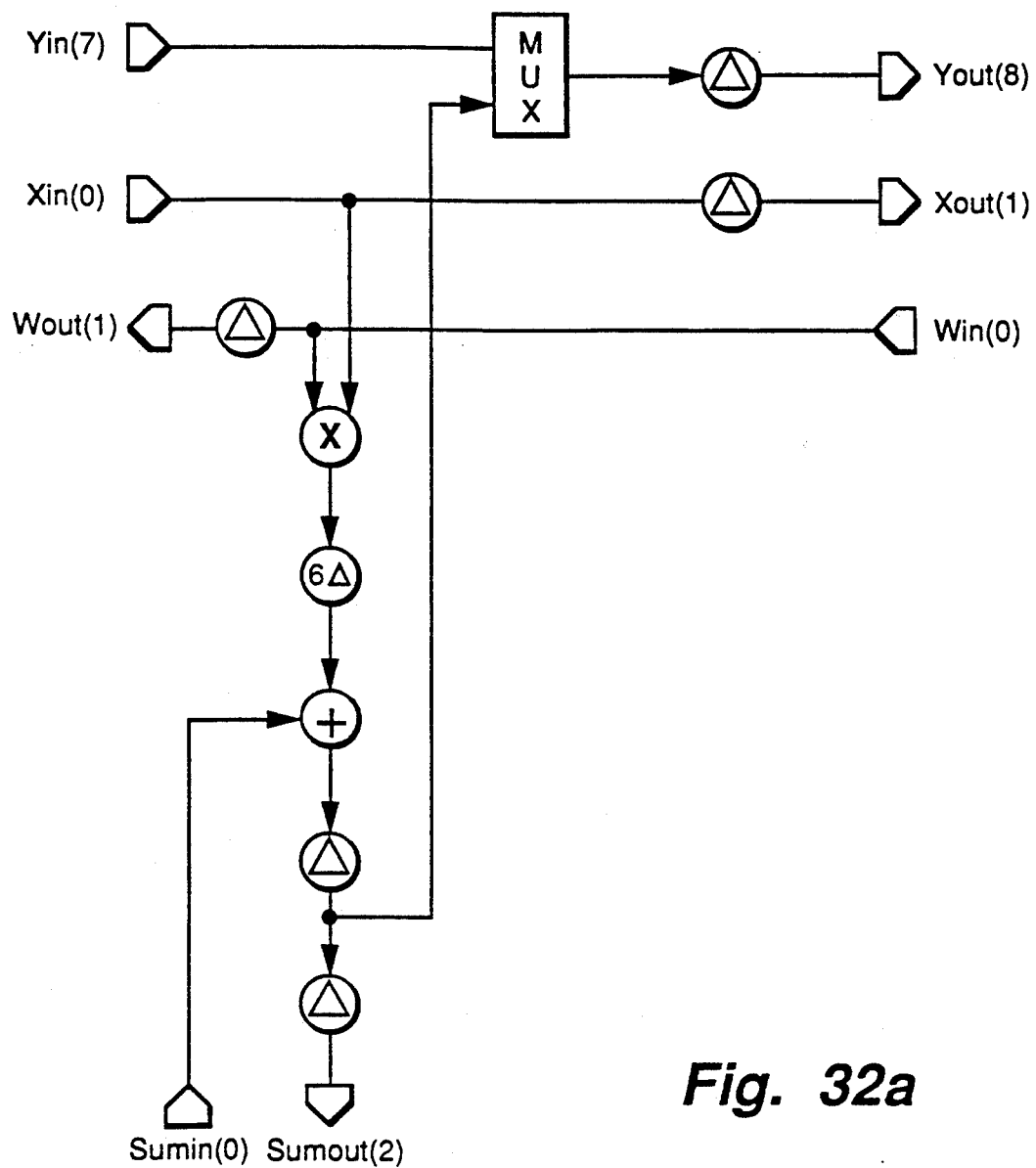
FIG. 32a is a schematic diagram of a convolution array cell constructed in accordance with the invention, using digit-serial arithmetic.
Figure 32B:
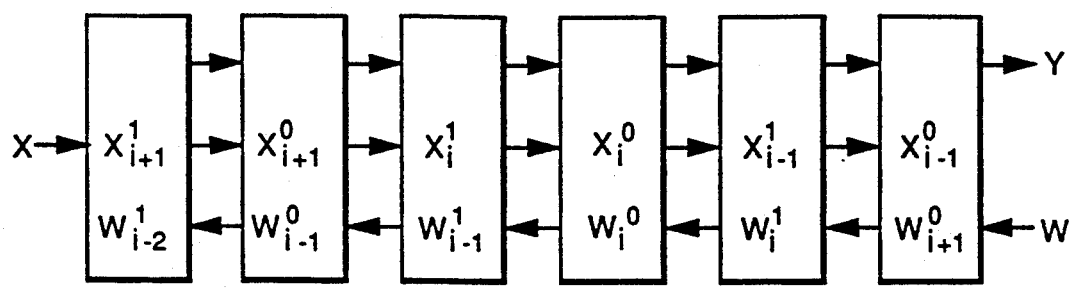
FIG. 32b is a more detailed schematic diagram of the FIG. 32a convolution array cell as constructed using parallel-bit arithmetic, with the positions of digit-serial data being indicated.

FIG. 32a shows the convolution cell implemented in digit-serial arithmetic with two digits per word, and FIG. 32b shows the complete array indicating positions of digits within each cell. A latency of six clock cycles is assumed for multiplication, and a latency of one cycle is assumed both for addition and for multiplexing. Superscripts 0 and 1 indicate the two digits of each data word. Note that as the weights move right and the coefficients move left, the corresponding digits of the consecutive inputs and coefficients meet, allowing the computation to be carried out on digit-serial data. The output latches are enabled when either of the two digits of the completed result are present in a cell. This will be seven and eight cycles after the arrival of the final coefficient, since the output will be delayed by the latency of the digit-serial computation. In two consecutive clock cycles the two digits of the result are latched on to the output shift register. One cell generates the second digit of its result while the cell on its left is already generating the first digit. In the next clock cycle, the "latch window" has moved one position left and the output shift register values have moved one position right. It can be verified that the output words will be shifted out sequentially in a continuous stream in digit-serial format. The difference in timing between this digit-serial array and the bit-parallel one is due to the latency of the multiplication operator (assumed to be six cycles). This latency delays the output of the adder, so ultimately the Y out is delayed.

Consider the advantages of the digit-serial approach. First, the computational elements are smaller, since the digit-serial computations work on only half the bits at a time. Size of digit-serial operators was discussed in U.S. Pat. No. 4,942,396. For a large word size, the area saving will approach a factor of two, because the waste associated with unutilized cells has been avoided. Secondly, the clock-rate which may be achieved will be faster, since the individual computations are smaller. For instance, the time taken to do a W * W bit multiplication may be as much as twice the time required for the W * W/2 bit multiplication required in each clock cycle of a digit-serial multiplication with digit size W/2. This effect is also consider in U.S. Pat. No. 4,942,396. Thirdly, the amount of interconnect will be halved, since data lines are digit-wide instead of word-wide. Taken all together, this adds up to an area-time saving which exceeds two times and may even approach four times for large word sizes.

Figure 33:
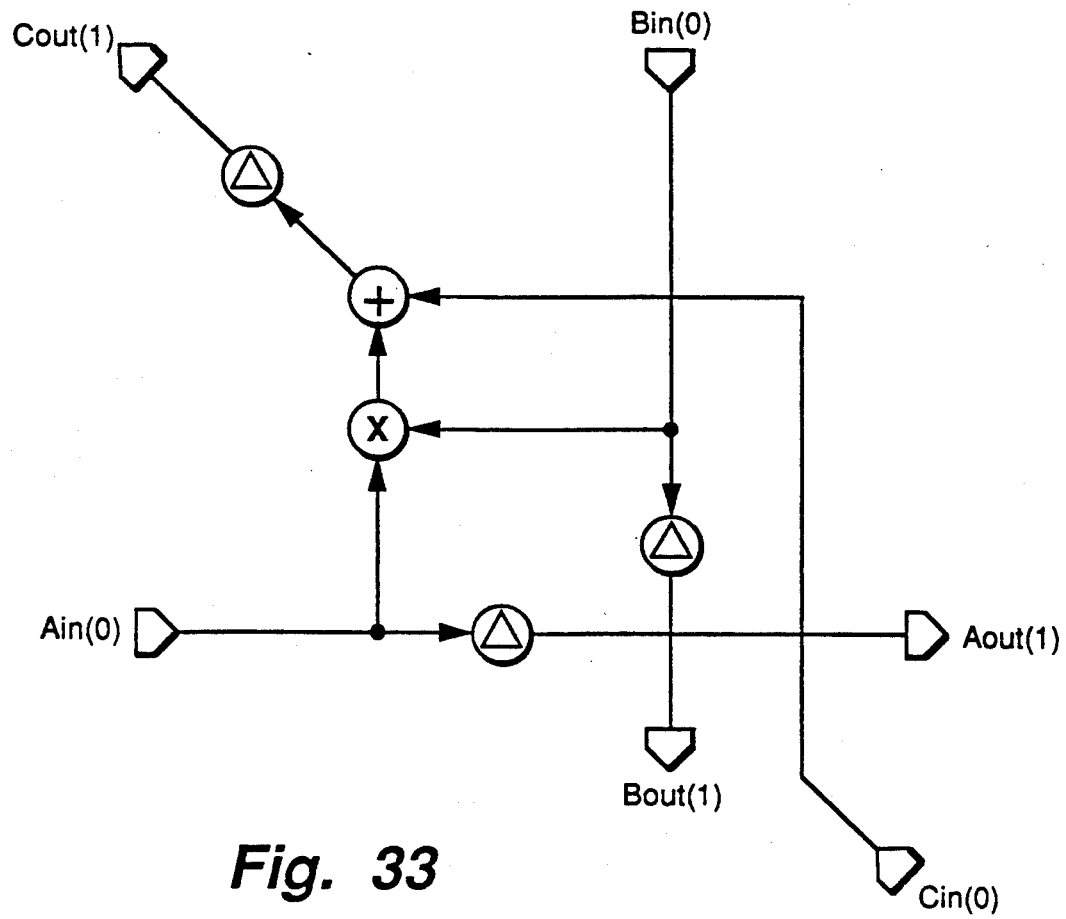
FIG. 33 is a schematic diagram of a parallel-bit band matrix multiplier cell.
Figure 34:
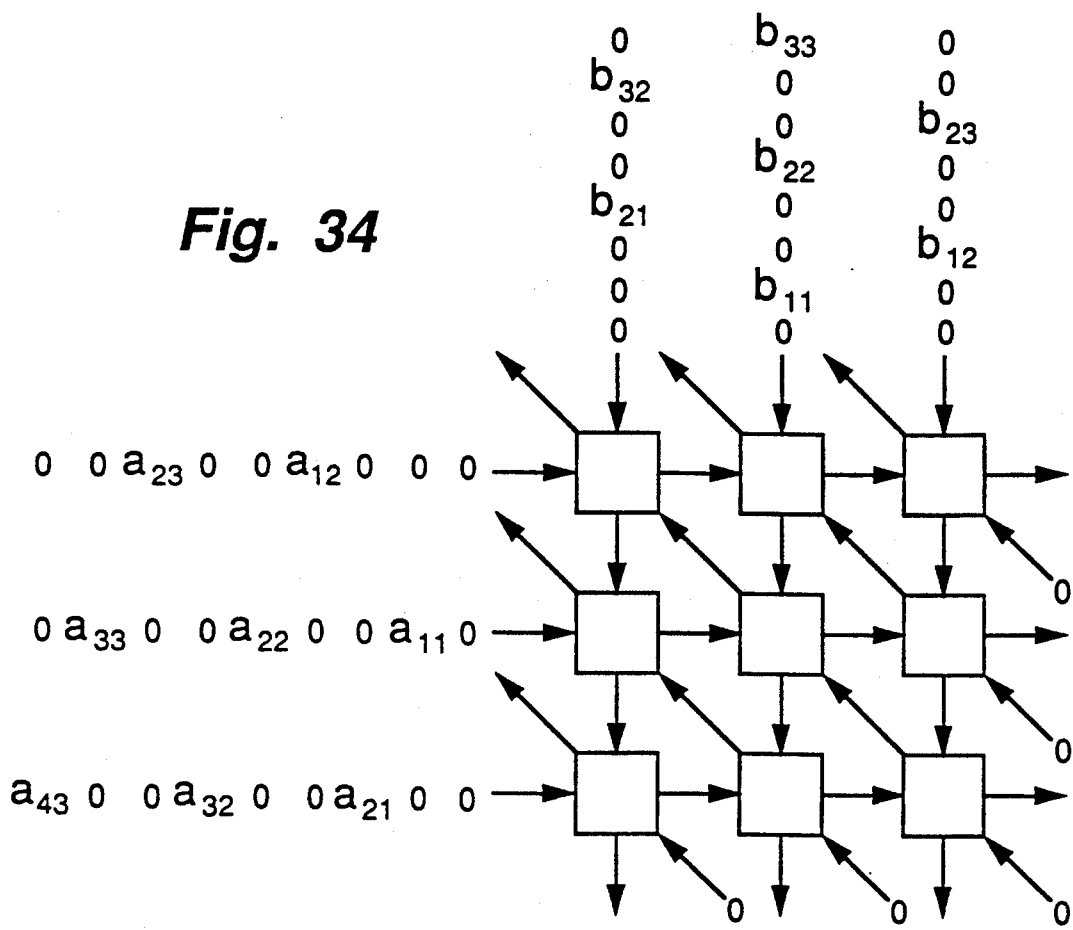
FIG. 34 is a schematic diagram of an array of FIG. 33 band matrix multiplier cells.

Now consider band matrix multiplication, which is a fundamental systolic application. It is appropriate for the demonstration of digit serial techniques since, in one systolic form, $\alpha=3$. FIG. 33 shows a band matrix multiplier cell. FIG. 34 shows a band matrix multiplier array for a pair of matrices with a band of width 3, which array comprises band matrix multiplier cells per FIG. 33. Note that it is necessary to separate the valid data with two dummy or zero values so that the computation is correctly timed.

Figure 35:
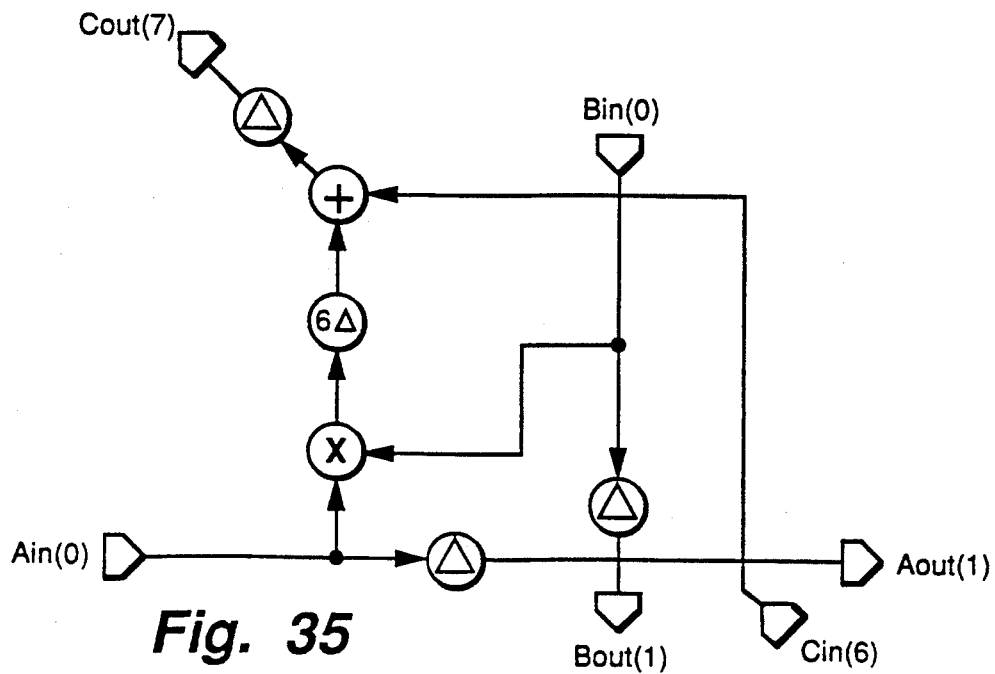
FIG. 35 is a schematic diagram of a digit-serial band matrix multiplier cell, constructed in accordance with the invention.
Figure 36:
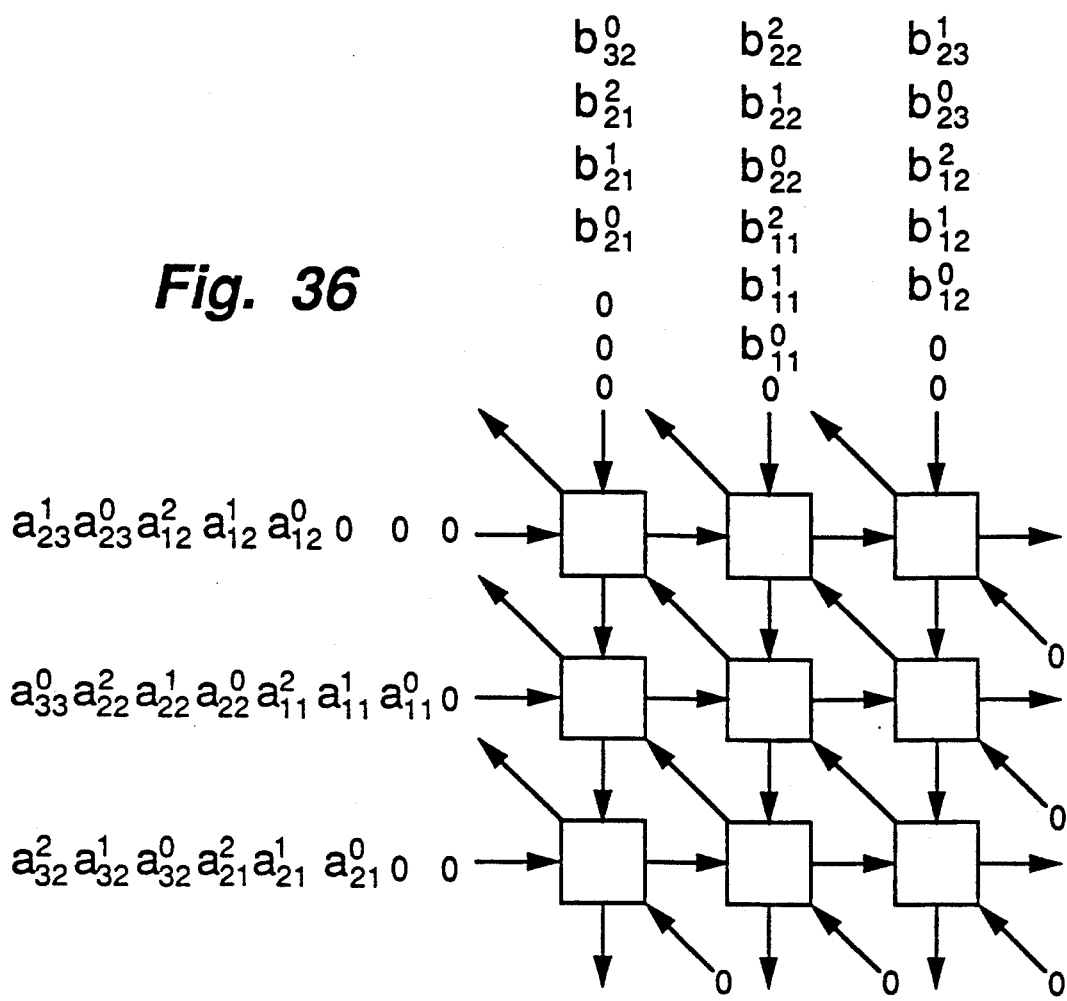
FIG. 36 is a schematic diagram of an array of FIG. 35 band matrix multiplier cells.

To proceed with converting the parallel-bit FIG. 34 band matrix multiplier array to a digit-serial array, each parallel-bit multiplier-adder is replaced by a digit-serial multiplier-adder of width $d=n/3$. It is assumed that the multiplier will have latency of 6, and the adder will have latency of 1. FIG. 35 shows the resulting basic band matrix multiplier cell with timing for digit-serial operators. FIG. 36 shows the complete array constructed from the FIG. 35 band matrix multiplier cells and the input values for this digit-serial array. This example will be considered more closely further on in this specification.

Throughput is not decreased in the digit-serial case. In fact, for a twelve bit word, the net throughput may be increased by a factor of approximately 1.67 (using estimation methods as in U.S. Pat. No. 4,942,396), since the digit-serial array can be clocked faster than the fully parallel array. Similarly, we can approximate the change in array area for a twelve-bit word size as a two times reduction. Routing area in the array will also be reduced by a factor approaching $\frac{1}{2}$. The overall improvement in AT is therefore about $3\frac{1}{3}$ times.

Digit-serial systolic arrays for performing convolution and band matrix multiplication have now been considered, in addition to the digit-serial systolic arrays for performing FIR filtering shown in FIGS. 19–25 of U.S. Pat. No. 4,942,396. This specification now turns to a more general consideration of the design of systolic systems that use digit-serial processing to fully utilize processing elements.

A systolic array cell may generally be described by two sets of data, the timing of the input and output signals and a description of the computations carried out in that cell. (The model of a systolic cell described here assumes that only one "generation" of each data value is used in the cell; a slightly more general model will be considered further on in this specification.)

The description of the function of the cell can normally be represented by a set of assignments. For instance, for convolution array, the equations are

```
LatchOut  <- LatchIn
Xout      <- Xin
Wout      <- Win
sum       <- Sumin + Xin * Win
Sumout    <- if (LatchIn) then 0 else sum
Yout      <- if (LatchIn) then sum else Yin
```

Here for completeness, the complete function of the cell is shown, including the means for resetting the accumulated convolution value and for latching the output into the output shift register. LatchIn→Latchout pair is a signal that moves right to left along with the X input, marking the last X value.

For the band-matrix example, parallel case, the assignments are (this time ignoring reset):

```
aout <- ain;
bout <- bin;
cout <- cin + ain * bin.
```

Figure 37:
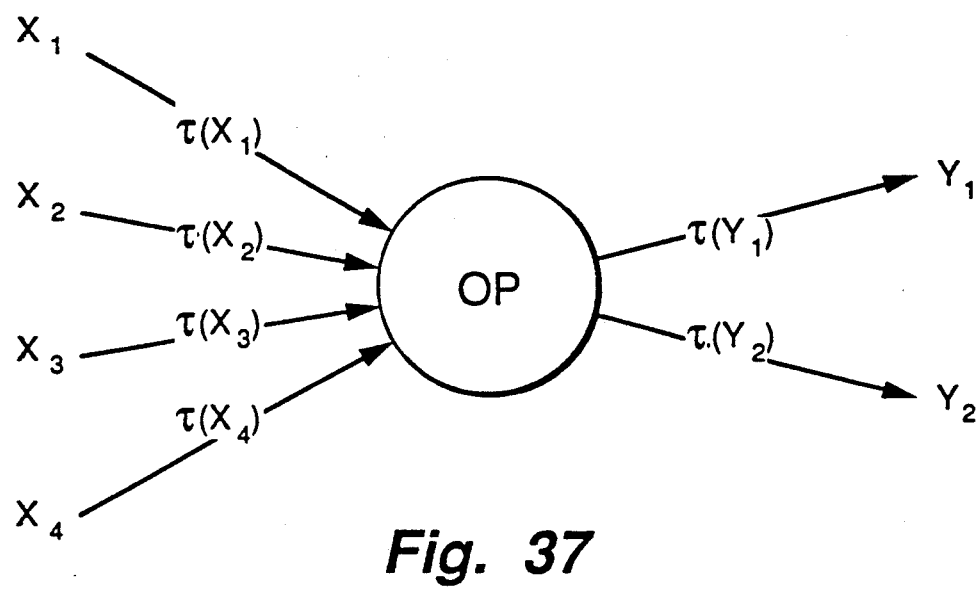
FIG. 37 is a timing diagram of a general operator.

These functional descriptions of the cells ignore all timing issues. The timing can be expressed by specifying an expected arrival time of the input signals and the corresponding output time of the output signals, all relative to some arbitrary point in time, represented by 0. For instance, consider FIG. 33. The timing numbers in parentheses associated with each input and output denote the timing values. What this means exactly is: If Ain, Bin and Cin arrive at time 0, then the values Aout, Bout and Cout as determined by the given assignments will be output at time 1. In arrays using digit-serial computation, the time of arrival of a data value is interpreted to means the time of arrival of the leading digit of that value. Note that for the digit-serial version of the same cell, shown in FIG. 35, the Cin input is required to arrive 6 cycles later than the Ain and Bin inputs. Cout will then be ready at time 7. Cin must be delayed to make up for the six-cycle latency of the multiplier. In general, each input $x_i$ or output $y_j$ of a cell in a systolic array has a timing specification $t(x_i)$ or $t(y_j)$ as shown in FIG. 37. This is interpreted to mean that at any time $\tau$, the value $y_j(t+\tau(y_j))$ is computed from the input values $x_i(t+\tau(x_i))$ according to the functional specification of the cell.

Throughout this specification, unless otherwise noted, it is assumed that a systolic cell has no feedback or feed-forward loops. This means that each output value can be expressed as a function of the inputs to the cell, and does not depend on any stored state of the cell. Such a cell will be called a combinational cell. Note that this does not mean that the cell does not contain delay latches. Remark that the cell in FIG. 29 for the convolution array is not combinational, whereas the cell in FIG. 31 is combinational.

Now, individual cells in a systolic array are connected together in a graph, by connecting inputs to outputs of cells. In order to understand the timing in the array, consider the loops in the graph. A loop is a sequence of edges of the graph forming a closed path. Ignore the orientation of edges imposed by the direction of data flow. Instead, assign an orientation to the edges in a loop in such a way that the edges forming the loop are ordered head to tail. Define the length of a loop to be $$\sum_E \tau(\text{tail of } E) - \tau(\text{head of } E) \quad (1)$$

where t is the timing specification of the head or tail of an edge and the sum is taken over all the edges E in the loop. Further, define the period of a systolic array to be the highest common factor of the lengths of all loops in the graph.

Three theorems are presently stated that facilitate analysis of the computations taking place on systolic arrays, and the effects that retiming the array has on the computations.

Theorem 1: If the period, P of a systolic array is greater than 1, then the array actually carries out P identical independent computations on P sets of independent interleaved data.

Indeed the data may be divided into P independent sets that never meet each other. The next theorem is basic to the retiming of arrays in accordance with the invention, and the effect that it has on the computations that are being carried out on the array.

Theorem 2: Let A1 and A2 be two systolic arrays made up of cells which, apart from their timing specifications, carry out identical computations. Further, suppose that the timing in the two arrays is such that the lengths of loops in A1 are some constant, k, (not necessarily integral) times the lengths of the corresponding loops in array A2. Then the period of A1 is k times the period of A2. Furthermore, the computations carried out by the two arrays will be the same, except that they will interleave different numbers of independent computations.

Specializing the above theorem to the case where the periods of the two arrays A1 and A2 are the same gives a condition for two arrays to carry out essentially identical computations. This special case of theorem 2 is related to the retiming theorems of Leiserson, Rose and Saxe. See C. E. Leiserson and J. B. Saxe, "Optimizing Synchronous Systems," Proc. 22nd Ann. Symposium on Foundations of Computer Science, IEEE Computer Society, pp. 23-36, 1981.

Corollary to Theorem 2: Let A1 and A2 be two systolic arrays made up of cells which are the same except for the timing of their input and output data, and which are connected together in the same topological arrangement. If the lengths of the corresponding loops in the two arrays are the same, then the two arrays carry out the same computation, except that the timing of the inputs and outputs of the two arrays may differ.

The third theorem, following, provides a general method for forming digit-serial systolic arrays.

Theorem 3. Given any systolic array of period P containing only combinational cells. By replacing the parallel computational elements by digit-serial computational elements satisfying the same timing requirements as the parallel array and working on words with P digits, a new systolic array is obtained which will carry out the same computation as the original.

Note that this theorem replaces the P independent computations of the original array by one digit-serial computation. Combining theorems 2 and 3, the following theorem obtains, which provides a method for converting any bit-parallel systolic array to digit-serial.

Theorem 4. Let A1 be a systolic array of period P using bit-parallel arithmetic. Let A2 be a systolic array obtained by replacing each cell of A1 by a cell carrying out the same computation in digit-serial arithmetic. Suppose the timing of A2 is such that the lengths of loops of A2 are some constant factor, k, times the lengths of corresponding loops in A1 and that the digit-size in A2 is such that there are kP digits per word. Then the arrays A1 and A2 carry out identical computations. The throughput of array A2 will be 1/k times the throughput of (each of the independent computations of) array A1.

In interpreting this theorem, two points are to be noted. First, regarding the timing diagram of a cell, whereas the timing specifications on the input and output ports of a cell using bit-parallel arithmetic indicate the time of arrival of the complete parallel word, in digit-serial cells, the timing specifications indicate the time of arrival of the first digit of the words. It is assumed and required that the succeeding digits of each word arrive in succeeding time instants. Secondly, in interpreting the statement that the arrays carry out identical computations, it must be taken into account that the first array does its computations in bit-parallel arithmetic whereas the derived array uses digit-serial arithmetic. The exact notion of equivalence of bit parallel and digit-serial computations will be explained further on in the specification.

These theorems will now be related to the convolution array and band matrix multiplier cell previously considered.

The convolution array of FIG. 31 has two loops of length two, and its period is two. Consequently, by theorem 1, and as remarked above, the array carries out two independent interleaved computations. When the bit-parallel operators are replaced by digit-serial operators with two digits per word, the timing is changed to that shown in FIG. 32. Nevertheless, it may be verified that the lengths of corresponding loops are the same, and so by theorem 3, the digit-serial version carries out the same operation as the original array.

The band multiplication array shown in FIG. 34 has timing as shown in FIG. 33. Note that the duration of the triangular loops in FIG. 34 is three cycles. Correspondingly, the period of the array is three and accordingly to theorem 1 it carries out three independent computations. In FIG. 34 the intervening data values are shown as zeros, but in fact, they may be any numbers. Once more, replacing the bit-parallel operators with digit-serial operators changes the timing, but in such a way that the lengths of loops are unchanged. Here, too, the digit-serial array will carry out the same operation as the bit-parallel array.

Figure 38:
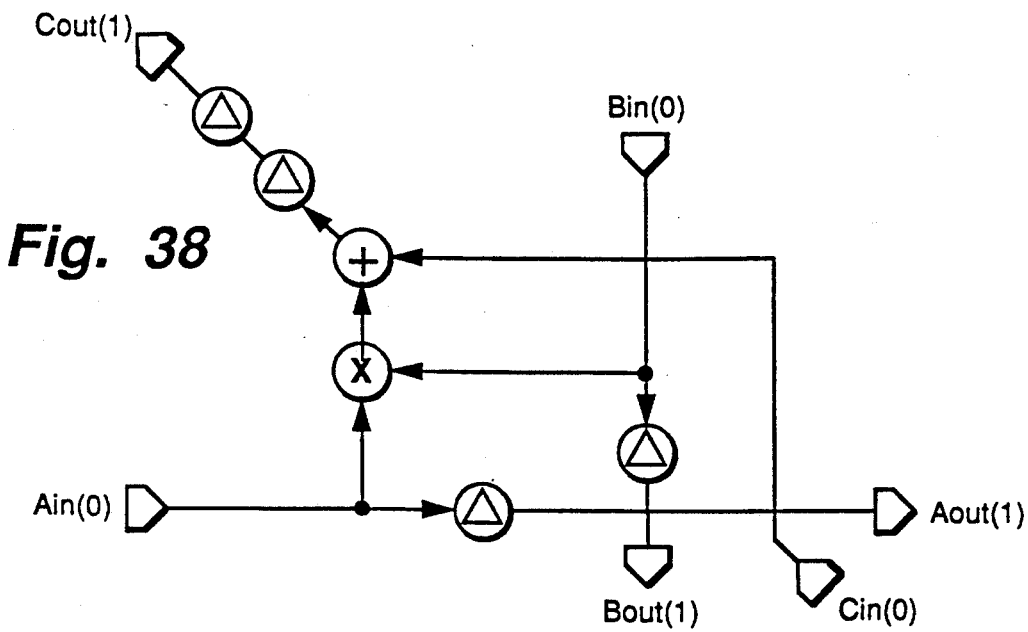
FIGS. 38 and 39 are schematic diagrams of parallel-bit band matrix multiplier cells alternative to that of FIG. 33.

Now, suppose that the basic band matrix multiplication cell of FIG. 33 is changed by the addition of an extra pipeline stage on the Cout output. The resulting cell and its timing diagram are now shown in FIG. 38. The duration of the loop is now four, and the period of the array is four. The array now carries out four overlapping computations, with related data separated by four clock cycles, as may be verified. According to theorem 2, however, the basic computation is the same as in the original array. Once again, replacing the arithmetic operators with digit-serial ones will result in an array in which the loops are of the same length. In this way, the array may be implemented with four digits in each word.

Figure 39:
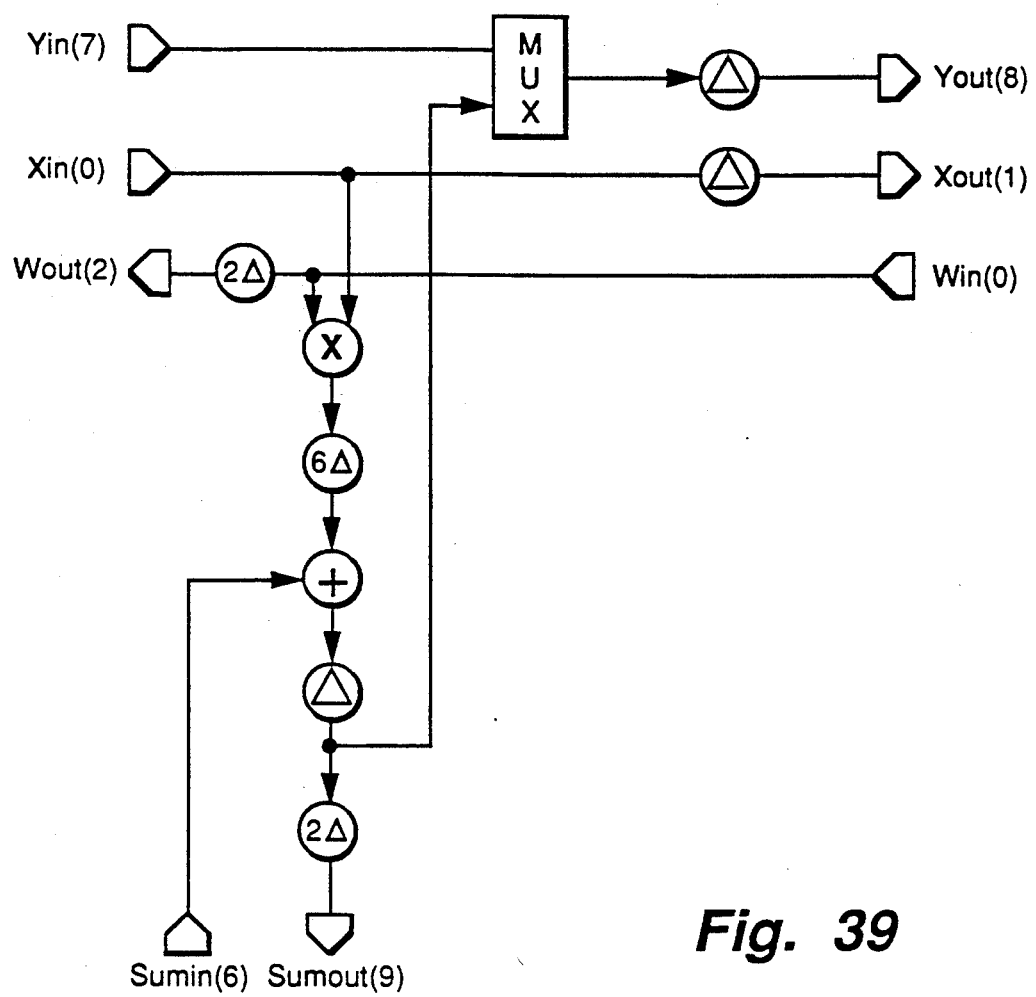
Figure 40:
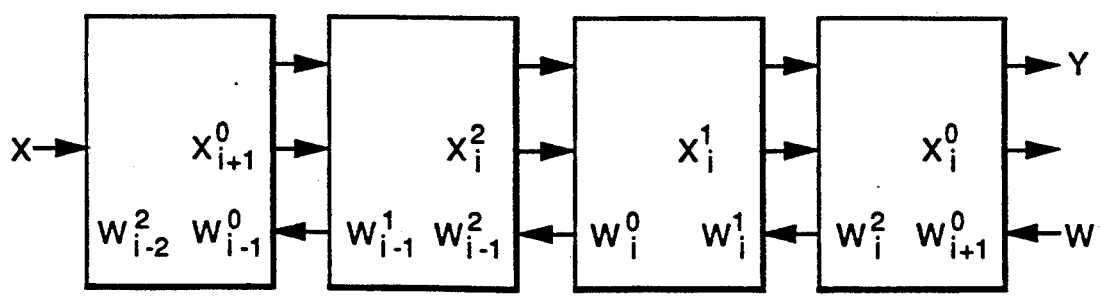
FIG. 40 is a schematic diagram of a digit-serial band matrix multiplier that is a homolog of the FIG. 39 parallel-bit band matrix multiplier and embodies the invention.

Similarly, the convolution cell may be modified by the insertion of an extra delay in each loop as in FIG. 39. Here, as before we show the timing for the case where multiplication has latency six and addition latency of one. Now, each loop has length three and the word may be divided into three digits and implemented using digit-serial operators. It is interesting to note how the correct digits of data are synchronized to arrive at the right place at the right time. This is shown in FIG. 40.

Although it will give no extra advantage in speed over systolic arrays implemented with the minimal number of digits per word, there are still advantages to be gained from being able to change the digit size of an array. Most notably, these include the ability to trade off area for speed to match the application. By decreasing the digit-size, the size of the circuit is decreased at the cost of a loss in throughput. Furthermore, it was shown in U.S. Pat. No. 4,942,396 that some range of digit-sizes make for more efficient circuits (according to an Area-Time measure) than others. Being provided the flexibility in digit-size the designer can choose the most efficient digit-size for the application.

Consider now how the digit-size may be chosen to allow a given bit-parallel array to be implemented in digit-serial. Theorem 4 can be used to formulate a general method of implementing bit-parallel arrays in digit-serial arithmetic. As the examples above show, it is often the case that a simple substitution of digit-serial operators for parallel ones allows the array to be implemented in digit-serial arithmetic with a digits per word, where a is the period of the array, that is, the degree of under-utilization. Similarly, as shown in the previous section, simply increasing the delay on one or more of the outputs of a cell provides an array with period equal to any arbitrary value exceeding a. Theorem 3 can then be applied to implement the array with digit-serial format containing some other chosen number of digits per word. It is possible, however, that the substitution of digit-serial for parallel operators changes the timing of the array in such a way as to alter the period of the array.

In this case, it is desirable to have a formal method of determining a digit-size for digit-serial implementation of the array. It is assumed, for the sake of simplicity, that the array is made up of a single type of cell arranged in a regular array. Arrays which contain more than one type of cell can be treated similarly. A general form of digit-serial operator as shown in FIG. 37, having some number, n, of input operands and some number, m of output operands is assumed.

The timing of input and output operands shown in FIG. 37 refers to the time of the leading digit of the word in question. Thus, in general, one may assume that the inputs to the operator are expected at possibly different times, and the outputs may be produced at different times. Most of the operators one will be concerned with will only produce one output. A common operator, however, that has two inputs required at different times is a serial/parallel type of digit-serial multiplier in which the first input (multiplier) must be latched into a parallel register before being multiplied by the second input (multiplicand). Accordingly, the first input must be present one complete word beforehand.

Figure 41:
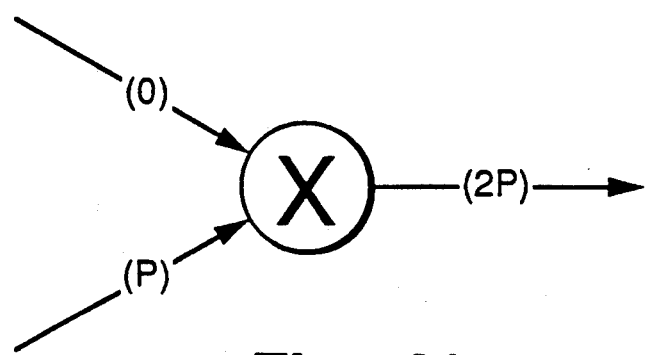
FIG. 41 is a timing diagram for digit-serial multiplication.

For some types of digit-serial operator the timing specifiers are constant values. An example of such a cell is a digit-serial adder, in which both inputs may be assumed to arrive at time $t=0$, and the single output is produced at time $t=1$. For other operators, the latency of the cell depends on the number of digits in each word. A digit-serial multiplier is an example of such an operator. The digit-serial multiplier described in R. Hartley and P. Corbett, "A digit serial compiler library." *Proceedings of International Symposium on Circuits and Systems*—ISCAS-89, pp. 641-646, 1989, has a timing diagram shown in FIG. 41, where P represents the number of digits in a word.

Generally, however, the latency or timing specification of any digit-serial operator is expressed in terms of linear functions of P. For instance, in the example of the multiplier shown above, the latency of the output is 2P, a linear function of P. The inventors are not aware of any digit-serial operator which does not conform to this rule.

For digit-serial operators using a most-significant digit first approach, the latencies of operators are generally small constant values independent of P. Indeed, this is the major advantage of the MSD first architecture.

Figure 42:
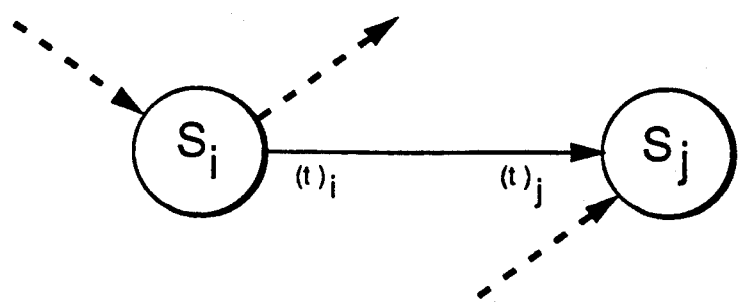
FIG. 42 is a timing diagram illustrating a general timing constraint.

A digit-serial implementation of the bit-parallel cell may be produced by replacing each operator in the signal flow graph by its digit-serial equivalent, and then by scheduling the flow graph and introducing "shimming delays" in the manner described next. ("Shimming" delays are described by R. Hartley and J. Jasica in the paper "Behavioral to Structural Translation in a Bit-serial Silicon Compiler" appearing in *IEEE Transactions on Computer Aided Design*, Vol 7, No 8, pp. 877-886, August 1988. First, dummy operators are introduced on each input and output of the complete systolic cell. The dummy input operators have no inputs themselves and one output. The output operators, on the other hand have themselves no output, but a single input. It is then attempted to schedule the graph by assigning a "scheduled time" to each operator in the graph. The restriction on scheduling is that any operator must be scheduled at a time after all of its inputs are ready, that is, produced by the previous operator. For each edge in the flow graph of the systolic cell, as shown in FIG. 42, this leads to a linear inequality of the following form:

$$S_i + t_i \leq S_j + t_j \qquad (2)$$

Note that in the case where the timing specifiers are not constants, the variable P (number of digits in a word) may appear linearly in this inequality, which will also be linear in the scheduled times, $S_i$. Inequalities (2) are concerned with the internal timing of each cell. There will be a further set of equalities concerned with the timing of the complete array. Consider a loop in the bit-parallel array. The length of this loop is equal to mP' where P' is the period of the array (the g.c.d. of all loop lengths) and m is an integer. According to theorem 4, the length of the corresponding loop in the digit-serial array with P digits per word must be mP. According to the definition of length, this leads to an equality of the following form.

$$\sum_E \tau(\text{tail of } E) - \tau(\text{head of } E) = kP. \quad (3)$$

where E ranges over all the edges in the loop. Assume that each cell in the array is identical, and hence that the timing specifications of each cell are the same. Thus, we may replace an expression $\tau$(tail of E) or $\tau$(head of E) by $S_i$, the scheduled time of one of the dummy input or output operands of the cell. This leads to the following equality.

$$\sum_{k=1}^{n/2} a_k \cdot (S_{ik} - S_{jk}) = kP. \quad (4)$$

where $S_{ik}$ and $S_{jk}$ are the scheduled times of a matching pair of input and output ports of the cell, $a_k$ is an integer, and n is the number of input and output ports of the cell.

An equality of type (4) exists for each loop in the array. Clearly, however, there are at most n/2 linearly independent equations of this type. In fact, one need only consider loops starting at a given fixed cell in the array, since all similar loops starting at other cells give rise to the same equality. Further, it is sufficient to consider only a basic set of loops from which all other loops may be derived. For instance, in the case of a planar array, it is sufficient to consider only "inner loops" which contain no other loops in their interior.

The inequality of type (2) and equality of type (4) together form a complete set of constraints for scheduling a cell in order for it to be implemented in digit-serial with P digits per word. Any integer solution to these set of inequalities that results from a linear programming procedure will give a valid schedule. Once a schedule is obtained, it is necessary to add "shimming delays" to the cell to equalize delay paths and ensure that operator inputs arrive at the correct time. See the R. Hartley and J. Jasica paper, "Behavioral to Structural Translation in a Bit-serial Silicon Compiler" *IEEE Transactions on Computer Aided Design*, Vol. 7, No. 8, pp. 877-886, August 1988, for a description of "shimming delays" in bit-serial arithmetic; and see U.S. Pat. application Ser. No. 428,808 filed Oct. 30, 1989 by A. E. Casavant and R. I. Hartley, now U.S. Pat. No. 5,175,843, issued Dec. 29, 1992 entitled "METHOD FOR REDUCING DELAYS IN COMPUTATIONAL NETWORKS USING COMMUTATIVE AND ASSOCIATIVE OPERATORS" and assigned to General Electric Company for a description of "shimming delays" in digit-serial arithmetic. The least possible number of digits per word is obtained by minimizing P subject to the given constraints. One seeks solutions in integers, so it is an integer programming problem that must be solved.

Figure 43:
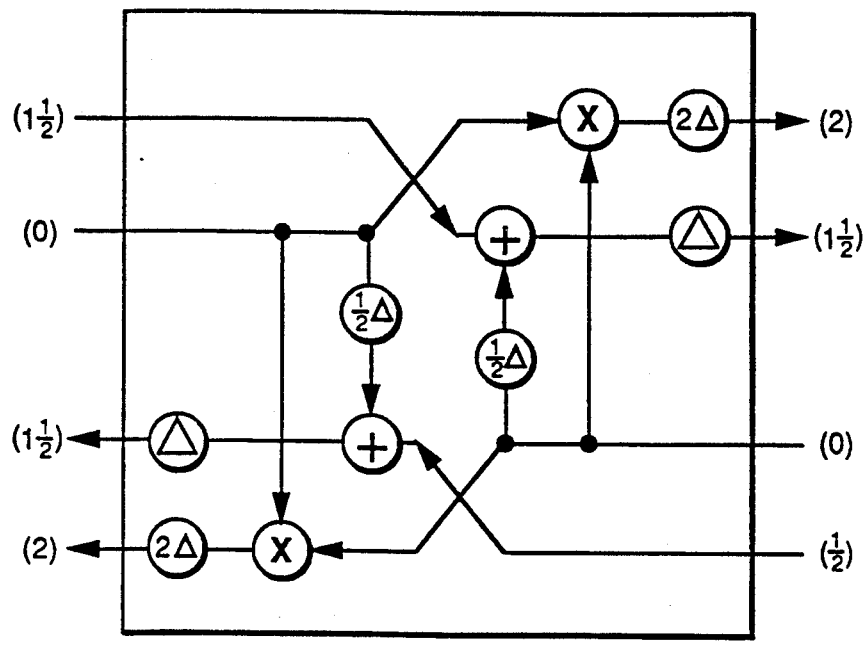
FIG. 43 is a schematic diagram of a computational cell with non-integral scheduling.
Figure 45:
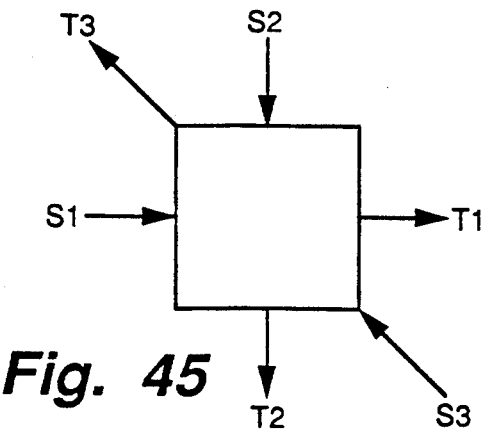
FIG. 45 is a timing diagram for band-matrix topology.

Since solving integer programming problems is in general more difficult than the corresponding linear programming problem, it is natural to ask whether the solution to the linear programming problem may turn out to be a solution in integers, or easily transformed into one. If this is the case, then one may simply solve the linear programming problem and obtain the minimum solution in integers. Such a favorable situation arises in the problem of minimizing shimming delays in synchronous circuitry, which is a closely related problem. (See "Behavioral to Structural Translation in a Bit-serial Silicon Compiler") Unfortunately it is not true in this case, as the example diagrammed in FIG. 43 shows.

Figure 44:
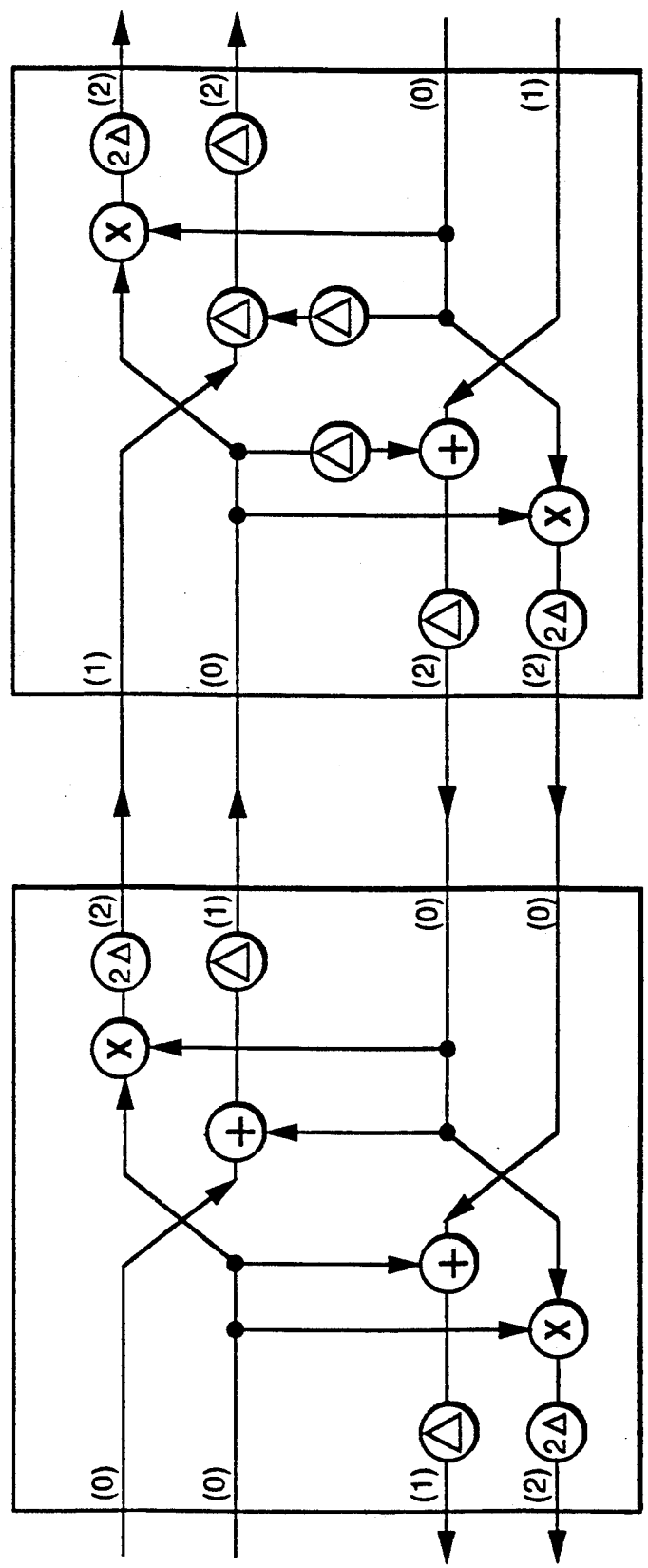
FIG. 44 is a schematic diagram of a cascade of two slightly different computational cells both with integral scheduling that can replace a cascade of two computational cell with non-integral scheduling of the type shown in FIG. 43.

In this example a latency of two cycles is assumed for multiplication; and a latency of one cycle, for addition. The minimum length of loops is three. However, the scheduling that gives loop lengths of three has inputs and outputs scheduled at fractional times as shown. It may easily be verified that with integer scheduling it is impossible to attain this minimum loop length. It is interesting to note that if two different variants of the basic cell are allowed, then it is possible to attain the minimum loop length with integer scheduling. This is shown in FIG. 44. In general, it will always be true that with a finite number of different cell types, each with the same functionality but different timing, it is possible to implement the systolic array with the minimum number of digits per word.

In many cases, however, a solution to the constraint set that minimizes P may easily be transformed into a solution in integers with the same value of P. Commonly, this may be done simply by replacing all the scheduled times by the nearest integer value. To give an example of how this may be done we consider any array with the same topology of interconnections as the band multiplier array and assume that it is to be implemented with digit-serial operators in such a way that the scheduling inequalities (3) do not depend on P, the number of digits in a word. This would be the case if the array were implemented with MSD-first digit-serial operators. It is shown further on that the solution found to the linear programming problem may be transformed into an integer solution with the same value of P by rounding each scheduled time to the nearest integer value, or alternatively by truncating each scheduled time to the next smaller integer value.

The relevant feature of the band-matrix multiplication array of FIG. 34 is that the set of equalities imposed by the array topology reduces to a single equality. In particular, there are just two inner loops in the array and these both give rise to the same equality. With the scheduled times as shown on FIG. 35, the equality becomes $$(T_1-S_1)+(T_2-S_2)+(T_3-S_3)=P.$$

Consider more generally the case where there is a single equality to be satisfied:

$$\sum_{k=1}^{n/2} a_k \cdot (T_k - S_k) = P. \quad (5)$$

where $T_k$ and $S_k$ are the scheduled time of matching output and input ports with $T_k > S_k$, and the $a_k$ are any integers. The linear programming problem may be stated as that of minimizing the expression (5) subject to the constraints (3). Suppose that one has solved this problem and found a minimum value, $P_{min}$. A key observation is that if the scheduled time $S_i$ of each operator in the cell, (including dummy input and output operators) is replaced by $\lfloor S_i - r \rfloor$, for any fixed real number, r, then the inequalities (2) are still satisfied, since they contain only integer constants. (The notation $\lfloor r \rfloor$ denotes the integral part of r.) Thus for any r this gives an integral schedule, and it is desirable to prove that the value of P given by (5) is unchanged. In particular, it is desirable to prove that for any r∈R $$\sum_{k=1}^{n/2} a_k \cdot (\lfloor T_k - r \rfloor - \lfloor S_k - r \rfloor) = P_{min} \quad (6)$$

By assumption, the original solution minimizes P. As just remarked, however, the scheduled times $\lfloor T_k - r \rfloor$ and $\lfloor S_k - r \rfloor$ form part of an alternative solution to (2), and it follows that the value of P generated by this new solution can not be less than the minimum. Hence, $$\sum_{k=1}^{n/2} a_k \cdot (\lfloor T_k - r \rfloor - \lfloor S_k - r \rfloor) \geq P_{min}. \quad (7)$$

Note next that for any real numbers r, a and b with b<a, the value $\hat{I}a - r° - \hat{I}b - r°$ is equal to the cardinality of (that is, number of points in) the set $\{x \in (b,a] \mid <x> = <r>\}$, where (b,a] represents the half-open interval of the real line including a, but not b and we have used the notation $<x>$ to denote the fractional part of x. Consider the mapping f that wraps the real line around the unit circle: $f(x) = \exp(2\pi i x)$. Since $f(x) = f(r)$ if and only if $<x> = <r>$ we see that $\hat{I}a - r° - \hat{I}b - r°$ is equal to the number of times that the image under f of the interval (b,a] covers the point f(r). Applying this to the intervals $(S_k, T_k]$, formula (7) indicates that for each r, the images under f of the intervals $(S_k, T_k]$, cover the point f(r) at least $P_{min}$ times, each interval being counted $a_k$ times. Hence, the intervals cover the complete circle at least $P_{min}$ times. On the other hand, the total weighted length of the intervals $(S_k, T_k]$ is equal to $P_{min}$ by (5). It follows, therefore, that the intervals must cover the complete circle *exactly* $P_{min}$ times, and hence that formula (6) is true for any r, which was considered to be desirable to prove.

Taking r=0, one sees that the truncated values of the scheduled times give an integer schedule with the same value of P. If one takes r=½, one sees that rounding the scheduled times also gives an integer schedule with the same value of P.

It is clear that the above method will work in many cases not explicitly considered here. In very many cases, replacing all scheduled times $\hat{I}S_k°$ by $\hat{I}S_k - r°$ for some r will produce an integer scheduling with the same value of P. The example of FIG. 43 shows that this is not always the case, however.

For a chosen digit size and number of digits per word, there may still be several schedules for the systolic cell. As with scheduling complete digit serial circuits, it will normally be best to use a scheduling that minimizes the number of shimming delays needed, as explained in "Behavioral to Structural Translation in a Bit-serial Silicon Compiler". The method for doing this is similar to the way described in that paper, however, because of the restraints of the type (4), the optimal solution found by linear programming will not always be realizable in integers. Nevertheless, approximating the schedule by an integer schedule as described above will usually provide a near-optimal scheduling.

Figure 48:
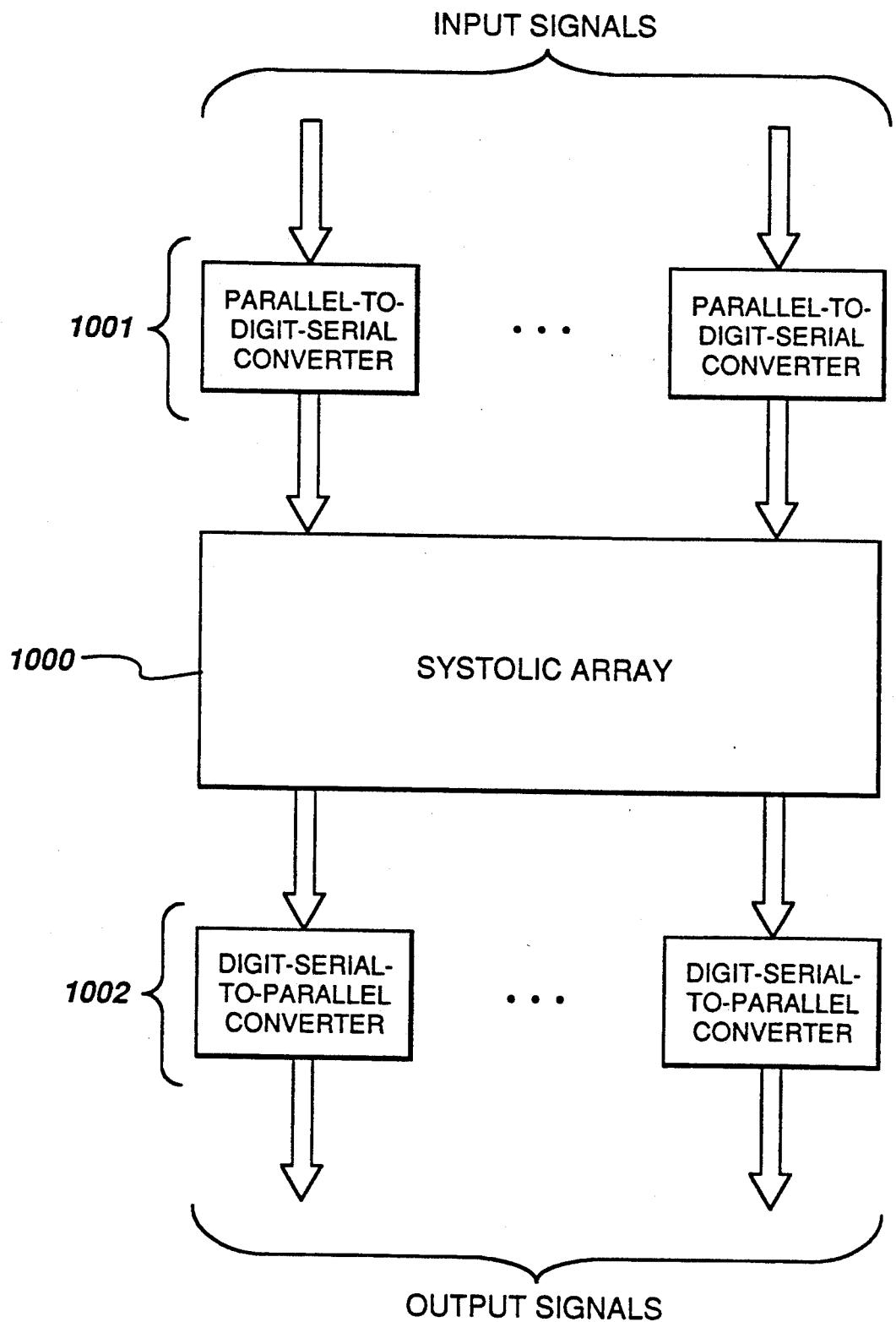
FIG. 48 is a schematic diagram of a systolic array of digit-serial processing elements with a respective parallel-to-digit-serial converter coupled to each input port of the array in accordance with the invention.
Figure 49:
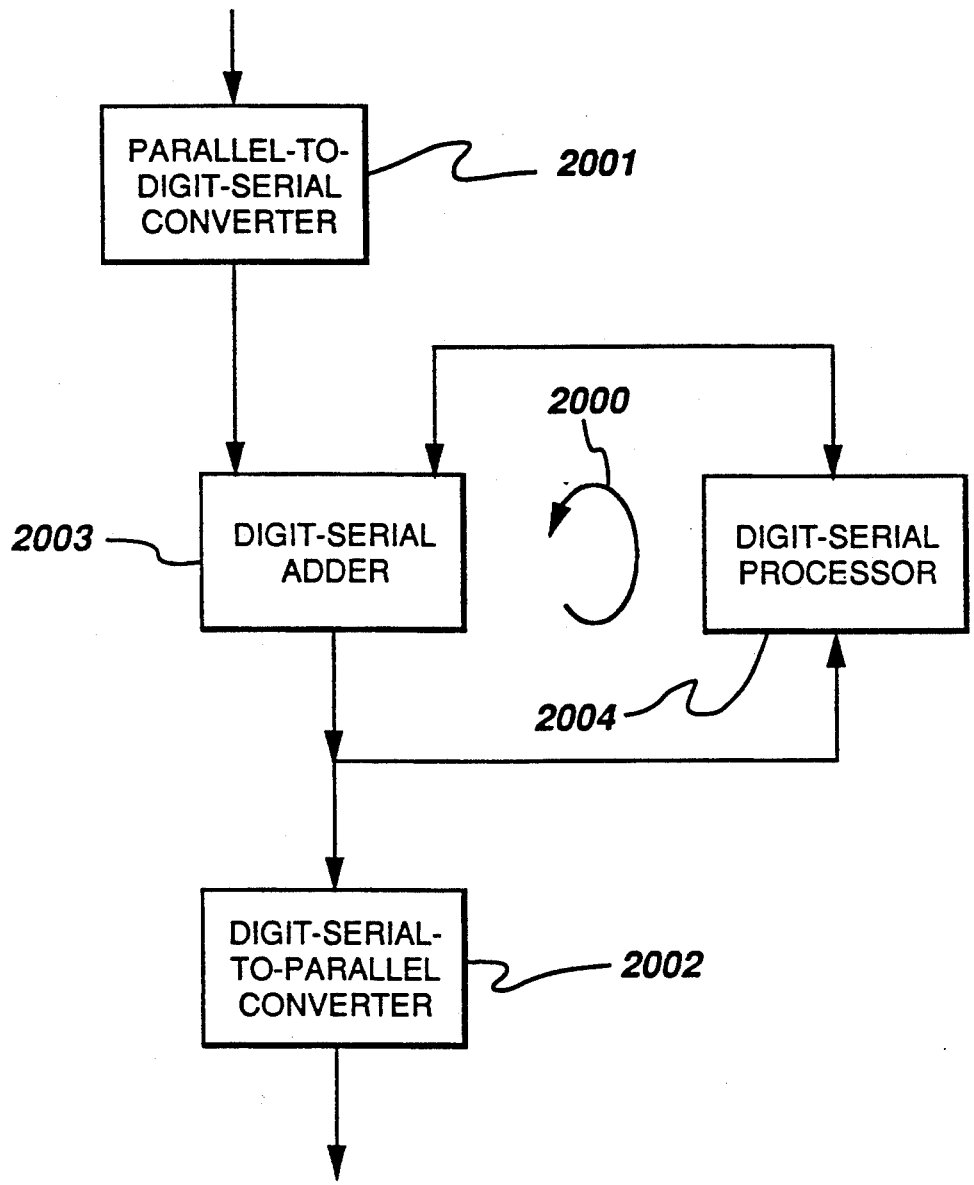
FIG. 49 is a schematic diagram of a loop connection of digit-serial processing elements as employed in a systolic array constructed in accordance with the invention.

From the teachings set forth above one can readily develop methods of designing improved systolic arrays to be used in a silicon compiler in which systolic arrays are represented in graphical form, with vertices representing processors and edges representing communication links between processors. In these methods a systolic array using parallel-bit processors operated at a common clock frequency to process parallel-bit words, at least one of which parallel-bit processors is underutilized, is transformed to a systolic array using a respective fully utilized digit-serial processor instead of each underutilized parallel-bit processor. FIG. 48 illustrates how input signals are supplied to, and output signals are read out from, the systolic array of the invention, while FIG. 49 is a schematic diagram of a systolic array employing a loop connection of digit-serial processing elements in accordance with the invention.

One method for designing a systolic array of processors including therewithin loop connections of processors as well as internal pipeline connections of processors, which method reduces any under-utilization of the processors, is carried forward with the aid of a silicon compiler. The procedure begins by developing an original design for the systolic array using parallel-bit processors. The latency around each loop connection of parallel-bit processors in the original design for the systolic array is determined, and the greatest common divisor P of these latencies is then determined. If the greatest common divisor P is one, indicating that there are no under-utilized processors in the original design for the systolic array using parallel-bit processors, the original design for the systolic array using parallel-bit processors is used as a final design for the systolic array. However, if the greatest common divisor P is larger than one, indicating that there are under-utilized processors in the original design for the systolic array using parallel-bit processors, a final design for the systolic array is generated by performing the following substeps, cyclically if necessary:

(a) in the most recent systolic array design using parallel-bit processors, each parallel-bit processor is replaced with a corresponding digit-serial processor in which the number of digits per digital word equals the greatest common divisor of the respective latencies of the loop connections in the most recent systolic array design using parallel-bit processors, thereby generating a most recent modified design for the systolic array;

(b) the most recent modified design for the systolic array is used as the final design for the systolic array only if the latencies in all the loop connections of the most recent modified design for the systolic array are the same as the latencies in the corresponding loop connections of the most recent systolic array design using parallel-bit processors; and (c) if the latencies in all the loop connections of the most recent design for the systolic array are not the same as the latencies in the corresponding loop connections of the most recent systolic array design using parallel-bit processors, delay elements are inserted into the most recent systolic array design using parallel-bit processors for increasing the latencies in all the loop connections by a factor equal to their lowest common divisor more than one to generate an updated most recent systolic array design using parallel-bit processors.

Another method for designing a digit-serial systolic array of functional cells is performed with the aid of a silicon compiler, as follows. A prototypical structure is developed for an individual functional cell of each type of functional cell used in the systolic array, which individual functional cell may be repeated in the systolic array. Alternative systolic array designs are generated by scheduling the array somewhat differently within pre-established delay constraints and then using integer programming to determine a minimum value of P, the number of digits per digital word, the integer programming proceeding from the following constraints:

for each connection between operators in each functional cell $$S_i + t_i \leq S_j + t_j$$

where $t_i$ is the latency of the preceding operator, $t_j$ is the latency of the succeeding functional cell, $S_i$ is the scheduled time of the preceding functional cell, and $S_j$ is the scheduled time of the succeeding functional cell; and for each loop connection within the digit-serial systolic array of functional cells having no interior loop connections therewithin $$\sum_{k=1}^{n/2} (S_{ik} - S_{jk}) = mP$$

where n is the number of input and output ports of all functional cells threaded by that loop connection, $S_{ik}$ and $S_{jk}$ are for each value of k the scheduled times of a different pair of interconnected functional-cell input and output ports threaded by that loop connection, and m is an integer. The alternative systolic array design in which P is a minimum is selected as the final design for the systolic array.

A variant of the foregoing method for designing a digit-serial systolic array of functional cells is carried out with the aid of a silicon compiler, as follows. At least one and in some cases more than one prototypical structure of an individual functional cell is developed for each type of functional cell used in the systolic array. Where there is more than one prototypical structure for a type of functional cell, the prototype structures differ in their respective minimal latencies. Alternative systolic array designs are generated for each combination of prototypical structures as may be utilized in each loop connection within the systolic array. These alternative systolic array designs are generated by scheduling each array somewhat differently within pre-established delay constraints. Integer programming is used to determine a minimum value of P, the number of digits per digital word, for each of these alternative systolic array designs. The integer programming proceeds from the same constraints as set forth in the previous paragraph. Again, the alternative systolic array design in which P is a minimum is selected as the final design for the systolic array.

The methods described in the previous three paragraphs each generate systolic arrays having maximized throughput rate consonant with full utilization of the processing elements in those arrays. It may be desirable to trade off the maximized throughput rate for reductions in digital hardware requirements, which trade-off is done by replacing the digit-serial processing elements in a first systolic array with other digit-serial processing elements using more digits per digital word and consequently using fewer bits per digit, thereby to derive a second systolic array. More particularly, this method is carried out with the aid of a silicon compiler, as follows. Delays are added to certain of the output signals of the digit-serial processing elements in the first systolic array so as to increase the latency in all of the loop connections by the same factor. Then, the number of bits per digit in the second systolic array is chosen such that the number of digits per digital word is increased by the factor.

In the following appendices to this specification a formal statement and proof of the theorems stated above are proferred. Rigorous definitions will be given for such terms as independent interleaved computations and it will be explained what is meant by two arrays carrying out equivalent computations. The treatment will be completely rigorous and formal, and it is left largely to the reader to relate the formal concepts treated below to the informal theorem statements previously set forth in this specification.

Appendix I: Computation Graphs

Figure 46:
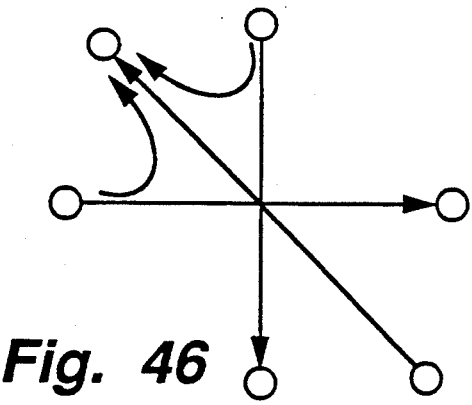
FIG. 46 is a computation graph corresponding to a band matrix multiplier cell.

Before proving the theorems, it is necessary to make a few definitions to explain precisely what is meant by such terms as independent computation. The problem will be cast in slightly more general terms, which will simplify the formalism of the proof. The standard way of looking at a systolic array as a graph is to consider the vertices of the graph to represent cells and the edges to represent data transfer between cells. To each edge in the graph may be associated the arithmetic or logical value that is being transferred on that edge in each cycle. This graphic representation of a systolic array is called the processor graph. in this specification and its appendices. To focus attention on these variables and their relation to each other a new graph, in some sense dual to the standard graph, called the computation graph representing the systolic array is defined here. The vertices of the computation graph, corresponding to edges of the processor graph, represent variables and the directed edges of the graph represent dependencies between variables. There is a directed edge from vertex $v_i$ to $v_j$ in the computation graph precisely when there is a vertex (processor) in the processor graph with input and output edges corresponding respectively to the vertices $v_i$ and $v_j$. FIG. 46 shows the part of a computation graph corresponding to the basic cell of the band-matrix multiplier array. The concept of a computation graph is defined more explicitly in the next paragraphs.

A computation graph is a directed graph with vertex set $V = \{v_i\}$ and edge set $E = \{e_j\}$. To each edge, $e_{ij}$ connecting vertex $v_i$ to $v_j$ is associated an integer, $d(e_{ij})$, referred to as the length of the edge. Note that we do not assume that lengths are non-zero or positive, just that they are integers, though for a systolic array, all directed edge lengths will be positive.

For each vertex, $v_i$, the notation $\pi(v_i)$ denotes the set of predecessor vertices of $v_i$ defined by $$\pi(v_i) = \{v_j \epsilon V \mid \text{there exists an edge in E directed from } v_j \text{ to } v_i\}$$

Each vertex $v_i$ in a computation graph may take values in some set, $D_i$. For instance, $D_i$ may be the set of real numbers, integers, Boolean values, $\{0, 1\}$ or any other set. We denote the value of vertex $v_i$ at time t by $\text{val}(v_i, t)$. Further, to each vertex, $v_i$, is associated a function, $f_i$. The range of this function is the set $D_i$ and its domain is the cartesian product of the sets associated with each vertex in $\pi(v_i)$. This may be denoted formally by $$f_i: \bigcirc_{v_j \in \pi(v_i)} D_j \rightarrow D_i \qquad (8)$$

Appendix II: Valid Computations

It is desired to consider computations taking place on a computation graph. Formally, a valid computation on a computation graph is defined as an assignment of a doubly infinite sequence of values (indexed by time) to each vertex in such a way that the value assigned to a vertex at any time is the result of applying that vertex's function to the delayed values of its predecessors. Precisely, it is required for all vertices $v_i$ and time t, that $$\mathrm{val}(v_i,t) = f_i(\mathrm{val}(v_{j1}, t-d_1), \mathrm{val}(v_{j2}, t-d_2), \ldots, \mathrm{val}(v_{jk}, t-d_k)) \qquad (9)$$

where $v_{j1}, \ldots, v_{jk}$ are the vertices in $\pi(v_i)$ and $d_m$ is the delay from $v_{jm}$ to $v_i$.

Appendix III: Meshes

To formalize the concept of independent interleaved computations, it is necessary to define a concept of computations carried out only during a subset of specified time instances. Consequently, there is here defined (for want of a better name) a mesh T defined on a computation graph to be a computation graph as defined above along with, for each vertex, $v_i$, a time set, $T_i \subseteq Z$ (the set of all integers). The time sets must satisfy the following condition:

(10) If there is an edge $e_{ij}$ from vertex $v_i$ to $v_j$ then $T_j = T_i + d(e_{ij})$ where for any $n \in Z$, the set by $T_i + n$ is defined to mean the set $\{t_k + n | t_k \in T_i\}$. The mesh T for which $T_i = Z$ for all i is referred to as the full mesh on the computation graph.

As a notational convention, we will denote meshes will be denoted by uppercase script letters (e.g. S, T) and their time sets will be denoted by the corresponding subscripted upper case Roman letters ($S_i$, $T_i$). The underlying computation graph of a mesh T will be denoted by G(T).

Given two meshes S and T with time sets $S_i$ and $T_i$ defined on the same computation graph, one should say that S is a sub-mesh of T provided $S_i \subseteq T_i$ for all i. A mesh containing no non-trivial sub-meshes is called irreducible.

Given two meshes S and T with time sets $S_i$ and $T_i$, define $S \cap T$ to be the mesh with time sets $S_i \cap T_i$. Also define $S \cup T$ to be the mesh with time sets $S_i \cup T_i$. It is straightforward to verify that $S \cap T$ and $S \cup T$ as defined indeed satisfy the definition of a mesh. The same is true of infinite intersections and unions. It follows easily that irreducible meshes defined on the same computation graph are disjoint (since their intersection is a sub-mesh of each), and that any mesh may be divided up into a (possibly infinite) union of irreducible sub-meshes.

Appendix IV: Paths and Loops

Define a path in a computation graph to be a succession of consecutive edges in the graph, where edges may be traversed either backwards or forwards. The length of a path is the sum of the lengths of all edges traversed by the path, edges traversed backwards being counted negative. A loop is a path that starts and ends at the same vertex. The length of a path or loop is denoted by d(p).

A multiplicative notation is used to denote paths in a graph. Thus if p and q are paths in a computation graphs, then one writes p.q or simply pq to denote the path formed by traversing p followed by q, it being always assumed when such notation is used that the end point of the path p is the starting point of q. The notation $p^{-1}$ is the path formed by traversing p in the opposite direction. If p is a loop, then $p^n$ represents the path that goes n times around p.

In the language of algebraic topology, if one allows for cancelling a path with its inverse, then the set of all paths in a graph forms a groupoid, called the fundamental groupoid of the graph. The set of loops based (starting and ending) at a specific vertex, $v_0$, forms the fundamental group of the graph. The mapping that assigns to any loop its length is a homomorphism of the fundamental group onto a subgroup of the integers. The defining relationship between time sets in a mesh is given in (10) above. It is easily seen that this formula extends to any two vertices $v_i$ and $v_j$ connected by a path $p_{ij}$. Namely, $T_j = T_i + d(p_{ij})$, or in other words, $t \in T_i$ if and only if $t + d(p_{ij})$ $T_j$.

A basic result about loops in a graph is needed.

(11) Lemma: If G is a connected graph, $v_0$ is any vertex in G and n is the greatest common divisor (g.c.d) of the lengths of all loops in the graph, then there exists a loop based at $v_0$ having length equal to n.

Proof: First, note that if p is a loop in G, then there exists a loop p' based at $v_0$ having the same length as p. Indeed, if $v_i$ is the base point for p and $q_{0i}$ is a path in G from $v_0$ to $v_i$, then the loop $p' = q_{0i}.p.q_{0i}^{-1}$ has the desired property. From this it follows that n is the g.c.d. of all loops based at $v_0$.

Now, as a result of the Euclidean Algorithm, there exist some number m of loops $p_i$ based at $v_0$ and integers $k_i$ such that $$n = \sum_{i=1}^{m} k_i \cdot d(p_i).$$

It follows that the loop $p_1^{k_1}.p_2^{k_2} \ldots p_m^{k_m}$ based at $v_0$ has length n.//.

Appendix V: Structure of Meshes

The decomposition into irreducible submeshes of a full mesh defined on a connected computation graph is now to be determined.

(12) Theorem: Let G be a connected computation graph in which the g.c.d. of the lengths of all loops is n. Let G be the full mesh defined on G. Then G is a disjoint union of n irreducible sub-meshes, $G = S_0 \cup S_1 \cup \ldots \cup S_{n-1}$.

Furthermore, for $j = 0, \ldots, n-1$, mesh $S_j$ has $v_i$ time-set of the form $S_{ji} = j + k_i + nZ = \{j + k_i + nt | t \in Z\}$. Here $k_i$ is the length of some arbitrarily chosen path from a base vertex $v_0$ to $v_i$. //

Proof: Select any vertex, $v_0$ as a base vertex and, for each vertex $v_i$ choose a path, $p_i$ from $v_0$ to $v_i$ and set $k_i = d(p_i)$. Define $S_{0i} = k_i + nZ$. We show that this definition of time sets for each vertex defines a mesh. Suppose that $q_{ij}$ is an edge joining $v_i$ to $v_j$. We are required to prove that $S_{0j} = S_{0i} + d(q_{ij})$. By definition, $$S_{0j} = k_j + nZ$$
$$= d(q_{ij}) + k_i + nZ + (k_j - d(q_{ij}) - k_i).$$

Now, $k_j - d(q_{ij}) - k_i$ is the length of the path $p_j \cdot q_{ij}^{-1} \cdot p_i^{-1}$ starting at $v_0$, leading to $v_j$ along $p_j$ then backwards along $q_{ij}$ and $p_i$ ending back at $v_0$. Since this is a closed loop, it has length cn, a multiple of n, the g.c.d of all loop lengths. Therefore, continuing the above string of equalities, one sees that $$S_{0j} = d(q_{ij}) + k_i + nZ + cn$$
$$= d(q_{ij}) + k_i + nZ$$
$$= S_{0i} + d(q_{ij})$$

as required. The mesh defined by these time sets is denoted by $S_0$.

Similarly, defining $S_{ji} = j + k_i + nZ$ for $j = 0, \ldots, n-1$, it can be verified that this defines a mesh, $S_j$, and that the n meshes so defined are disjoint, and that their union is the full mesh defined on the computation graph.

It remains to show that $S_j$ is irreducible. For convenience of notation, this is shown for $S_0$, the proof for the other $S_i$ being essentially the same. Denote by T the smallest sub-mesh for which $T_0$ (the time set at the vertex $v_0$) contains time $t = 0$. The goal is to show that $T_i \supseteq S_{0i}$ for each vertex, $v_i$.

By the definition of sub-mesh, if there is a path $p_{ij}$ from vertex $v_i$ to vertex $v_j$ with length $d(p_{ij})$, then $T_j = T_i + d(p_{ij})$. Applying this formula where $v_i = v_j = v_0$ and p is a loop of length n based at $v_0$ we obtain $T_0 = T_0 + n$. Since $0 \subseteq T_0$ it easily follows that $T_0 \supseteq nZ = S_{00}$. Now, since $p_i$ is a path from $v_0$ to $v_i$ with length $k_i$, it follows that $T_i = T_0 + k_i \supseteq nZ + k_i = S_{0i}$ as required.

By definition, T contains no non-trivial sub-meshes and so it is irreducible. However, it has been shown just abovethat T contains $S_0$. It must follow that $S_0 = T$ is itself irreducible. //

For computation graphs without loops, the situation is as follows:

(13) Theorem: Let G be a connected computation graph without loops, or in which every loop has length 0. Let G be the full mesh defined on G. Then G is an infinite disjoint union of irreducible sub-meshes, $$G = \bigsqcup_{j \in Z} S_j$$

Furthermore, for $j \in Z$, mesh $S_j$ has time-sets, $S_{ji}$ consisting of the single element $j + k_i$ where $k_i$ is the length of a path from some base vertex $v_0$ to $v_i$. //

The proof is essentially the same as the proof of the previous theorem, except where it refers to loops.

Appendix VI: Computations on Meshes

A valid computation belonging to a given mesh is defined analogously to a computation on a computation graph, but insisting that $val(v_i, t)$ be defined and satisfy condition (10) only for times $t \in T_i$. It is important to note that if $t \in T_i$, then in computing the value of vertex $v_i$ at time t, the values of the predecessor vertices of $v_i$ used are values defined at times belonging to the time sets of these vertices.

Next consider how computations on the full computation graph are related to computations on the irreducible sub-meshes. Consider a mesh G, which is a disjoint union of sub-meshes, $G = \cup S_j$. Let $C_j$ be a computation belonging to the sub-mesh, $S_j$. Then the sum of the computations $\Sigma C_j$ is defined by specifying the value of the computation at a vertex, $v_i$ at time t to be the value at $v_i$ at time t in the unique computation $C_j$ such that $t \in S_{ji}$, the time set of mesh $S_j$ at vertex $v_i$. It is easily verified that $\Sigma C_j$ is a valid computation on G.

Given a computation C defined on a mesh G, and a sub-mesh H of G, the restriction of C to H is defined to be that computation, R defined on H such that $val_R(v_i, t) = val_C(v_i, t)$ whenever t is in the time set of H belonging to vertex $v_i$. It is trivial to verify that R is in fact a valid computation on H.

It is noted that any valid computation on a mesh G can be expressed as a sum of computations defined on its irreducible sub-meshes. In fact, it is easily seen that a computation on G can be expressed as the sum of its restrictions to irreducible sub-meshes.

Suppose G is the full mesh of a computation graph and that n is the g.c.d. of lengths of loops on the computation graph. Theorem (12) showed that G is a direct sum of n sub-meshes the time sets of which are interleaved with each other. Any computation defined on G is a sum of computations defined on the sub-meshes, and these computations are independent of each other. These observations are the substance of theorem 1.

Appendix VII: Mesh Isomorphism

To be able to compare computations defined on different computation graphs, a notion of equivalence is needed. Since the basic object is a mesh, an isomorphism of meshes is defined as follows.

An isomorphism, g, between two meshes, S and T consists of a graph isomorphism, g, and a set of timing-set mappings $g_i$. The map g is a graph isomorphism between the computation graphs G(S) and G(T), that is, an edge preserving bimorphism between the vertex sets. Further, for each vertex $v_i$, the domains, $D_i$ and $D'_i$, and the functions $f_i$ and $f'_i$ associated with the vertices $v_i$ and $g(v_i)$ are the same. Thus, briefly stated, g defines an isomorphism between the two graphs, which preserves the functional operations carried out at each vertex. It is not required that the delays associated with each edge are preserved by the graph isomorphism. In fact, the timing relations between the two meshes are specified by the maps $g_i$. For each i, $g_i$ is a bimorphism between the time set $S_i$ for vertex $v_i$ and the time set $T_i$ of the vertex $g(v_i)$. These maps must satisfy the following condition. Suppose p is an edge joining vertex $v_i$ to $v_j$, and $t_i \in S_i$. Then $t_j = t_i + d(p) \in S_j$. Denoting by g(p) the edge in T joining $g(v_i)$ to $g(v_j)$, it is required that $$g_j(t_j) = g_i(t_i) + d(g(p)). \tag{14}$$

Figure 47:
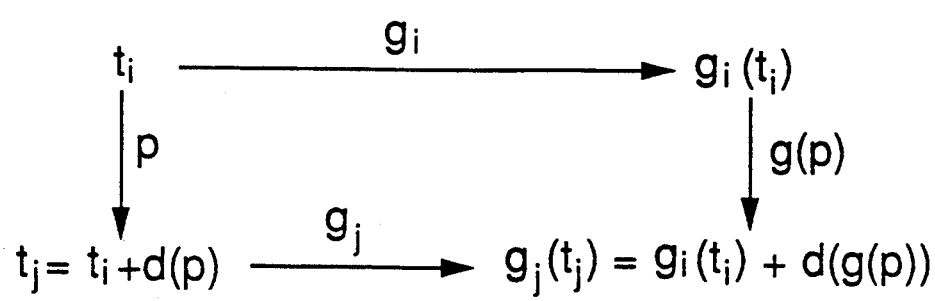
FIG. 47 is a commutative diagram.

Formula (14), which defines the relationship between the maps of time-sets in a mesh isomorphism simply states that the relation $t_j = t_i + d(p)$ is preserved by the isomorphism. In intuitive terms it means that data dependencies are preserved in mappings between meshes based on computation graphs with different delays assigned to edges. In particular, if $t_i \in S_i$ is the time that a piece of data is produced at vertex $v_i$ in mesh S, and $t_j$ is the time that it is used in the computation at vertex $v_j$ after being subjected to a delay d(p) in passing along edge p, then this relation should hold in an isomorphic mesh with different delays. Specifically, if $g_i(t_i)$ is the time that a corresponding piece of data is produced at vertex $g(v_i)$ in mesh T, and $g_j(t_j)$ is the time that it is used in the computation at vertex $g(v_j)$, then the delay along the edge $g(p)$ should be $g_j(t_j) - g_i(t_i)$, in other words, $g_j(t_j) = g_i(t_i) + d(g(p))$, which is formula (14). The situation may be visualized in terms of a commutative diagram as shown in FIG. 47.

As the previous paragraph hints, the basic fact about isomorphisms between meshes is that they will induce correspondences between computations on the meshes as the following theorem shows.

(15) Theorem: If $g: S \to T$ is a mesh isomorphism, and C is a computation defined on S, then there exists a computation $g^*(C)$ on T defined by the formula $$\text{val}_{g^*(C)}(g(v_i), g_i(t)) = \text{val} C(v_i, t)$$

for all $t \in S_i$.

Briefly stated, the values of the computation $g^*(C)$ at $g(v_i)$ are the same as those of C at $v_i$ except for retiming.

Proof: This is largely a matter of straight-forward application of the definitions and a proof will be omitted.

A simple case of mesh isomorphism relates to the case where meshes S and T have the same computation graph with the same edge delay assignment. In this case, it is easily verified that the time set maps $g_i$ defined by $g_i(t) = t + k$ (the same k for each i) defines a mesh isomorphism. This shows that in the expression of a mesh as a union of irreducible sub-meshes $S_i$ as in theorem (12) or (13) the irreducible meshes $S_i$ are all isomorphic. This fact deserves to be singled out.

(16) Theorem: The irreducible sub-meshes of any mesh are isomorphic. The mesh is the disjoint union of its irreducible sub-meshes.//

We now note the fact that the maps $g_i$ between time sets in a mesh isomorphism are all determined by specifying a single map $g_0$ between the time sets for a single base vertex $v_0$. Indeed, it is easily demonstrated that equation (14) defining a mesh isomorphism may be extended to the case where p is an arbitrary path in the computation graph. Now, for each i, choose a path $p_i$ from $v_0$ to $v_i$. Now, for some time $t \in S_i$, we know that $t - d(p_i) \in S_0$, and by (14), $$g_i(t) = g_0(t - d(p_i)) + d(g(p_i))$$

Consider now conditions under which two meshes may be isomorphic. It is clear that two reducible meshes are isomorphic if and only if they are the disjoint union of an equal number of irreducible sub-meshes, and these irreducible sub-meshes are isomorphic. Thus one is led to consider under what conditions irreducible meshes are isomorphic. The following theorem gives a necessary and sufficient condition for isomorphism of irreducible meshes and specifies explicitly the form of the isomorphism.

(17) Theorem: Two irreducible meshes, S and S' are isomorphic if and only if there is a functionality-preserving graph isomorphism between the underlying computation graphs such that the length of any loop in S' is $n'/n$ times the length of the corresponding loop in S. Here n and n' are the g.c.d. of lengths of loops in S and S'.

Note that if part of this theorem corresponds exactly with the content of theorem 2.

Proof: First, the if part of this theorem is proven. Consequently, select a vertex $v_0$ in S and an arbitrary time $t_0 \in S_0$. If g is the graph isomorphism between G(S) and G(S'), denote $g(v_i)$ by $v_i'$ and let $S_i'$ be its time set. Select any arbitrary time time $t_0'$ in $S_0'$. For any vertex $v_i$ in G(S), select a path $p_i$ from $v_0$ to $v_i$ and let $p_i'$ be the corresponding path in G(S'). For the vertex $v_0$ define a mapping $g_0$ by the formula $$g_0(t) = t_0' + (t - t_0) n'/n \tag{18}$$

and extend the mapping to any vertex $v_i$ by the formula $$g_i(t + d(p_i)) = g_0(t) + d(p_i'). \tag{19}$$

It is to be shown that this is a mesh isomorphism. Accordingly, let $q_{ij}$ be an edge from a vertex $v_i$ to $v_j$. Since the path $p_i \cdot q_{ij} \cdot p_j^{-1}$ is a loop, it must have length kn for some integer, k. Consequently, $$d(q_{ij}) = kn - d(p_i) + d(p_j). \tag{20}$$

Similarly, for the corresponding edge $q_{ij}'$ in G(S')

$$d(q_{ij}') = kn' - d(p_i') + d(p_j') \tag{21}$$

Now, let $t_i = t + d(p_i)$ be an arbitrary time in $S_i$, where $t \in S_0$. Then by (19), $$g_i(t_i) = g_i(t + d(p_i)) = g_0(t) + d(p_i'). \tag{22}$$

We may now compute $$\begin{aligned}
g_j(t_i + d(q_{ij})) &= g_j(t + d(p_i) + d(q_{ij})) \\
&= g_j(t + d(p_j) + (d(p_i) + d(q_{ij}) - d(p_j))) \\
&= g_j(t + d(p_j) + kn) & \text{by (20)} \\
&= g_0(t + kn) + d(p_j') & \text{by (19)} \\
&= g_0(t) + kn' + d(p_j') & \text{by (18)} \\
&= g_i(t_i) - d(p_i') + kn' + d(p_j') & \text{by (22)} \\
&= g_i(t_i) + d(q_{ij}') & \text{by (21)}
\end{aligned}$$

which verifies that equations (19) and (18) define an isomorphism and completes the first part of the proof.

We now turn to the only-if part of the proof, and accordingly assume that there exists an isomorphism g: S→S'. We start by proving that any loop of length 0 is mapped onto a loop of length 0 by g. Thus, let $p_0$ be a loop of length 0 starting and ending at vertex $v_i$. By equation (14) applied to the case where p is a loop of length 0, $$g_i(t_i) = g_i(t_i + d(p_0)) = g_i(t_i) + d(p_0')$$

and it follows that $d(p_0') = 0$.

Now consider loops of arbitrary length. Let q be a loop in G(S) based at $v_0$ with length n, the g.c.d. of the lengths of all loops in G(S) and let q' be the corresponding loop in the graph G(S'). Let the lengths of q' respectively. By assumption, n is the g.c.d. of lengths of all loops in G(S), but it is not yet known that this is true of n'. Now let p be a loop in G(S) based at $v_i$. One may assume that p has length kn, where k is an integer. Now let $p_i$ be a path from $v_0$ to $v_i$ and define $p_0$ to be the loop $p_i \cdot p \cdot p_i^{-1} \cdot q^{-k}$. This is a path that starts at $v_0$ passes to $v_i$ along $p_i$, then once around p, back to $v_0$ and finally k times around q in the inverse direction. Let $p_0'$ be the corresponding loop in G(S'). It is easily seen that $p_0$ has total length $d(p) - k \cdot d(q)$ and that $p_0'$ has length $d(p') - k \cdot d(q')$. However, $d(p) = kn$ and $d(q) = n$ by assumption. It follows that $p_0$ has length 0, and consequently, so does $p_0'$. Since $d(q') = n'$, one sees that $$d(p')=kn'=d(p).n'/n \quad (28)$$

and the proof of the theorem is complete.//

Appendix VIII: Digit-Serial Arrays

Now consider digit-serial computation. In attempting to extend the definition of a computation graph to digit-serial computation, the difficulty arises that the value at a node at a given time is no longer a function of the values at its predecessors at single instances of time, since in digit-serial computation, the output value of an operator depends on the values of all preceding digits of the word. Therefore, to handle such arrays the definition of a computation graph is generalized so that instead of definition (8) defining the form of the function associated with each cell, one assumes that there is associated with each vertex, a function $$f_i: \bigotimes_{v_j \in P(v_i)} D_j^P \to D_i^P \quad (29)$$

where by $D_i^P$ the Cartesian product of P copies of $D_i$ is denoted. A digit-serial computation graph is defined analogously to a computation graph except that the function definition (29) replaces (8) and that for each vertex are defined time sets of the form $T_i = \{ k_i + Pt | t \in Z \}$ just as with meshes.

Given a digit-serial array, define $Dval(v_i, t)$ to be the P-tuple $(val(v_i, t), val(v_i, t-1), \ldots, val(v_i, t-(P-1)))$, where as before, $val(v_i, t)$ is the value at vertex $v_i$ at time t. A valid computation on the digit-serial computation graph is defined by requiring that for each time $t \in T_i$ analogously with (9) with Dval replacing val:

$$Dval(v_i, t) = f_i(Dval(v_{j_1}, t-d_1), Dval(v_{j_2}, t-d_2), \ldots, Dval(v_{j_k}, t-d_k)). \quad (30)$$

Now consider a mesh S' of period P and let the value sets associated with each vertex $v_i$ be denoted by $D_i'$. A digit-serial computation graph S as defined above is said to be obtained from S' by substituting digit serial operators if there is for each vertex, $v_i$ in S an epimorphic decoding function, $\xi: D_i^P \to D_i'$ satisfying $$\xi(f(a_1, a_2, \ldots, a_k)) = f'(\xi(a_1), \xi(a_2), \ldots, \xi(a_k)) \quad (31)$$

for any P-tuples $a_1, a_2, \ldots, a_k$.

A decoding function is simply a way of interpreting a P-tuple of values in the digit-serial graph as a single bit-parallel value in the original array. This definition is sufficiently broad to cover both MSD-first and LSD-first as well as redundant serial formats. Equation (31) states simply that the result of a digit-serial computation, interpreted as bit-parallel value, is the same as the result of carrying out the computation in bit-parallel arithmetic on the interpreted input values. In other words, the digit-serial operator mirrors the bit-parallel operator.

It can now be shown fairly easily that given a valid digit-serial computation on a digit-serial computation graph, then the values $\xi(Dval(v_i, t))$ for $t \in T_i$ form a valid computation on the mesh S'. This is the contents of theorem 3.

What is claimed is:

1. A method for designing a systolic array of processors including therewithin loop connections of processors as well as internal pipeline connections of processors, which method reduces any under-utilization of the processors, each of said loop connections being adapted to introduce a latency in its respective loop, said method comprising the steps of:

initially developing an original design for said systolic array, said original design using parallel-bit processors;

determining the latency around each loop connection of parallel-bit processors in said original design for said systolic array;

determining a maximum common divisor P of the latencies around the loop connections of parallel-bit processors in said original design for said systolic array;

if said maximum common divisor P is one, indicating that there are no under-utilized processors in said original design for said systolic array using parallel-bit processors, using said original design for said systolic array using parallel-bit processors as a final design for said systolic array; and if said maximum common divisor P is larger than one, indicating that there are under-utilized processors in said original design for said systolic array using parallel-bit processors, modifying said original design for said systolic array by replacing each parallel-bit processor in said original systolic array with a corresponding digit-serial processor adapted to input and output one digit containing a predetermined number of bits per clock cycle, thereby to achieve a final design for said systolic array, said step of modifying comprising the substeps of:

for each digital word comprising a number of digits, selecting the number of digits per digital word and inserting delay elements, where necessary, to assure that the respective latencies of said loop connections in a modified design for said systolic array are similar multiples of the latencies of the corresponding loop connections in said systolic array of parallel-bit processors, that the number of digits per word equals the maximum common divisor of the respective latencies of said loop connections in said modified design for said systolic array, and the number of bits per digit is equal to the number of bits per word divided by the number of digits per word.

2. A method as set forth in claim 1 wherein each corresponding digit-serial processor is of a type in which the number of digits per digital word equals the greatest common divisor of the latencies of the loop connections in said original design for said systolic array, using parallel-bit processors.

3. A method for designing a systolic array of processors including therewithin loop connections of processors as well as internal pipeline connections of processors, which method reduces any under-utilization of the processors, each of said loop connections being adapted to introduce a latency in its respective loop, said method comprising the steps of:

initially developing an original design for said systolic array, said original design using parallel-bit processors;

determining the latency around each loop connection of parallel-bit processors in said original design for said systolic array;

determining a maximum common divisor P of the latencies around the loop connections of parallel-bit processors in said original design for said systolic array;

if said maximum common divisor P is one, indicating that there are no under-utilized processors in said original design for said systolic array using parallel-bit processors, using said original design for said systolic array using parallel-bit processors as a final design for said systolic array; and if said maximum common divisor P is larger than one, indicating that there are under-utilized processors in said original design for said systolic array using parallel-bit processors, generating a final design for said systolic array by performing the following substeps, cyclically if necessary, (a) in a most recent said systolic array design using parallel-bit processors, replacing each parallel-bit processor with a corresponding digit-serial processor in which, for each digital word comprising a number of digits, the number of digits per digital word equals the maximum common divisor of the respective latencies of said loop connections in said most recent systolic array design using parallel-bit processors, thereby generating a most recent modified design for said systolic array;

(b) using said most recent modified design for said systolic array as the final design for said systolic array only if the latencies in all the loop connections of said most recent modified design for said systolic array are the same as the latencies in the corresponding loop connections of said most recent systolic array design using parallel-bit processors; and (c) if the latencies in all the loop connections of said most recent design for said systolic array are not the same as the latencies in the corresponding loop connections of said most recent systolic array design using parallel-bit processors, inserting delay elements into the most recent systolic array design using parallel-bit processors for increasing the latencies in all the loop connections by a factor equal to $(Q+1)/Q$, where Q is the greatest common divisor of all loop latencies in the most recent design using parallel-bit processors, to generate an updated most recent systolic array design using parallel-bit processors.

4. A method for designing a digit-serial systolic array of functional cells, each of which functional cells has at least one respective input port, at least one respective output port, and at least one operator, which digit-serial systolic array has internal pipeline connections therein and has at least one loop connection therein, said at least one loop connection being adapted to introduce a latency in said loop, said method comprising the steps of:

developing a prototypical structure for an individual functional cell of each type of functional cell used in said systolic array, which individual functional cell may be repeated in said systolic array;

generating digit-serial systolic array designs by assigning a scheduled time to each operator in each functional cell and subsequently inserting delay elements to equalize latencies, and then using integer programming to determine a minimum number P of digits per digital word, said integer programming proceeding from the following constraints:

for each connection between a preceding and succeeding operator in each functional cell $$S_i + t_i \leq S_j + t_j$$

where $t_i$ is the latency of the preceding operator, $t_j$ is the latency of the succeeding functional cell, $S_i$ is a scheduled time of the preceding functional cell, and $S_j$ is the scheduled time of the succeeding functional cell; and for each loop connection within said digit-serial systolic array of functional cells having no interior loop connections therewithin and threading a number n of input and output ports of the functional cells of said array $$\sum_{k=1}^{n/2} (S_{ik} - S_{jk}) = mP$$

where $S_{ik}$ and $S_{jk}$ are for each value of k the scheduled times of a different pair of interconnected functional-cell input and output ports threaded by that loop connection, and m is an integer; and selecting the digit-serial systolic array design in which P is a minimum.

5. A method for designing a digit-serial systolic array of functional cells, each of which functional cells has at least one respective input port, at least one respective output port, and at least one operator, which digit-serial systolic array has internal pipeline connections therein and has at least one loop connection therein, said at least one loop connection being adapted to introduce a latency in said loop, said method comprising the steps of:

developing one or more prototypical structures of an individual functional cell for each type of functional cell used in said systolic array, which type of functional cell may be repeated in said systolic array, the prototypical structures for each type of functional cell where there is more than one such prototype structure differing in their respective minimal latencies;

for each combination prototypical structures as may be utilized in each loop connection within said systolic array, generating digit-serial systolic array designs by assigning a scheduled time to each operator in each functional cell and subsequently inserting delay elements to equalize latencies, and then using integer programming to determine a minimum number P of digits per digital word, said integer programming proceeding from the following constraints:

for each connection between a preceding and a succeeding operator in each functional cell $$S_i + t_i \leq S_j + t_j$$

where $t_i$ is the latency of the preceding operator, $t_j$ is the latency of the succeeding functional cell, $S_i$ is a scheduled time of the preceding functional cell, and $S_j$ is the scheduled time of the succeeding functional cell; and for each loop connection within said digit-serial systolic array of functional cells having no interior loop connections therewithin and threading a number n of input and output ports of the functional cells of said array $$\sum_{k=1}^{n/2} (S_{ik} - S_{jk}) = mP$$

where $S_{ik}$ and $S_{jk}$ are for each value of k the scheduled times of a different pair of interconnected functional-cell input and output ports threaded by that loop connection, and m is an integer; and selecting the digit-serial systolic array design in which P is a minimum.

6. A loop connection comprising first, second and third digit-serial processing elements cyclically operable in accordance with cycles of clock signals supplied to each of said digit-serial processing elements, each of said first, second and third digit-serial processing elements having at least a first input port and at least a first output port, said first output port of said first digit-serial processing element coupled to the first input port of said second digit-serial processing element, said first output port of said second digit-serial processing element coupled to the first input port of the third digit-serial processing element, said first input port of said first digit-serial processing element connected for receiving a respective digit-serial input signal from an additional digit-serial processing element not connected in said loop connection, at least one of said second and third digit-serial processing elements having a second output port for supplying a respective digit-serial output signal to be used outside said loop connection, and a delay element of at least one-cycle of clock signal delay coupled between a second input port of the first digit-serial processing element and an additional output port of the third digit-serial processing element so as to complete said loop connection, said loop connection being adapted to provide a latency of at least two cycles of clock signal therein and said digit-serial signals having as many digits as there are cycles of clock signal latency in said loop connection.

7. A loop connection of digit-serial processing elements as set forth in claim 6 in combination with a respective parallel-bit-to-digit-serial converter for each input port connected for receiving a respective digital-serial input signal and not connected in said loop connection.

8. A loop connection of digit-serial processing elements as set forth in claim 6 in combination with a respective parallel-bit-to-digit-serial converter for each input port connected for receiving a respective digital-serial input signal and not connected in said loop connection.

9. A loop connection of digit-serial processing elements as set forth in claim 8 in combination with a respective digit-serial-to-parallel-bit converter for converting to parallel-bit form each said digital-serial output signal to be used outside said loop connection.

10. A loop connection of digit-serial processing elements as set forth in claim 6 in combination with a respective parallel-bit-to digit-serial converter for converting to another digital format at least one said digital-serial output signal to be used outside said loop connection.

11. A loop connection of digit-serial processing elements as set forth in claim 6 in combination with a respective digit-serial-to-parallel-bit converter for converting to parallel-bit form each said digital-serial output signal to be used outside said loop connection.

12. A systolic array of digit-serial processing elements cyclically operable in accordance with cycles of clock signals supplied to each of said digital-serial processing elements and adapted to process signals made up of a number of digits, said systolic array having a plurality of loop connections therein adapted to introduce respective latencies, which latencies have at least one common divisor larger than one, each of said loop connections being comprised of a first, second and third processing element wherein a first output port of said first processing element is coupled to a first input port of said second processing element and a first output port of said second processing element is coupled to a first input port of said third processing element, said first digit-serial processing element in said each loop connection having a first input port connected for receiving a respective digit-serial input signal from a digit-serial processing element not connected in said each loop connection, said each loop connection further including a pipeline connection between a second output port of said third digit-serial processing element and a second input port of said first digit-serial processing element so as to complete said each loop connection and introduce one-cycle of clock signal delay in said each loop connection, and at least one of said second and third digit-serial processing elements having an additional output port for supplying a respective digit-serial output signal to be used outside said each loop connection or pipeline connection, the number of digits in signals for processing in said systolic array of digit-serial processing elements equaling a maximum of such common divisors in order to fully utilize the processing elements of said array.

13. A systolic array of digit-serial processing elements as set forth in claim 12 in combination with a respective parallel-bit-to-digit-serial converter for each input port connected for receiving a respective digital-serial input signal and not connected in any said loop or internal pipeline connection.

14. A systolic array of digit-serial processing elements as set forth in claim 12 in combination with a respective parallel-bit-to-digit-serial converter for each input port connected for receiving a respective digital-serial input signal and not connected in any said loop or internal pipeline connection.

15. A systolic array of digit-serial processing elements as set forth in claim 14 in combination with a respective digit-serial-to-parallel-bit converter for converting to parallel-bit form each said digital-serial output signal to be used outside any said loop or internal pipeline connection.

16. A systolic array of digit-serial processing elements as set forth in claim 12 in combination with a respective parallel-bit-to-digit-serial converter for converting to another digital format at least one said digital-serial output signal to be used outside any said loop or internal pipeline connection.

17. A systolic array of digit-serial processing elements as set forth in claim 12 in combination with a respective digit-serial-to-parallel-bit converter for converting to parallel-bit form each said digital-serial output signal to be used outside any said loop or internal pipeline connection.

* * * * *